United States Patent
Qin et al.

(10) Patent No.: US 11,053,461 B2
(45) Date of Patent: *Jul. 6, 2021

(54) LEUCO TRIPHENYLMETHANE COLORANTS AS BLUING AGENTS IN LAUNDRY CARE COMPOSITIONS

(71) Applicant: Milliken & Company, Spartanburg, SC (US)

(72) Inventors: Haihu Qin, Greer, SC (US); Benjamin R. Butterfield, Greer, SC (US); Diana C. Balasca, Simpsonville, SC (US); Xiaoyong Hong, Greer, SC (US); Sanjeev K. Dey, Spartanburg, SC (US); Dominick J. Valenti, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,115

(22) Filed: May 22, 2020

(65) Prior Publication Data

US 2020/0283703 A1 Sep. 10, 2020

Related U.S. Application Data

(62) Division of application No. 15/963,147, filed on Apr. 26, 2018, now Pat. No. 10,723,982, which is a division of application No. 15/145,865, filed on May 4, 2016, now Pat. No. 9,982,221.

(60) Provisional application No. 62/156,410, filed on May 4, 2015.

(51) Int. Cl.
| | |
|---|---|
| *C11D 3/37* | (2006.01) |
| *C11D 3/42* | (2006.01) |
| *C09B 11/06* | (2006.01) |
| *C09B 11/10* | (2006.01) |
| *C09B 11/12* | (2006.01) |
| *C09B 69/00* | (2006.01) |
| *C09B 69/10* | (2006.01) |

(52) U.S. Cl.
CPC .............. *C11D 3/42* (2013.01); *C09B 11/06* (2013.01); *C09B 11/10* (2013.01); *C09B 11/12* (2013.01); *C09B 69/00* (2013.01); *C09B 69/103* (2013.01)

(58) Field of Classification Search
CPC ........... C11D 3/42; C11D 3/707; C09B 11/06; C09B 11/10; C09B 11/12
See application file for complete search history.

(56) References Cited

U.S. PATENT DOCUMENTS

| | | |
|---|---|---|
| 2,755,203 A | 7/1956 | Stallmann |
| 3,133,036 A | 5/1964 | Ultee |
| 3,157,633 A | 11/1964 | Kuhn |
| 4,137,243 A | 1/1979 | Farmer |
| 4,336,323 A | 6/1982 | Winslow |
| 4,613,465 A | 9/1986 | Yamanishi |
| 5,039,782 A | 8/1991 | Langer |
| 7,094,812 B2 | 8/2006 | Banning |
| 7,208,459 B2 | 4/2007 | Sadlowski et al. |
| 7,544,216 B2 | 6/2009 | Torres |
| 7,544,804 B2 | 6/2009 | Stephens |
| 7,597,723 B2 | 10/2009 | Moore |
| 7,637,963 B2 | 12/2009 | Moore |
| 9,982,221 B2* | 5/2018 | Qin ................. C09B 69/103 |
| 10,723,982 B2* | 7/2020 | Qin ................. C09B 11/06 |
| 2005/0288206 A1 | 12/2005 | Sadlowski |
| 2008/0113868 A1 | 5/2008 | Moore |
| 2008/0223413 A1 | 9/2008 | Radford |
| 2015/0322384 A1 | 11/2015 | Butterfield |

FOREIGN PATENT DOCUMENTS

| | | |
|---|---|---|
| CN | 101600765 | 12/2009 |
| EP | 0031070 | 7/1981 |
| EP | 0174371 | 3/1986 |
| EP | 0355335 | 2/1990 |
| EP | 0355864 | 2/1990 |
| EP | 1471116 | 10/2004 |
| EP | 2573144 | 3/2013 |
| GB | 1339619 | 12/1973 |
| GB | 1395627 | 5/1975 |
| JP | 2002504591 | 2/2002 |
| JP | 2011133805 | 7/2011 |
| JP | 2013529237 | 7/2013 |
| WO | 8503942 | 9/1985 |
| WO | 0100737 | 1/2001 |
| WO | 2008100445 A2 | 8/2008 |
| WO | 2013090682 | 6/2013 |

OTHER PUBLICATIONS

Adurthy S. N. Murthy et al: "Cyclic-voltammetric studies of some phenothiazine dyes", Journal of the Chemical Society. Faraday Transactions, vol. 80, No. 10 Jan. 1, 1984 (Jan. 1, 1984), pp. 2745-2750, XP055260305, GB ISSN: 0300-9599, DOI: 10.1039/f19848002745.

D A Hall, M Sakuma, P. J Elving, "Voltammetric Oxidation of Triphenyl- Methane Dyes At Platinum in Liquid Sulphur Dioxide", Electrochimica Acta, Pergamon Press Ltd, (Jan. 1, 1966), URL: https://deepblue.lib.umich.edu/bitstream/handle/2027.42/33474/0000879.pdf? sequence=1, XP055259579, 14 pages.

(Continued)

*Primary Examiner* — John R Hardee
(74) *Attorney, Agent, or Firm* — Brenda D. Wentz; Milliken & Company

(57) ABSTRACT

This application describes laundry care compositions that contain leuco colorants and their use in the laundering of textile articles. These types of colorants are provided in a stable, substantially colorless state and then may be transformed to an intense colored state upon exposure to certain physical or chemical changes such as, for example, exposure to oxygen, ion addition, exposure to light, and the like. The laundry care compositions containing the leuco colorants are designed to enhance the apparent or visually perceived whiteness of, or to impart a desired hue to, textile articles washed or otherwise treated with the laundry care composition.

19 Claims, No Drawings

(56) References Cited

OTHER PUBLICATIONS

Lewis E S et al, "Rates and Isotope Effects in the Quinone Oxidation of Leuco Triphenylmethane Dyes", Journal of the American Chemical Society, American Chemical Society, US, (19700225), vol. 92, No. 4, doi:10.1021/JA00707A027, ISSN 0002-7863, pp. 899-905, XP002049912.
Patent Cooperation Treaty PCT International Search Report. dated Apr. 6, 2016. International Application No. PCT/US2015/029217. International Filing Date, May 5, 2015, 6 pages.
Z. Galus et al, "The Anodic Oxidation of Triphenylmethane Dyes", Journal of the American Chemical Society, US, (May 5, 1964), vol. 86, No. 9, doi:10.1021/ja01063a003, ISSN 0002-7863, pp. 1666-1671, XP055260182.

* cited by examiner

LEUCO TRIPHENYLMETHANE COLORANTS AS BLUING AGENTS IN LAUNDRY CARE COMPOSITIONS

CROSS-REFERENCE TO RELATED APPLICATIONS

This application claims priority to and is a divisional of U.S. patent application Ser. No. 15/963,147, now U.S. Pat. No. 10,723,982, entitled "Leuco Triphenylmethane Colorants as Bluing Agents in Laundry Care Compositions," which was filed on Apr. 26, 2018, which claims priority to and is a divisional of U.S. patent application Ser. No. 15/145,865, now U.S. Pat. No. 9,982,221, entitled "Leuco Triphenylmethane Colorants as Bluing Agents in Laundry Care Compositions," which was filed on May 4, 2016, which claims priority to U.S. Patent Application Ser. No. 62/156,410, entitled "Leuco Triphenylmethane Colorants as Bluing Agents in Laundry Care Compositions," which was filed on May 4, 2015, all of which are entirely incorporated by reference herein.

TECHNICAL FIELD

This application describes laundry care compositions that contain leuco colorants and their use in the laundering of textile articles. These types of colorants are provided in a stable, substantially colorless state and then may be transformed to an intense colored state upon exposure to certain physical or chemical changes such as, for example, exposure to oxygen, ion addition, exposure to light, and the like. The laundry care compositions containing the leuco colorants are designed to enhance the apparent or visually perceived whiteness of, or to impart a desired hue to, textile articles washed or otherwise treated with the laundry care composition.

BACKGROUND

Leuco dyes are known in the prior art to exhibit a change from a colorless or slightly colored state to a colored state upon exposure to specific chemical or physical triggers. The change in coloration that occurs is typically visually perceptible to the human eye. All existing compounds have some absorbance in the visible light region (400-700 nm), and thus more or less have some color. In this invention, a dye is considered as a "leuco dye" if it did not render a significant color at its application concentration and conditions, but renders a significant color in its triggered form. The color change upon triggering stems from the change of the molar attenuation coefficient (also known as molar extinction coefficient, molar absorption coefficient, and/or molar absorptivity in some literatures) of the leuco dye molecule in the 400-700 nm range, preferably in the 500-650 nm range, and most preferably in the 530-620 nm range. The increase of the molar attenuation coefficient of a leuco dye before and after the triggering should be bigger than 50%, more preferably bigger than 200%, and most preferable bigger than 500%. In some cases the leuco compound can be used with other colorants, and other colorants may interfere the absorbance of the leuco dye before and/or after triggering. In this case, it is best to measure leuco dye and its colored form separately in a solvent.

The method of measuring molar attenuation coefficient of a compound is well-known. A description of the molar attenuation coefficient (in the name of molar absorption coefficient) and its measurement method can be found in *Vogel's Textbook of quantitative chemical analysis*, $5^{th}$ edition, 1989, John Wiley and Sons. The chemical or physical triggers that bring about the coloration change include, but are not limited to, oxidation, intramolecular ring opening, pH change, and exposure to heat and/or cold or light (e.g. UV light). For example, triphenylmethane ("TPM") compounds, one class of leuco dyes, are useful in applications such as photoimaging and typewritten ribbons whereby microencapsulated TPMs are brought into contact with an acid source and images are generated when pressure or heat is applied. These dyes are described, for example, in *Chemistry and Applications of Leuco Dyes* (edited by Ramaiah Muthyala, pp. xi-xiii; 151-152).

The use of polymeric colorants for coloring consumer products is well known in the prior art.

As one non-limiting example, the use of whitening agents, either optical brighteners or blueing agents, in textile applications is known. As textile substrates age, their color tends to fade or yellow due to exposure to light, air, soil, and natural degradation of the fibers that comprise the substrates. Thus, the purpose of whitening agents is generally to visually brighten these textile substrates and counteract the fading and yellowing of the substrates.

Previous attempts to add bluing agents to fabric care products have used preformed pigments or dyes such as azo dyes, triaminotriphenyl methane compounds, triphenyl methane compounds and anthraquinone colorants. U.S. Pat. No. 4,137,243 to Farmer teaches polymeric anthraquinone-derived colorants which exhibit improved light and alkali fastness properties. Farmer also discloses that these colorants may be incorporated into detergent compositions to provide coloration or blueing effect for the detergent composition. These types of colorants must therefore be alkali fast, in order to withstand the alkaline conditions of the detergent composition. The colorants should also be water fugitive so as to not stain the textile articles washed with the colored detergent composition. However, Farmer does not disclose leuco colorants that have the ability to transform from a colorless to a colored state upon exposure to certain physical or chemical changes.

U.S. Pat. No. 5,039,782 to Langer et al. discloses a copolymer whitening agent that contains a fluorescent group and a hydrophilic group. The whitening agent is preferably 4,4'-bis(carbomethoxystilbene), and the hydrophilic group is preferably a mixture of polyethylene glycol and ethylene glycol. The copolymer optionally contains a hydrophobic monomer portion, such as polyethylene terephthalate, in order to better adhere the polymer to a hydrophobic surface (like polyester fabric or soiled cotton fabric). The resulting copolymer provides dual functionality as a whitening agent and for providing soil release to fabrics. However, it is apparent from the test data provided in Table 3 of the reference that the copolymer fails to provide adequate whitening for soiled cotton fabrics without the addition of a second whitening agent (i.e., Tinopal).

Furthermore, Langer et al. fail to disclose leuco colorants that exhibit a reversible transformation from a colorless to a colored state.

U.S. Pat. No. 7,208,459 to Sadlowski et al. discloses the use of hueing dyes in laundry detergent compositions for combating the yellowing of fabrics. The hueing dye is designed to avoid significant build up of the dye on fabric so that the fabric does not exhibit a bluish tint, for example, after repeated exposure to the hueing dye present in laundry detergent. The laundry detergent composition is comprised of a surfactant and a hueing dye. The surfactant may be anionic, nonionic, cationic, zwitterionic, and/or amphoteric in nature. The hueing dye is characterized by having a hueing efficiency of at least 10 and a wash removal value in the range of between 30% and 80%. Exemplary dyes which exhibit these properties include certain categories of dyes that contain blue or violet chromophores, such as triarylmethane dyes, basic dyes, anthraquinone dyes, and azo dyes. However, this reference fails to disclose the use of unsubstituted or leuco colorants as described by the present invention.

Thus, it is contemplated to be within the scope of the present invention that the leuco colorants described herein may be ideally suited for use as whitening agents. Many of the whitening agents that are commercially available exhibit a dark color, e.g. a dark blue color, when added to a laundry care composition, such as a laundry detergent, rinse aid, fabric softener, and the like. For instance, the triphenyl methane and thiazolium structures are positively charged colored species. With colored species such as these, the amount of color is visually apparent and may be an undesired shade for consumers. Powdered detergent systems typically use colored speckles to reduce apparent color of the detergent by incorporation of color within the interior of a speckle or granule. Liquid products often incorporate opacity modifiers to reduce the apparent darkness of the product.

The need exists for an effective whitening agent that consumers can use without concern that the garments and other textile substrates will be irreversible stained with the laundry detergent composition that contains a whitening agent. Thus, the colorless leuco colorants described herein may be added to laundry care compositions without fear of staining, since these colorants are colorless when added to the laundry machine and only exhibit color during the laundry cycle and/or upon exposure to ultraviolet light when the whitening effect is achieved.

The present invention offers advantages over U.S. Pat. Nos. 4,137,243 and 5,039,782 and US Patent Application Publication No. 2005/0288206 as this invention takes advantage of colorless compounds that can be converted to colored compounds with the addition of certain physical and/or chemical catalysts. Such compounds are useful for many consumer products, including, but not limited to, their use as whitening agents in laundry care compositions. As whitening agents, the colored compounds exhibit the desired wavelengths in the range of blue, red, violet, purple, or combinations thereof upon exposure to ultraviolet light (or, they absorb light to produce the same shades) in order to neutralize the yellowness of textile substrates and provide a brightening effect.

SUMMARY

This invention relates to a composition comprising: (a) at least one surfactant and (b) at least one compound represented by Formula (I) below:

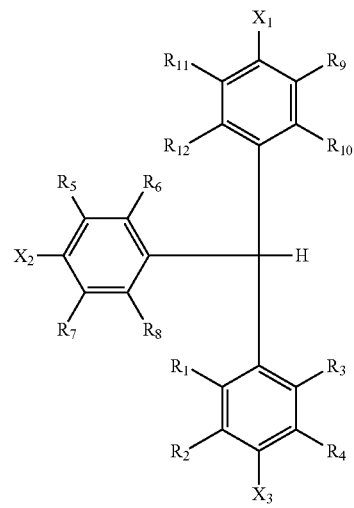

wherein $X_1$, $X_2$, $X_3$ and $R_1$ to $R_{12}$ groups are independently selected from the group consisting of halogens, hydrogen, a hydroxy group, a nitro group, alkyl groups, substituted alkyl groups, $-S(O)_2OH$, $-S(O)_2O^-[M^+]$, $-C(O)OR_{13}$, $-C(O)R_{13}$, $-C(O)NR_{13}R_{14}$, $-NC(O)OR_{13}$, $-NC(O)SR_{13}$, $-OR_{13}$, $-NR_{13}R_{14}$, $-S(O)_2R_{13}$, $-S(O)_2NR_{13}R_{14}$, and $-P(O)_2R_{13}$; M is a cation; $R_{13}$ and $R_{14}$ are independently selected from the group consisting of hydrogen, alkyl groups, substituted alkyl groups, aryl groups, substituted aryl groups, and $R_a$; wherein $R_a$ is selected from the group consisting of $-R_x-O-R_y-R_z$ and $-R_y-R_z$; $R_x$ is selected from the group consisting of alkanediyl groups and arenediyl groups; $R_z$ is selected from the group consisting of hydrogen, alkyl groups, substituted alkyl groups, acyl groups, and $R_b$; $R_b$ is a monovalent group conforming to a structure selected from the group consisting of Formula I; and $R_y$ is a divalent substituent selected from the group consisting of:

(i) divalent substituents comprising two or more divalent repeating units independently selected from repeating units conforming to the structure of Formula (C)

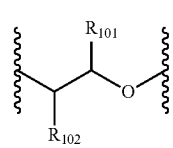

wherein $R_{101}$ and $R_{102}$ are independently selected from the group consisting of hydrogen, alkyl, hydroxyalkyl, aryl, alkoxyalkyl, and aryloxyalkyl;

(ii) divalent substituents conforming to the structure of Formula (CX)

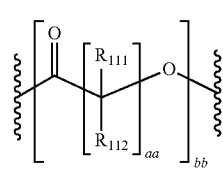

wherein $R_{111}$ and $R_{112}$ are independently selected from the group consisting of hydrogen, hydroxyl, and $C_1$-$C_{10}$ alkyl, aa is an integer from 1 to 12, and bb is an integer greater than or equal to 1 (e.g., from 1 to 100);

(iii) divalent substituents conforming to the structure of Formula (CXX)

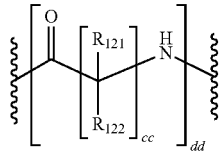

(CXX)

wherein $R_{121}$ and $R_{122}$ are independently selected from the group consisting of hydrogen, hydroxyl, and $C_1$-$C_{10}$ alkyl, cc is an integer from 1 to 12, and dd is an integer greater than or equal to 1 (e.g., from 1 to 100);

(iv) divalent substituents conforming to the structure of Formula (CXXX)

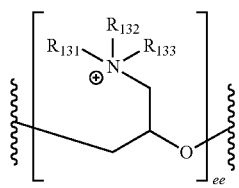

(CXXX)

wherein $R_{131}$, $R_{132}$, and $R_{133}$ are independently selected from alkyl and hydroxyalkyl, and ee is an integer greater than or equal to 1 (e.g., from 1 to 100);

(v) divalent substituents conforming to the structure of Formula (CXL)

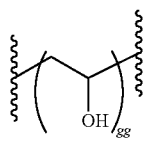

(CXL)

wherein each $R_{141}$ is independently selected from the group consisting of hydrogen and alkylamine groups, and ff is an integer greater than or equal to 1 (e.g., from 1 to 100);

(vi) divalent substituents conforming to the structure of Formula (CL)

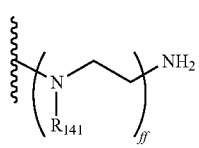

(CL)

wherein gg is an integer greater than or equal to 1 (e.g., from 1 to 100);

(vii) divalent substituents conforming to the structure of Formula (CLX)

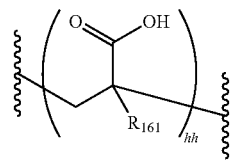

(CLX)

wherein each $R_{161}$ is independently selected from the group consisting of hydrogen and methyl, and hh is an integer greater than or equal to 1 (e.g., from 1 to 100);

(viii) divalent substituents conforming to the structure of Formula (CLXX)

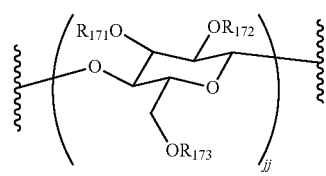

(CLXX)

wherein each $R_{171}$, $R_{172}$, and $R_{173}$ is independently selected from the group consisting of hydrogen and —$CH_2CO_2H$, and jj is an integer greater than or equal to 1 (e.g., from 1 to 100); and (ix) divalent substituents comprising two or more substituents selected from the group consisting of substituents conforming to a structure of Formula (C), (CX), (CXX), (CXXX), (CXL), (CL), (CLX), or (CLXX).

This invention also relates to a laundry care composition comprising: (a) at least one laundry care adjunct material and (b) at least one leuco dye, wherein the leuco dye forms color upon exposure to an oxidation reaction and has a standard redox potential of greater than zero volts at neutral pH.

This invention further relates to a laundry care composition comprising: (a) at least one laundry care adjunct material and (b) at least one compound represented by Formula (I) below:

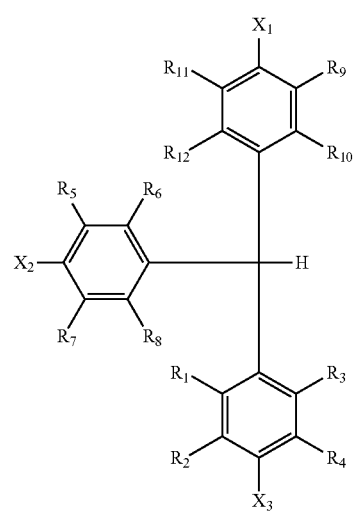

(I)

wherein $X_1$, $X_2$, $X_3$ and $R_1$ to $R_{12}$ groups are independently selected from the group consisting of halogens, hydrogen, a hydroxy group, a nitro group, alkyl groups, substituted alkyl groups, —S(O)$_2$OH, —S(O)$_2$O$^-$[M$^+$], —C(O)OR$_{13}$, —C(O)R$_{13}$, —C(O)NR$_{13}$R$_{14}$, —NC(O)OR$_{13}$, —NC(O)SR$_{13}$, —OR$_{13}$, —NR$_{13}$R$_{14}$, —S(O)$_2$R$_{13}$, —S(O)$_2$NR$_{13}$R$_{14}$, and —P(O)$_2$R$_{13}$; M is a cation; R$_{13}$ and R$_{14}$ are independently selected from the group consisting of hydrogen, alkyl groups, substituted alkyl groups, aryl groups, substituted aryl groups, and R$_a$; wherein R$_a$ is selected from the group consisting of —R$_x$—O—R$_y$—R$_z$ and —R$_y$—R$_z$; R$_x$ is selected from the group consisting of alkanediyl groups and arenediyl groups; R$_z$ is selected from the group consisting of hydrogen, alkyl groups, substituted alkyl groups, acyl groups, and R$_b$; R$_b$ is a monovalent group conforming to a structure selected from the group consisting of Formula I; and R$_y$ is a divalent substituent selected from the group consisting of:

(i) divalent substituents comprising two or more divalent repeating units independently selected from repeating units conforming to the structure of Formula (C)

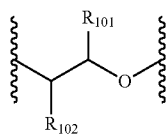

(C)

wherein R$_{101}$ and R$_{102}$ are independently selected from the group consisting of hydrogen, alkyl, hydroxyalkyl, aryl, alkoxyalkyl, and aryloxyalkyl;

(ii) divalent substituents conforming to the structure of Formula (CX)

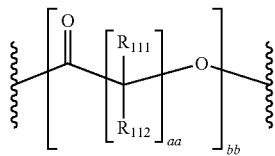

(CX)

wherein R$_{111}$ and R$_{112}$ are independently selected from the group consisting of hydrogen, hydroxyl, and C$_1$-C$_{10}$ alkyl, aa is an integer from 1 to 12, and bb is an integer greater than or equal to 1 (e.g., from 1 to 100);

(iii) divalent substituents conforming to the structure of Formula (CXX)

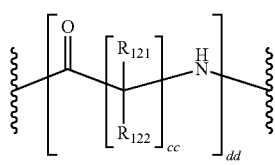

(CXX)

wherein R$_{121}$ and R$_{122}$ are independently selected from the group consisting of hydrogen, hydroxyl, and C$_1$-C$_{10}$ alkyl, cc is an integer from 1 to 12, and dd is an integer greater than or equal to 1 (e.g., from 1 to 100);

(iv) divalent substituents conforming to the structure of Formula (CXXX)

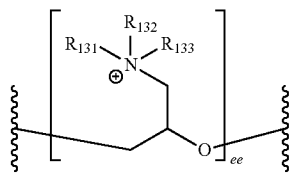

(CXXX)

wherein R$_{131}$, R$_{132}$, and R$_{133}$ are independently selected from alkyl and hydroxyalkyl, and ee is an integer greater than or equal to 1 (e.g., from 1 to 100);

(v) divalent substituents conforming to the structure of Formula (CXL)

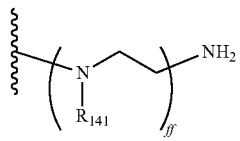

(CXL)

wherein each R$_{141}$ is independently selected from the group consisting of hydrogen and alkylamine groups, and ff is an integer greater than or equal to 1 (e.g., from 1 to 100);

(vi) divalent substituents conforming to the structure of Formula (CL)

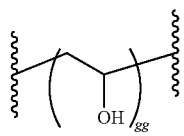

(CL)

wherein gg is an integer greater than or equal to 1 (e.g., from 1 to 100);

(vii) divalent substituents conforming to the structure of Formula (CLX)

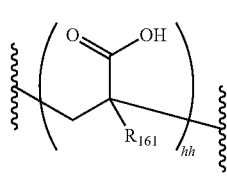

(CLX)

wherein each R$_{161}$ is independently selected from the group consisting of hydrogen and methyl, and hh is an integer greater than or equal to 1 (e.g., from 1 to 100);

(viii) divalent substituents conforming to the structure of Formula (CLXX)

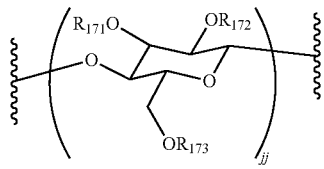 (CLXX)

wherein each $R_{171}$, $R_{172}$, and $R_{173}$ is independently selected from the group consisting of hydrogen and —$CH_2CO_2H$, and jj is an integer greater than or equal to 1 (e.g., from 1 to 100); and (ix) divalent substituents comprising two or more substituents selected from the group consisting of substituents conforming to a structure of Formula (C), (CX), (CXX), (CXXX), (CXL), (CL), (CLX), or (CLXX).

This invention also relates to a polymeric leuco colorant represented by Formula (I) below:

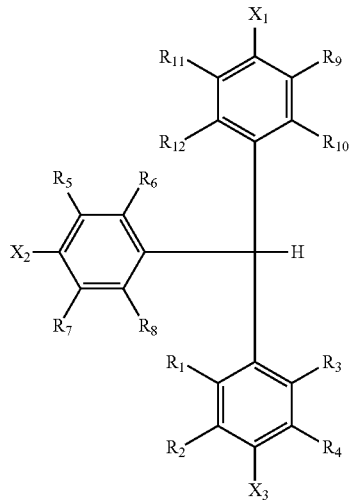 (I)

wherein $X_1$, $X_2$, $X_3$ and $R_1$ to $R_{12}$ groups are independently selected from the group consisting of halogens, hydrogen, a hydroxy group, a nitro group, alkyl groups, substituted alkyl groups, —$S(O)_2OH$, —$S(O)_2O^-[M^+]$, —$C(O)OR_{13}$, —$C(O)R_{13}$, —$C(O)NR_{13}R_{14}$, —$NC(O)OR_{13}$, —$NC(O)SR_{13}$, —$OR_{13}$, —$NR_{13}R_{14}$, —$S(O)_2R_{13}$, —$S(O)_2NR_{13}R_{14}$, and —$P(O)_2R_{13}$; M is a cation; $R_{13}$ and $R_{14}$ are independently selected from the group consisting of hydrogen, alkyl groups, substituted alkyl groups, aryl groups, substituted aryl groups, and $R_a$; wherein $R_a$ is selected from the group consisting of —$R_x$—O—$R_y$—$R_z$ and —$R_y$—$R_z$; $R_x$ is selected from the group consisting of alkanediyl groups and arenediyl groups; $R_z$ is selected from the group consisting of hydrogen, alkyl groups, substituted alkyl groups, acyl groups, and $R_b$; $R_b$ is a monovalent group conforming to a structure selected from the group consisting of Formula I; and $R_y$ is a divalent substituent selected from the group consisting of:

(i) divalent substituents comprising two or more divalent repeating units independently selected from repeating units conforming to the structure of Formula (C)

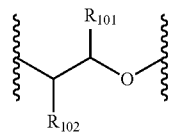 (C)

wherein $R_{101}$ and $R_{102}$ are independently selected from the group consisting of hydrogen, alkyl, hydroxyalkyl, aryl, alkoxyalkyl, and aryloxyalkyl;

(ii) divalent substituents conforming to the structure of Formula (CX)

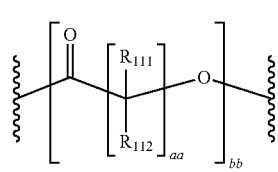 (CX)

wherein $R_{11}1$ and $R_{112}$ are independently selected from the group consisting of hydrogen, hydroxyl, and $C_1$-$C_{10}$ alkyl, aa is an integer from 1 to 12, and bb is an integer greater than or equal to 1 (e.g., from 1 to 100);

(iii) divalent substituents conforming to the structure of Formula (CXX)

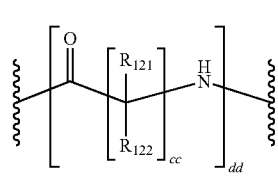 (CXX)

wherein $R_{121}$ and $R_{122}$ are independently selected from the group consisting of hydrogen, hydroxyl, and $C_1$-$C_{10}$ alkyl, cc is an integer from 1 to 12, and dd is an integer greater than or equal to 1 (e.g., from 1 to 100);

(iv) divalent substituents conforming to the structure of Formula (CXXX)

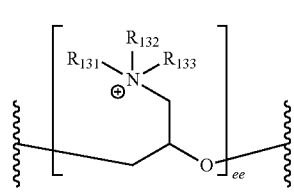 (CXXX)

wherein $R_{131}$, $R_{132}$, and $R_{133}$ are independently selected from alkyl and hydroxyalkyl, and ee is an integer greater than or equal to 1 (e.g., from 1 to 100);

(v) divalent substituents conforming to the structure of Formula (CXL)

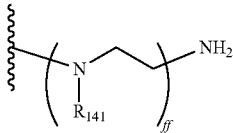
(CXL)

wherein each $R_{141}$ is independently selected from the group consisting of hydrogen and alkylamine groups, and ff is an integer greater than or equal to 1 (e.g., from 1 to 100);

(vi) divalent substituents conforming to the structure of Formula (CL)

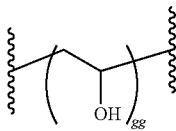
(CL)

wherein gg is an integer greater than or equal to 1 (e.g., from 1 to 100);

(vii) divalent substituents conforming to the structure of Formula (CLX)

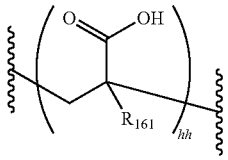
(CLX)

wherein each $R_{161}$ is independently selected from the group consisting of hydrogen and methyl, and hh is an integer greater than or equal to 1 (e.g., from 1 to 100);

(viii) divalent substituents conforming to the structure of Formula (CLXX)

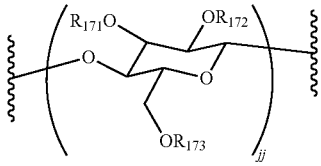
(CLXX)

wherein each $R_{171}$, $R_{172}$, and $R_{173}$ is independently selected from the group consisting of hydrogen and —$CH_2CO_2H$, and jj is an integer greater than or equal to 1 (e.g., from 1 to 100); and (ix) divalent substituents comprising two or more substituents selected from the group consisting of substituents conforming to a structure of Formula (C), (CX), (CXX), (CXXX), (CXL), (CL), (CLX), or (CLXX);

wherein at least one of $X_1$, $X_2$, $X_3$, and $R_1$-$R_{12}$ includes at least one $R_a$ group.

DETAILED DESCRIPTION

All patents, published patent applications, and any other publications mentioned in this patent application are herein incorporated entirely by reference.

Definitions

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, the terms "polyalkyleneoxy" and "polyoxyalkylene," as used interchangeably herein, generally refer to molecular structures containing the following repeating units: —$CH_2CH_2O$—, —$CH_2CH_2CH_2O$—, —$CH_2CH_2CH_2CH_2O$—, —$CH_2CH(CH_3)O$—, —$CH_2CH_2CH(CH_3)O$—, and any combinations thereof. Furthermore, the polyoxyalkylene constituent may be selected from the group consisting of one or more monomers selected from a $C_{2-20}$ alkyleneoxy group, a glycidol group, a glycidyl group, or mixtures thereof.

As used herein, unless otherwise specified, the terms "alkyl" and "alkyl capped" are intended to include $C_1$-$C_{18}$ alkyl groups, and in one aspect, $C_1$-$C_6$ alkyl groups.

As used herein, unless otherwise specified, the term "aryl" is intended to include $C_3$-$C_{12}$ aryl groups.

As used herein, unless otherwise specified, the term "arylalkyl" is intended to include $C_1$-$C_{18}$ alkyl groups and, in one aspect, $C_1$-$C_6$ alkyl groups.

The terms "ethylene oxide," "propylene oxide" and "butylene oxide" may be shown herein by their typical designation of "EO," "PO" and "BO," respectively.

As used herein, the term "laundry care composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products such as dryer added sheets.

As used herein, the term "detergent composition" is a sub-set of laundry care composition and includes cleaning compositions including but not limited to products for laundering fabrics. Such compositions may be pre-treatment composition for use prior to a washing step or may be rinse added compositions, as well as cleaning auxiliaries, such as bleach additives and "stain-stick" or pre-treat types.

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, the term "maximum extinction coefficient" is intended to describe the molar extinction coefficient at the wavelength of maximum absorption (also referred to herein as the maximum wavelength), in the range of 400 nanometers to 750 nanometers.

As used herein "average molecular weight" of the leuco colorant is reported as an average molecular weight, as determined by its molecular weight distribution: as a consequence of their manufacturing process, the leuco colorants disclosed herein may contain a distribution of repeating units in their polymeric moiety.

The test methods disclosed in the Test Methods Section of the present application should be used to determine the respective values of the parameters of Applicants' inventions.

As used herein, articles such as "a" and "an" when used in a claim, are understood to mean one or more of what is claimed or described.

As used herein, the terms "include/s" and "including" are meant to be non-limiting.

As used herein, the term "solid" includes granular, powder, bar and tablet product forms.

As used herein, the term "fluid" includes liquid, gel, paste and gas product forms.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

The present invention relates to a class of leuco colorants that may be useful for use in laundry care compositions, such as liquid laundry detergent, to provide a blue hue to whiten textile substrates. Leuco colorants are compounds that are essentially colorless or only lightly colored but are capable of developing an intense color upon activation. One advantage of using leuco compounds in laundry care compositions is that such compounds, being colorless until activated, allow the laundry care composition to exhibit its own color. The leuco colorant generally does not alter the primary color of the laundry care composition. Thus, manufacturers of such compositions can formulate a color that is most attractive to consumers without concern for added ingredients, such as bluing agents, affecting the final color value of the composition.

Another advantage of leuco colorants is found in their structure. Leuco colorants typically provide less conjugated chemical structures and larger HOMO-LUMO energy gaps. Therefore, leuco colorants tend to be more stable in the high pH environments of laundry care compositions.

It is also important to note that the polymeric form of the leuco dyes of the present invention exhibit selective fugitivity. In other words, they are designed for selective staining or non-staining characteristics in their polymeric form and to also demonstrate the color change transformation when exposed to certain physical or chemical changes. Leuco dyes include the following classes of compounds: spirobenzopyrans, spironaphthooxazines, spirothiopyrans, leuco quinones, leuco anthraquinones, thiazine leuco colorants, oxazine leuco colorants, phenanzine leuco colorants, phthalide based leucos, tetrazolium based leucos, triphenylmethanes, triarylmethanes, fluorans, and leuco diarylmethanes. A preferred class of leuco compounds includes triphenylmethane colorants. It is contemplated that the leuco colorants of the present invention may or may not be encapsulated for use depending on the desired end use of the product containing the colorants.

Triphenylmethane ("TPM") structures of the N,N disubstituted diamino and triaminophenyl methane compounds produce bluish shades that are decolorized by complexation or reaction with strong ions. Examples of suitable ions include, for example, hydroxyl ions, cyanide ions, cyanate ions, and mixtures thereof. The highly alkaline environment needed to produce hydroxyl ions is typically not suitable for products in the neutral to acidic pH range. The cyano product is colorless until exposed to ultraviolet ("UV") light. Upon exposure to UV light, the original blue color is generated and the bluing effect is observed. A laundry care composition may be colored to a consumer pleasing level, and the amount of bluing on the treated textile substrate may be adjusted to the most desirable level. It is also noted that at least some of the colorants of the present invention possess the ability to provide a latent color that is stable to conditions that degrade the colored species. For example, the triphenyl acetoniltrile leuco colorants are stable to strong base and heat while the colored versions degrade. The leuco form of methylene blue is stable to strong reducing agents while most classes of colorants are irreversibly decolorized.

In another embodiment, one approach may be to use colorless blue colorant precursors that are sensitive to oxygen. For example, methylene blue can be reduced to its colorless leuco form. For a practical application, a small amount of reducing agent can be added at the bottling stage to convert the colorant to its colorless form in the closed bottle. Suitable reducing agents include hydrosulfite, reducing sugars, and the like, and mixtures thereof. Thiazolium or other mericyanine dyes may be converted to colorless forms by ion addition.

Finally, blends of conventional optical brighteners or bluing agents and colorless bluing agent precursors can be used to provide whitening effects, whether the effect is achieved immediately upon application or whether it is formulated to provide an increased bluing effect over time or on color generating exposure.

Examples of suitable polymeric constituents that comprise the leuco polymeric colorants include polyoxyalkylene chains having multiple repeating units. Preferably the polymeric constituents include polyoxyalkylene chains having from 2 to about 100 repeating units, and more preferably from 2 to about 20 or even from about 4 to about 10 repeating units. Non-limiting examples of polyoxyalkylene chains include ethylene oxide, propylene oxide, glycidol oxide, butylene oxide and mixtures thereof.

The leuco colorant of the present invention may be characterized by the following structure:

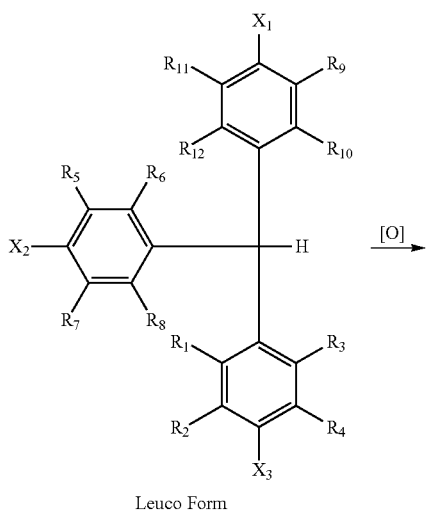

Leuco Form

-continued

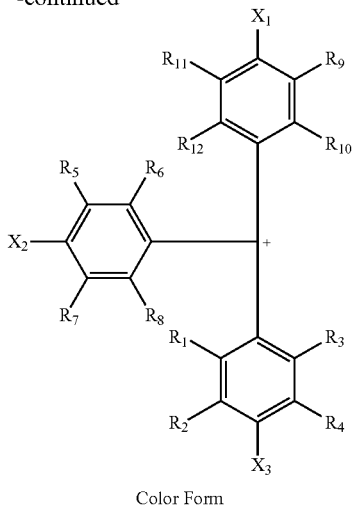

Color Form wherein $X_1$, $X_2$, $X_3$ and $R_1$ to $R_{12}$ groups are independently selected from the group consisting of halogens, hydrogen, a hydroxy group, a nitro group, alkyl groups, substituted alkyl groups, —S(O)$_2$OH, —S(O)$_2$O$^-$[M$^+$], —C(O)OR$_{13}$, —C(O)R$_{13}$, —C(O)NR$_{13}$R$_{14}$, —NC(O)OR$_{13}$, —NC(O)SR$_{13}$, —OR$_{13}$, —NR$_{13}$R$_{14}$, —S(O)$_2$R$_{13}$, —S(O)$_2$NR$_{13}$R$_{14}$, and —P(O)$_2$R$_{13}$; M is a cation; $R_{13}$ and $R_{14}$ are independently selected from the group consisting of hydrogen, alkyl groups, substituted alkyl groups, aryl groups, substituted aryl groups, and $R_a$; wherein $R_a$ is selected from the group consisting of —$R_x$—O—$R_y$—$R_z$ and —$R_y$—$R_z$; $R_x$ is selected from the group consisting of alkanediyl groups and arenediyl groups; $R_z$ is selected from the group consisting of hydrogen, alkyl groups, substituted alkyl groups, acyl groups, and $R_b$; $R_b$ is a monovalent group conforming to a structure selected from the group consisting of Formula I; and $R_y$ is a divalent substituent selected from the group consisting of:

(i) divalent substituents comprising two or more divalent repeating units independently selected from repeating units conforming to the structure of Formula (C)

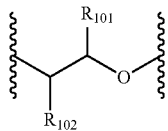

(C)

wherein $R_{101}$ and $R_{102}$ are independently selected from the group consisting of hydrogen, alkyl, hydroxyalkyl, aryl, alkoxyalkyl, and aryloxyalkyl;

(ii) divalent substituents conforming to the structure of Formula (CX)

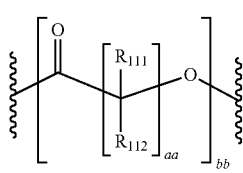

(CX)

wherein $R_{111}$ and $R_{112}$ are independently selected from the group consisting of hydrogen, hydroxyl, and $C_1$-$C_{10}$ alkyl, aa is an integer from 1 to 12, and bb is an integer greater than or equal to 1 (e.g., from 1 to 100);

(iii) divalent substituents conforming to the structure of Formula (CXX)

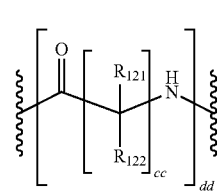

(CXX)

wherein $R_{121}$ and $R_{122}$ are independently selected from the group consisting of hydrogen, hydroxyl, and $C_1$-$C_{10}$ alkyl, cc is an integer from 1 to 12, and dd is an integer greater than or equal to 1 (e.g., from 1 to 100);

(iv) divalent substituents conforming to the structure of Formula (CXXX)

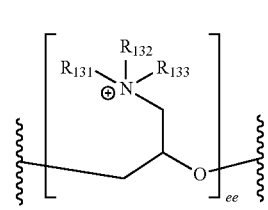

(CXXX)

wherein $R_{131}$, $R_{132}$, and $R_{133}$ are independently selected from alkyl and hydroxyalkyl, and ee is an integer greater than or equal to 1 (e.g., from 1 to 100);

(v) divalent substituents conforming to the structure of Formula (CXL)

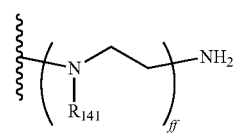

(CXL)

wherein each $R_{141}$ is independently selected from the group consisting of hydrogen and alkylamine groups, and ff is an integer greater than or equal to 1 (e.g., from 1 to 100);

(vi) divalent substituents conforming to the structure of Formula (CL)

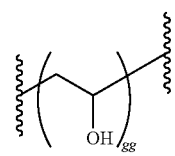

(CL)

wherein gg is an integer greater than or equal to 1 (e.g., from 1 to 100);

(vii) divalent substituents conforming to the structure of Formula (CLX)

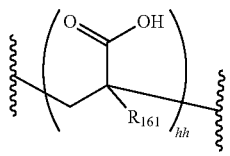

(CLX)

wherein each $R_{161}$ is independently selected from the group consisting of hydrogen and methyl, and hh is an integer greater than or equal to 1 (e.g., from 1 to 100);

(viii) divalent substituents conforming to the structure of Formula (CLXX)

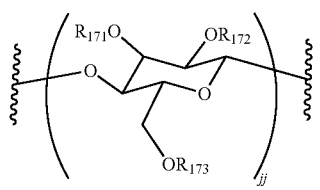

(CLXX)

wherein each $R_{171}$, $R_{172}$, and $R_{173}$ is independently selected from the group consisting of hydrogen and —$CH_2CO_2H$, and jj is an integer greater than or equal to 1 (e.g., from 1 to 100); and (ix) divalent substituents comprising two or more substituents selected from the group consisting of substituents conforming to a structure of Formula (C), (CX), (CXX), (CXXX), (CXL), (CL), (CLX), or (CLXX).

In one aspect of the invention, the sum of ff, gg, and hh in all the $X_1$-$X_3$ and $R_1$-$R_{12}$ group is from 2 to 40. In another aspect of the invention, the sum of ff, gg, and hh in all the $X_1$-$X_3$ and $R_1$-$R_{12}$ group is from 2 to 20.

The leuco dyes which are useful in this invention are also those that form a colored dye when subjected to an oxidation reaction. While some of these leuco dyes are well known in the art (e.g., The Theory of the Photographic Process, 3rd Ed., Mees and James, pp. 283-4, 390-1, Macmillion Co., N.Y.; and Light-Sensitive Systems, Kosar, pp. 367, 370-380, 406 (1965) Wiley and Sons, Inc., N.Y.), only those leuco dyes that are stable to maintain its leuco form during storage are suitable for this invention. Typically, one way to quantify whether a substance is easy to be oxidized is to use the oxidation-reduction potential or redox potential. Redox potential is measured in volts or millivolts. The more positive potential means the greater tendency for oxidized form of the specie to be reduced, and the less tendency for the reduced form to be oxidized. To prevent premature color formation, it may be preferable to use leuco dyes that have a standard redox potential in aqueous solution at neutral pH of greater than zero volts, or of greater than or equal to 0.2 volts, or of greater than or equal to 0.4 volts. For example, the redox potential of methylene blue has been reported to be about zero volt at neutral pH. Applicants' have found that methylene blue forms color during storage, which is an undesirable attribute of the present invention. The measurement of oxidation potentials is well known to the ordinarily skilled artisan. One of the many methods utilized is cyclic voltammetry as described in textbooks (e.g. Electrochemistry for Chemists, $2^{nd}$ Edition, John Wiley & Sons, N.Y., 1995).

Suitable leuco colorants are set forth in Table 1A below. The corresponding chemical names, as determined by Chem Doodle software Version 6.0 available from iChemLabs™, Cambridge, Mass., U.S.A., for such colorants are respectively provided in Table 1B below.

TABLE 1A

| Structures for Leuco Colorants |
|---|
| Examples | Structure of Leuco triphenylmethane (TPM) colorant |
| EX 1 | |

TABLE 1A-continued
Structures for Leuco Colorants
| Examples | Structure of Leuco triphenylmethane (TPM) colorant |
|---|---|
| EX 2 | 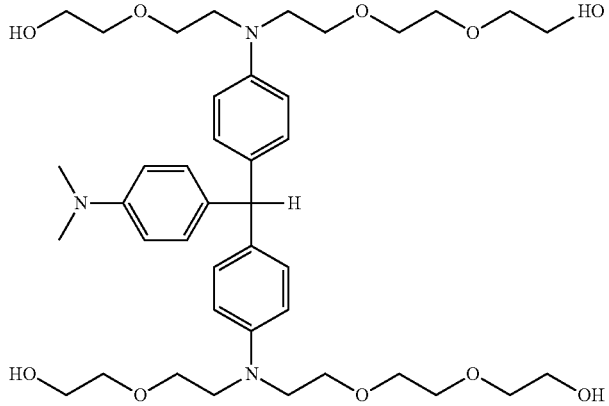 [SMILES: CN(C)c1ccc(C(c2ccc(N(CCOCCO)CCOCCOCCO)cc2)c2ccc(N(CCOCCO)CCOCCOCCO)cc2)cc1] |
| EX 3 | 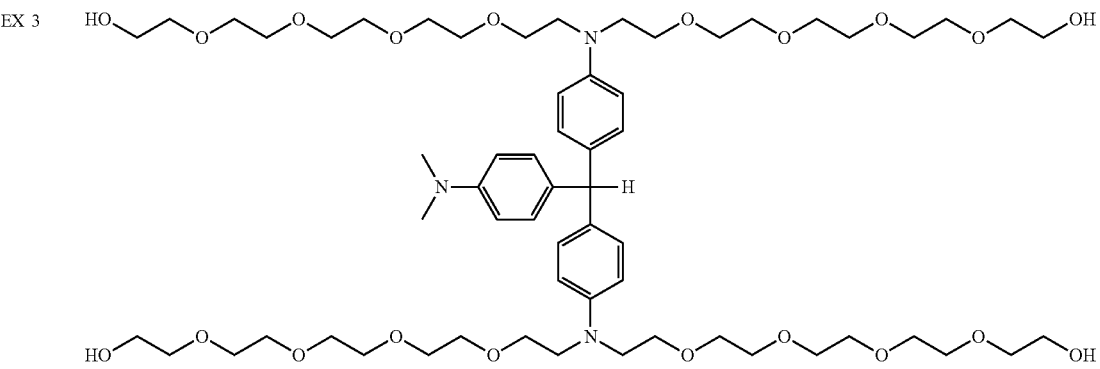 |
| EX 4 | 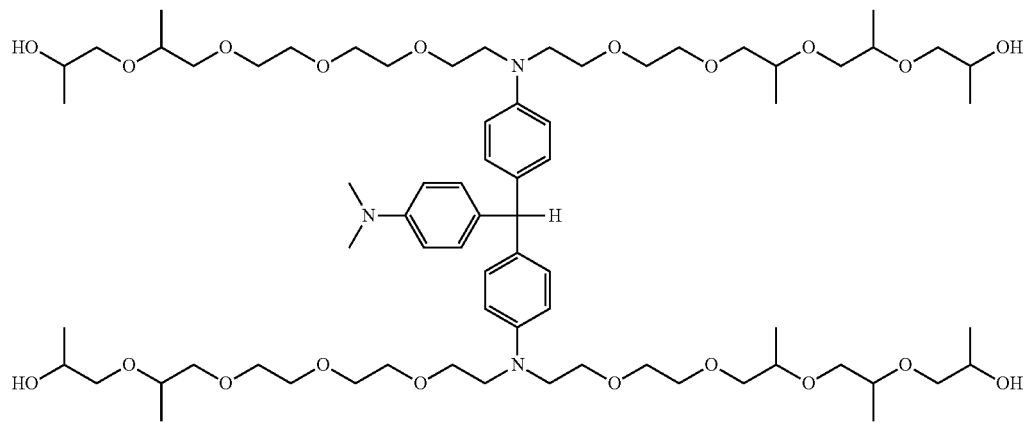 |
| EX 5 | 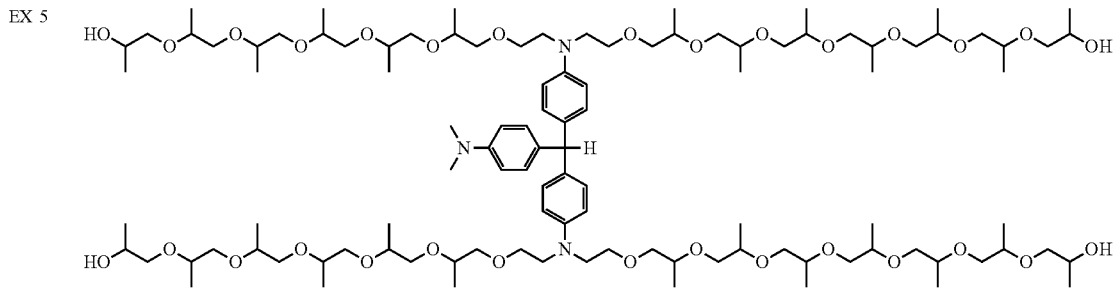 |

TABLE 1A-continued
Structures for Leuco Colorants
| Examples | Structure of Leuco triphenylmethane (TPM) colorant |
|---|---|
| EX 6 | 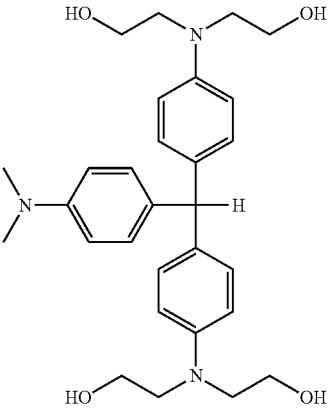 [SMILES: CN(C)c1ccc(C(c2ccc(N(CCO)CCO)cc2)c2ccc(N(CCO)CCO)cc2)cc1] |
| EX 7 | 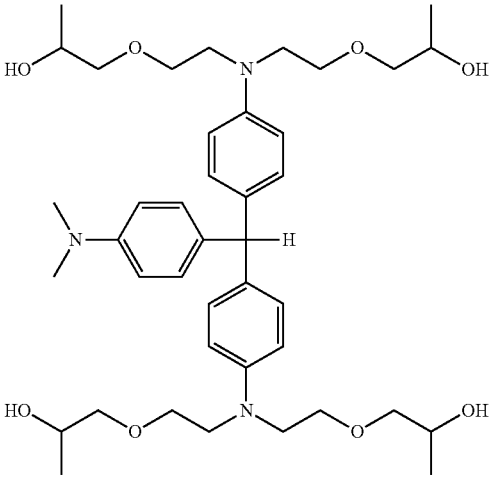 [SMILES: CC(O)COCCN(CCOCC(C)O)c1ccc(C(c2ccc(N(C)C)cc2)c2ccc(N(CCOCC(C)O)CCOCC(C)O)cc2)cc1] |
| EX 8 | 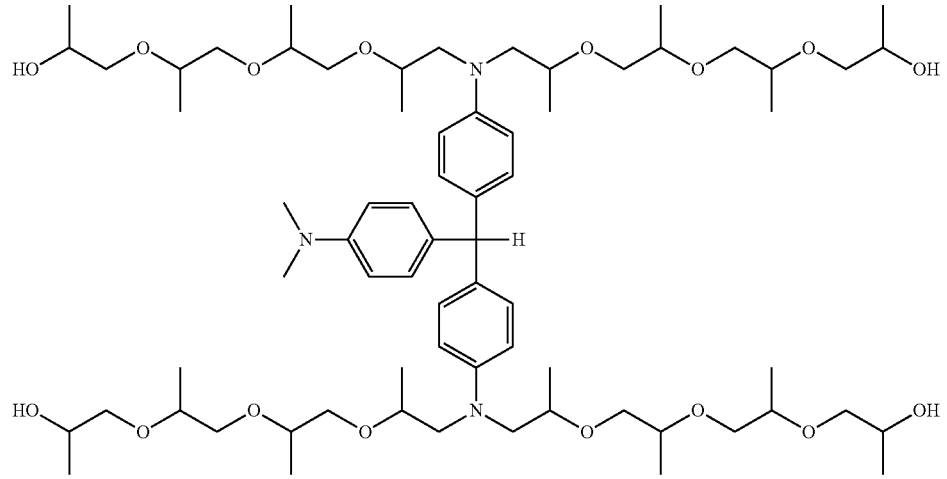 [SMILES: CC(O)COC(C)COC(C)COC(C)CN(CC(C)OCC(C)OCC(C)OCC(C)O)c1ccc(C(c2ccc(N(C)C)cc2)c2ccc(N(CC(C)OCC(C)OCC(C)OCC(C)O)CC(C)OCC(C)OCC(C)OCC(C)O)cc2)cc1] |

TABLE 1A-continued
Structures for Leuco Colorants
| Examples | Structure of Leuco triphenylmethane (TPM) colorant |
| --- | --- |
| EX 9 | 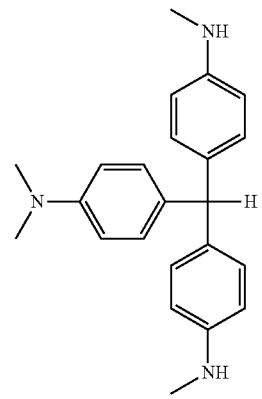 [SMILES: CNc1ccc(C(c2ccc(NC)cc2)c2ccc(N(C)C)cc2)cc1] |
| EX 10 | 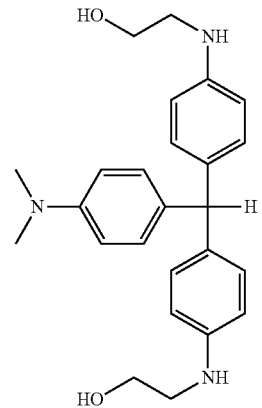 [SMILES: CN(C)c1ccc(C(c2ccc(NCCO)cc2)c2ccc(NCCO)cc2)cc1] |
| EX 11 | 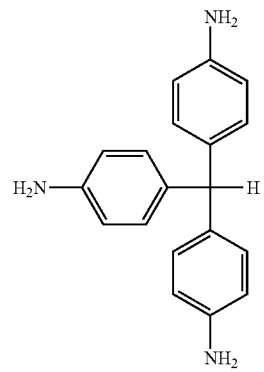 [SMILES: Nc1ccc(C(c2ccc(N)cc2)c2ccc(N)cc2)cc1] |

TABLE 1A-continued

Structures for Leuco Colorants

| Examples | Structure of Leuco triphenylmethane (TPM) colorant |
|---|---|
| EX 12 | |
| EX 13 | |
| EX 14 | |

TABLE 1B

Chemical Names for Structures Provided in Table 1A

| Example | IUPAC Name |
|---|---|
| EX1 | p-{Bis[p-(dimethylamino)phenyl]methyl}(dimethylamino)benzene |
| EX2 | 2-[2-(2-{[2-(2-Hydroxyethoxy)ethyl](p-{[p-(dimethylamino)phenyl][p-({2-[2-(2-hydroxyethoxy)ethoxy]ethyl}[2-(2-hydroxyethoxy)ethyl]amino)phenyl]methyl}phenyl)amino}ethoxy)ethoxy]ethanol |
| EX3 | 2-(2-{2-[2-(2-{[2-(2-{2-[2-(2-Hydroxyethoxy)ethoxy]ethoxy}ethoxy)ethyl]{p-[(p-{bis[2-(2-{2-[2-(2-hydroxyethoxy)ethoxy]ethoxy}ethoxy)ethyl]amino}phenyl)[p-(dimethylamino)phenyl]methyl]phenyl}amino}ethoxy)ethoxy]ethoxy}ethoxy)ethanol |
| EX4 | 1-(2-{2-[2-(2-{[2-(2-{2-[2-(2-Hydroxypropoxy)propoxy]propoxy}ethoxy)ethyl](p-{[p-(dimethylamino)phenyl](p-{[2-(2-{2-[2-(2-hydroxypropoxy)propoxy]propoxy}ethoxy)ethyl]amino}phenyl)methyl}phenyl)amino}ethoxy)ethoxy]ethoxy}-1-methylethoxy)-2-propanol |
| EX5 | 1-(2-{2-[2-(2-{[2-(2-{2-[2-(2-Hydroxypropoxy)propoxy]ethoxy}ethoxy)ethyl]{p-[(p-{bis[2-(2-{2-[2-(2-hydroxypropoxy)propoxy]propoxy}ethoxy)ethyl]amino}phenyl)[p-(dimethylamino)phenyl]methyl]phenyl}amino}ethoxy)ethoxy]ethoxy}-1-methylethoxy)-2-propanol |
| EX6 | 2-[(2-Hydroxyethyl)[p-({p-[bis(2-hydroxyethyl)amino]phenyl}[p-(dimethylamino)phenyl]methyl)phenyl]amino]ethanol |
| EX7 | 1-(2-{[2-(2-Hydroxypropoxy)ethyl]{p-[(p-{bis[2-(2-hydroxypropoxy)ethyl]amino}phenyl)[p-(dimethylamino)phenyl]methyl]phenyl}amino}ethoxy)-2-propanol |
| EX8 | 1-[2-(2-{2-[(2-{2-[2-(2-Hydroxypropoxy)propoxy]propoxy}propyl)[p-({p[bis(2-{2-[2-(2-hydroxypropoxy)propoxy]propoxy}propyl)amino]phenyl}[p-(dimethylamino)phenyl]methyl)phenyl]amino]-1-methylethoxy}-1-methylethoxy)-1-methylethoxy]-2-propanol |
| EX9 | p-{Bis[p-(methylamino)phenyl]methyl}(dimethylamino)benzene |
| EX10 | p-{Bis[p-(methylamino)phenyl]methyl}(dimethylamino)benzene |
| EX11 | p-[Bis[p-aminophenyl)methyl]benzenamine |
| EX12 | 1-(2-{[2-(2-Hydroxypropoxy)propyl]{p-[(p-{bis[2-(2-hydroxypropoxy)propyl]amino}phenyl)[p-(dimethylamino)phenyl]methyl]phenyl}amino}-1-methylethoxy)-2-propanol |
| EX13 | 1-{2-[2-({2-[2-(2-Hydroxypropoxy)propoxy]ethyl}(p-{[p-(bis{2-[2-(2-hydroxypropoxy)propoxy]ethyl}amino)phenyl][p-(dimethylamino)phenyl]methyl]phenyl)amino)ethoxy]-1-methylethoxy}-2-propanol |
| EX14 | 1-(2-{2-[2-(2-{[2-(2-{2-[2-(2-Hydroxypropoxy)propoxy]propoxy}propoxy)ethyl]{p-[(p-{bis[2-(2-{2-[2-(2-hydroxypropoxy)propoxy]propoxy}propoxy)ethyl]amino}phenyl)[p-(dimethylamino)phenyl]methyl]phenyl}amino}ethoxy)-1-methylethoxy]-1-methylethoxy}-1-methylethoxy)-2-propanol |

The Examples provided in Tables 1A and 1B are typically transformed from their colorless to colored state by oxidation. For example, Examples 1-14 can generate color upon exposure to an oxidation agent, such as oxygen, air and/or bleach.

There are multiple polymerization methods capable of preparing polymer chains attached to the leuco triphenylmethane colorants. The polymerization methods can be found in textbooks such as Principles of Polymerization, third edition, John Wiley & Sons, 1991, by George Odian. Typical polymerization methods, such as step polymerization and chain polymerization, all generate a distribution of the molecules with different degrees of polymerization. The actual polymerization reaction is rather complicated and can be nearly impossible to predict the exact distribution of the polymers nor to prepare a polymer to an exact distribution, including a real mono-distributed polymer. With some simplification, mathematical models have been developed as shown below:

1) Chain polymerization with disproportionate termination and/or chain transfer to a monomeric molecule:

$$N_i = (1-p) \times p^{(i-1)}$$

$N_i$ here is the mole fraction of the polymers containing i repeat units, i.e., degree of polymerization of i, p is the possibility of the chain propagation, which can be calculated from the ratio of the reaction rate or polymer propagation ($R_p$), transfer ($R_{tr}$), and termination ($R_t$):

$$p = \frac{Rp}{Rp + Rtr + Rt}$$

The number average degree of polymerization will be:

$$\overline{X}_n = \frac{1}{1-p}$$

In this case, for a polymer chain with average about 10 repeating units (monomer), p will be 0.9. Then the mole fraction of the polymer chains with only 1 repeat units will be about: (1−0.9)×1=0.1. That means there will be about 10% "polymers" with only one repeat unit in this distribution.

2) Chain polymerization with coupling termination:

$$N_i = (i-1) \times (1-p)^2 \times p^{(i-2)}$$

$N_i$ here is the mole fraction of the polymers containing i repeat units, i.e., degree of polymerization of i, p is the possibility of the chain propagation, which can be calculated from the ratio of the reaction rate or polymer propagation ($R_p$) and termination ($R_t$):

$$p = \frac{Rp}{Rp \mid Rt}$$

The number average degree of polymerization will be:

$$\overline{X_n} = \frac{2}{1-p}$$

In this case, for a polymer chain with average about 10 repeating units (monomer), p will be 0.8. Then the mole fraction of the polymer chains with only 2 repeat units will be about: $1\times(1-0.8)^2\times1=0.04$. That means there will be about 4% "polymers" with only 2 repeat units in this distribution.

3) Linear Step polymerization:

For a typical step polymerization with equal mole of $A_2$ and $B_2$ monomers yielding a linear polymer, then the mole fraction of the polymer with degree of polymerization of i is:

$$N_i = (1-p) \times p^{(i-1)}$$

Here p is the possibility of the chain propagation, which is also the conversion of the reaction.

The number average degree of polymerization will be:

$$\overline{X_n} = \frac{1}{1-p}$$

In this case, for a polymer chain with average about 10 repeating units (monomer), p will be 0.9. Then the mole fraction of the polymer chains with only 2 repeat units will be about: $(1-0.9)\times0.9^0=0.1$. That means there will be about 10% "polymers" with only one repeat units in this distribution.

4) Living polymerization:

For living polymerization, which meaning the polymerization does not have termination or transfer reaction, one can typically generate a much more controllable molecular weight distribution. For this reason, it is also referred to as "controlled polymerization", and the polymer is considered as "narrow distributed" or even "mono-distributed." However, this polymerization still produces polymers with a distribution, which follows Poisson distribution. The mole fraction of the polymer with degree of polymerization of i is:

$$N_i = \frac{\lambda^i}{i!} \times e^{-\lambda}$$

Here $\lambda$ is mean of the distribution, which is also the number average degree of polymerization.

In this case, for a polymer chain with average about 10 repeating units (monomer), $\lambda$ will be 10. Then the mole fraction of the polymer chains with only one repeat unit will be about: $10\times e^{-10}=0.0005$. That means there will be about 0.05% "polymers" with only one repeat units in this distribution.

The above four cases are based on mathematical models with simplification. All the above models assumes the reactivity throughout the polymerization are the same, there is no diffusion limitation during the polymerization, and the reaction rates do not change as the starting materials are consumed. The real case will be much more complicated. In the case of copolymerization, reactivity of different monomers can be very different. As a result, the polymer distribution can be bimodal and sometimes forms some "blocky" structures also known as block copolymers.

The leuco colorants of the present invention may be incorporated for use as whitening agents into a laundry care composition. Laundry care compositions include, but are not limited to, laundry detergents and fabric care compositions such as, for example, liquid and/or powder laundry detergent formulations and rinse added fabric softening (RAFS) compositions. Such compositions comprise one or more of said whitening agents and a laundry care ingredient. The whitening agent may be present in the laundry care composition in an amount from about 0.0001% to about 10% by weight of the composition, more preferably from about 0.0001% to about 5% by weight of the composition, and even more preferably from about 0.0001% to about 1% by weight of the composition.

The laundry care compositions, including laundry detergents, may be in solid or liquid form, including a gel form. The laundry detergent composition comprises a surfactant in an amount sufficient to provide desired cleaning properties. The laundry detergent composition comprises a surfactant in an amount sufficient to provide desired cleaning properties. In one embodiment, the laundry detergent composition comprises, by weight, from about 5% to about 90% of the surfactant, and more specifically from about 5% to about 70% of the surfactant, and even more specifically from about 5% to about 40%. The surfactant may comprise anionic, nonionic, cationic, zwitterionic and/or amphoteric surfactants. In a more specific embodiment, the detergent composition comprises anionic surfactant, nonionic surfactant, or mixtures thereof.

The leuco colorant may be incorporated into the composition in the form of a mixture of reaction products formed by the organic synthesis route used: such a reaction mixture will typically comprise a mixture of the dyes of formula (I) and often, in addition, reaction products of side reactions and/or minor amounts of unreacted starting materials. Although it may be preferred to remove impurities, it may not be necessary, so the mixture of reaction products may be used directly in a composition according to the invention.

Typically the leuco colorant of the present invention will be present in the composition in an amount from 0.00001 to 5 wt % of the composition, more usually in an amount from 0.0001 to 1 wt % or to 0.5 wt % of the composition.

As a result of the leuco colorant synthesis process, chemical impurities and/or intermediates may be formed. One type of impurity that may be present is the residual starting material and/or reagents for the reaction. Another source of potential impurities and/or intermediates is recognized as an oxidized version of the leuco colorants. A small amount of the leuco colorant may be oxidized when contacted with air or oxygen to form colored triphenylmethane (TPM) dyes. The colored TPM dyes can further react with other ingredients in the product and/or the detergent to form other molecules. One example discussed in the literature is the TPM carbinol formed by the reaction of TPM dyes with hydroxyl anion (Turgeon, J. D., and LaMer, V. K., J. Amer. Chem. Soc., 74, 5988, 1952). The oxidized TPM can also react with other anions to form other leuco colorants. The other anions includes but not limited to $OH^-$, $CN^-$, $HCO^-$, $Br^-$, $HSO_4^-$, $CO_3^{2-}$, citrate, $Cl^-$, $H_2PO_4^-$, $F^-$, $NO_3^-$, $NO_2^-$, $PO_4^{3-}$, $HPO_4^{2-}$, $SO_4^{2-}$, $SO_3^{2-}$, $SCN^-$, $NCO^-$, $HS^-$, $S^{2-}$, alkoxylate, amide anion, oxalate, carboxylate, and etc.

An additional source of possible impurities is the side product of the reactions. Some typical side products of the reactions taught in this invention are Michler's hydrol and Michler's ketone. Michler's hydrol can further eliminate the center hydroxyl group and form a colored cation (see chemical structures below). However, the side products will depend on the specific synthetic route of the target TPM molecules. Other synthetic routes, such as reduction of oxidized TPM, may have different intermediates. The common synthetic route for TPM molecules, as well as the intermediate during each route, can be found in the chapter of *Triphenylmethane and Related Dyes in Kirk-Othmer Encyclopedia of Chemical Technology* by John Wiley & Sons.

Another source for the impurities would be the degradation product of the leuco TPM and the corresponding colored TPM. By biodegradation, TPM can form Michler's ketone, aromatic aldehyde, and substituted or unsubstituted phenol compounds (Journal of Environmental Sciences 2011, 23(8) 1384-1393). The Michler's ketone and substituted or unsubstituted phenol compounds can also form during the TPM degradation in the presence of oxidant and light (Chemical Review, 1993, 93, 381-433). Under some oxidation conditions, the TPM can also form some benzidine and diquinoid structures (J. Am. Chem. Soc., 1964, 86 (9), pp 1666-1671). The TPM can also lose some of its substitution groups to form a different TPM molecule. In the case of crystal violet, it can lose its methyl group under light to form a series demethylated products from methyl violet 6B, methyl violet 2B, to pararosaniline. It can also lose its amino group to form diamond green structure and then to Michler's ketone (Journal of Physics: Conference Series 231 (2010) 012011).

The impurities, such as the oxidized TPM, Michler's hydrol cation, TPM carbinol, and Michler's hydrol can be intentionally added or unintentionally included to the composition with the leuco dye. When unintentionally included as the impurity of the leuco dye, they should be less than 20 wt % of the leuco colorant, preferably less than 10 wt %, and most preferably less than 5 wt %. The effects of these compounds with leuco dye included but not limited to 1) additional hueing effect beside those the leuco TPM taught in this application, and 2) aesthetic effect. The colored impurities can be used to render the composition with a more desired color. It can be used with other aesthetic dye and/or pigment to achieve more desirable effect. Another aesthetic effect is to "neutralize" the yellowish tint associated with the composition. With the small amount of oxidized TPM added with leuco TPM of this invention intentionally or unintentionally can render the composition a subtle blue hue. The subtle blue hue will balance the inherent yellowish color of the composition and make it brighter and/or whiter in consumers' perception. Use of leuco dye in this application have additional advantages. As leuco dye slowly develops, it can "neutralize" more and more yellowish color formed with time so that a prolonged whitening effect can be achieved that leads to aesthetically more appealing base.

Several of these impurities and/or intermediates are shown below:

An exemplary oxidized TPM dye:

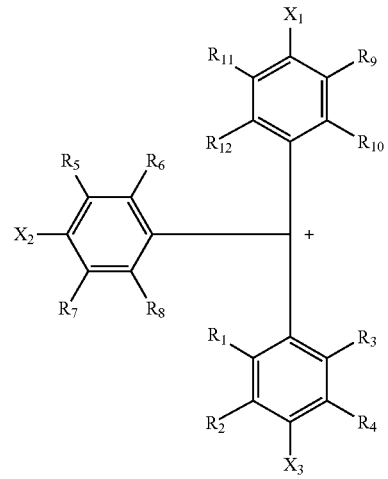

An exemplary TPM carbinol:

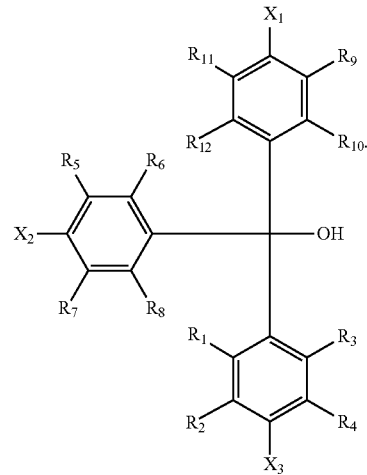

An exemplary Michler's hydrol and Michler's hydrol cation:

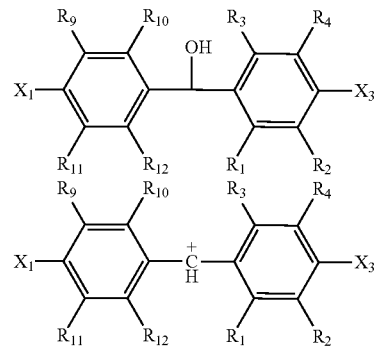

An exemplary Michler's ketone:

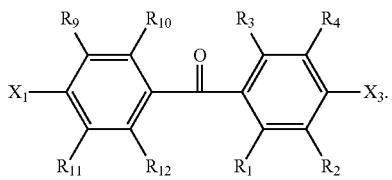

While several exemplary routes are disclosed for synthesizing the leuco colorants of the present invention, the invention should not be limited to only these examples and synthetic routes. Additional starting materials and/or reagents for different synthetic routes and/or different leuco colorants that are not exemplified herein are also contemplated to be covered by this invention.

The compositions of the present invention typically comprises, in addition to the leuco colorant, one or more laundry care adjunct materials.

Another class of ingredients in the leuco colorants product is the diluent and/or solvent. The purpose of the diluent and/or solvent is often but not limited to improving fluidity and/or reducing the viscosity of the leuco colorant. Although water is often the preferred diluent and/or solvent given its low cost and non-toxicity, other solvent may also be used as well. The preferred solvent is one having low cost and low hazards. Examples of suitable solvents include, but are not limited to, ethylene glycol, propylene glycol, glycerin, alkoxylated polymers such as polyethylene glycol, polypropylene glycol, copolymers of ethylene oxide and propylene oxide, Tween 20®, Tween 40®, Tween 80®, and the like, and combinations thereof. Among the polymers, the ethylene oxide and propylene oxide copolymers may be preferred. These polymers often feature a cloud point with water, which can help the product separated from the water to remove the undesirable water soluble impurities. Examples of ethylene oxide and propylene oxide copolymers include but not limited to the PLURONIC series polymers by BASF and TERGITOL™ series polymer and by Dow. When the leuco colorant product is incorporated into the composite materials, these polymers may also act as the non-ionic surfactant.

Laundry Care Adjunct Materials

Suitable adjuncts may be, for example to assist or enhance cleaning performance, for treatment of the substrate to be cleaned, for example by softening or freshening, or to modify the aesthetics of the composition as is the case with perfumes, colorants, non-fabric-shading dyes or the like. Suitable adjunct materials include, but are not limited to, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, fabric softeners, carriers, hydrotropes, processing aids, solvents, additional dyes and/or pigments, some of which are discussed in more detail below. In addition to the disclosure below, suitable examples of such other adjuncts and levels of use are found in U.S. Pat. Nos. 5,576,282, 6,306,812 B1 and 6,326,348 B1 that are incorporated by reference.

Additional Fabric Hueing Agents.

The composition may comprise one or more additional fabric hueing agents. Suitable fabric hueing agents include dyes, dye-clay conjugates, and pigments. Suitable dyes include those that deposit more onto cotton textiles compared to deposition onto synthetic textiles such as polyester and/or nylon. Further suitable dyes include those that deposit more onto synthetic fibers such as polyester and/or nylon compared to cotton. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof. Examples of small molecule dyes include those selected from the group consisting of Colour Index (Society of Dyers and Colourists, Bradford, UK) numbers Direct Violet 9, Direct Violet 35, Direct Violet 48, Direct Violet 51, Direct Violet 66, Direct Violet 99, Direct Blue 1, Direct Blue 71, Direct Blue 80, Direct Blue 279, Acid Red 17, Acid Red 73, Acid Red 88, Acid Red 150, Acid Violet 15, Acid Violet 17, Acid Violet 24, Acid Violet 43, Acid Red 52, Acid Violet 49, Acid Violet 50, Acid Blue 15, Acid Blue 17, Acid Blue 25, Acid Blue 29, Acid Blue 40, Acid Blue 45, Acid Blue 75, Acid Blue 80, Acid Blue 83, Acid Blue 90 and Acid Blue 113, Acid Black 1, Basic Violet 1, Basic Violet 3, Basic Violet 4, Basic Violet 10, Basic Violet 35, Basic Blue 3, Basic Blue 16, Basic Blue 22, Basic Blue 47, Basic Blue 66, Basic Blue 75, Basic Blue 159, small molecule dyes selected from the group consisting of Colour Index (Society of Dyers and Colourists, Bradford, UK) numbers Acid Violet 17, Acid Violet 43, Acid Red 52, Acid Red 73, Acid Red 88, Acid Red 150, Acid Blue 25, Acid Blue 29, Acid Blue 45, Acid Blue 113, Acid Black 1, Direct Blue 1, Direct Blue 71. Direct Violet small molecule dyes may be preferred. Dyes selected from the group consisting Acid Violet 17, Direct Blue 71, Direct Violet 51, Direct Blue 1, Acid Red 88, Acid Red 150, Acid Blue 29, Acid Blue 113 and mixtures thereof may be preferred.

Suitable polymeric dyes include polymeric dyes selected from the group consisting of polymers containing covalently bound chromogens (dye-polymer conjugates) and polymers with chromogens co-polymerized into the backbone of the polymer and mixtures thereof, and polymeric dyes selected from the group consisting of fabric-substantive colorants sold under the name of Liquitint® (Milliken & Company, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® (Milliken & Company, Spartanburg, S.C., USA) Violet CT, carboxymethyl cellulose (CMC) conjugated with a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colorants, alkoxylated thiophene polymeric colorants, and mixtures thereof. Preferred additional hueing dyes include the whitening agents found in WO 08/87497 A1. These whitening agents may be characterized by the following structure (IV):

(IV)

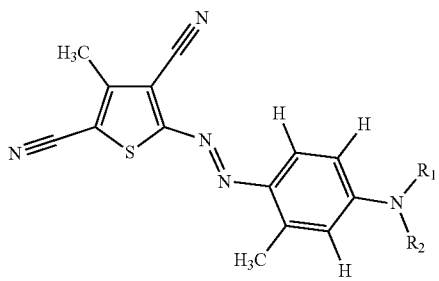

wherein $R_1$ and $R_2$ can independently be selected from:

a) $[(CH_2CR'HO)_x(CH_2CR''HO)_yH]$, wherein R' is selected from the group consisting of H, $CH_3$, $CH_2O(CH_2CH_2O)_zH$, and mixtures thereof; wherein R'' is selected from the group consisting of H, $CH_2O(CH_2CH_2O)_zH$, and mixtures thereof; wherein x+y≤5; wherein y≥1; and wherein z=0 to 5;

b) $R_1$=alkyl, aryl or aryl alkyl and $R_2$=$[(CH_2CR'HO)_x(CH_2CR''HO)_yH]$ wherein R' is selected from the group consisting of H, $CH_3$, $CH_2O(CH_2CH_2O)_zH$, and mixtures thereof; wherein R'' is selected from the group consisting of H, $CH_2O(CH_2CH_2O)_zH$, and mixtures thereof; wherein x+y≤10; wherein y≥1; and wherein z=0 to 5;

c) $R_1$=$[CH_2CH(OR_3)CH_2OR_4]$ and $R_2$=$[CH_2CH(OR_3)CH_2OR_4]$ wherein $R_3$ is selected from the group consisting of H, $(CH_2CH_2O)_zH$, and mixtures thereof; and wherein z=0 to 10;

wherein $R_4$ is selected from the group consisting of $(C_1-C_{16})$alkyl, aryl groups, and mixtures thereof; and d) wherein $R_1$ and $R_2$ can independently be selected from the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units.

A preferred additional fabric hueing agent which may be incorporated into the compositions of the invention may be characterized by the following structure (IV):

(IV)

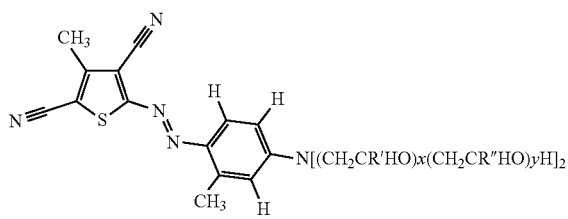

wherein R' is selected from the group consisting of H, $CH_3$, $CH_2O(CH_2CH_2O)_zH$, and mixtures thereof; wherein R'' is selected from the group consisting of H, $CH_2O(CH_2CH_2O)_zH$, and mixtures thereof; wherein x+y≤5; wherein y≥1; and wherein z=0 to 5.

A further preferred additional hueing dye may be characterized by the following structure (V):

(V)

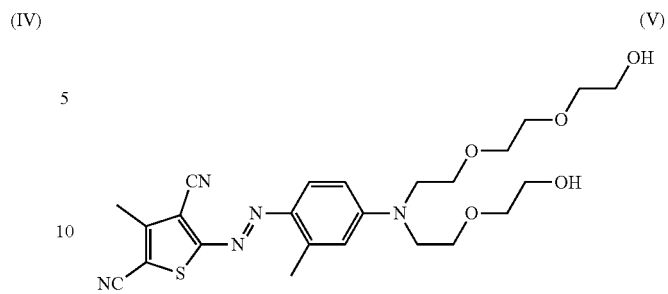

This dye is typically a mixture of compounds having an average of 3-10 EO groups, preferably 5 EO groups per molecule.

Further additional shading dyes are those described in USPN 2008 34511 A1 (Unilever). A preferred agent is "Solvent Violet 13".

In one aspect, additional hueing dyes include, without limitation, Liquitint® (Milliken & Company, Spartanburg, S.C., USA) Violet CT, Violet 200, Violet ION, E4210, Blue 452, Direct Violet 9, Direct Violet 66, Solvent Violet 13, Acid Violet 50, and mixtures thereof. Suitable additional hueing dyes are further described in one or more of the following: U.S. Pat. Nos. 7,642,282; 8,022,100; 8,138,222; 8,378,083; 8,536,218; 8,962,815; 9,028,561; 9,068,081; 9,163,146; and US Pat. Pub. Nos. 2013/0303428A1, 2014/0371435A1, and 2015/0232789A1.

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by $C_1$-$C_3$-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof. Particularly preferred are Pigment Blues 15 to 20, especially Pigment Blue 15 and/or 16. Other suitable pigments include those selected from the group consisting of Ultramarine Blue (C.I. Pigment Blue 29), Ultramarine Violet (C.I. Pigment Violet 15) and mixtures thereof. Suitable hueing agents are described in more detail in U.S. Pat. No. 7,208,459 B2, WO2012/054835, WO2009/069077, WO2012/166768.

Aesthetic Colorants.

The composition may comprise one or more aesthetic colorants. Suitable aesthetic colorants include dyes, dye-clay conjugates, pigments, and Liquitint® polymeric colorants (Milliken & Company, Spartanburg, S.C., USA). In one aspect, suitable dyes and pigments include small molecule dyes and polymeric dyes. In another aspect, the aesthetic colorants are alkoxylated versions of any of the dye molecules disclosed herein. The aesthetic colorant may include at least one chromophore constituent selected from the group consisting of acridines, anthraquinones, azines, azos, benzodifuranes, benzodifuranones, carotenoids, coumarins, cyanines, diazahemicyanines, diphenylmethanes, formazans, hemicyanines, indigoids, methanes, methines, naphthalimides, naphthoquinones, nitros, nitrosos, oxazines, phenothiazine, phthalocyanines (such as copper phthalocyanines), pyrazoles, pyrazolones, quinolones, stilbenes, styryls, triarylmethanes (such as triphenylmethanes), xanthenes, and mixtures thereof. Examples of these dyes or pigments may be selected from the group consisting of Colour Index (Society of Dyers and Colourists, Bradford, UK) numbers listed in the following table:

| CI name | Exemplary Commercial name | CI number |
|---|---|---|
| pigment blue 29 | Vibracolor Blue PBL 19 | CI77007 |
| Acid blue 182 | Iragon Blue ABL 182 | |
| Acid blue 225 | Iragon Blue ABL 225 | |
| AB80 | Iragon Blue ABL 80 | |
| PB15 | Vibracolor Blue PBL 80 | |
| pigment blue 15 | Vibracolor Blue PBL15, Vibracolor PBL15-L | CI 74160 |
| pigment blue 15:1 | | CI 74160 |
| Pigment 15:3 | Blue PBL 15:3 | CI74160 |
| Acid Blue 9 | Iragon Blue ABL 9 | CI 42090 |
| Food Blue 5 | Vibracolor Blue FBL5 | CI 42051 |
| Direct Blue 86 | Iragon Blue DBL 86 | CI 74180 |
| Pigment Green 7 | Iragon Green PGR7 | CI 74260 |
| Acid Green 25 | Vibracolor AGR25 | CI 61570 |
| Food Green 3 | Puricolor Green U3 | CI 42053 |
| Solvent Green | Puricolor Green SGR7 | CI 59040 |
| Pigment Yellow 3 | Iragon Yellow PYE3-L | CI 11710 |
| Food Yellow 13 | Vibracolor Yellow FYE13 | CI 47005 |
| Pigment Yellow 1 | Iragon Yellow PYE1-L | CI 11680 |
| Acid Yellow 17 | Vibracolor Yellow AYE17 | CI 18965 |
| Direct Yellow 13 | Vibracolor PYE 13-L | CI 21100 |
| Direct Yellow 28 | Iragon Yellow DYE28 | CI 19555 |
| Acid yellow 23 | Iragon Yellow AYE23 | CI 19140 |
| Pigment Yellow 42 | Iragon Yellow 42-L | CI 77492 |
| Food Yellow 3 | Puricolor Yellow FYE3 | CI 13015 |
| Acid Yellow 36 | Iragon Yellow AYE36 HFC | CI 13065 |
| Acid Red 14 | Puricolor Red ARE14 | CI 14720 |
| Acid Orange 7 | Puricolor Orange AOR7 FDA | CI 15510 |
| | Sanolin Lave Yellow 6X | |
| | Sanolin Lave Yellow 6A | |
| | Sanolin Lave Orange R | |
| | Sanolin Lave Red B | |
| | Sanolin Lave Pink B | |
| | Sanolin Lave Violet B | |
| | Sanolin Lave Blue A | |
| | Sanolin Lave Blue T | |
| | Sanolin Lave Blue R | |
| | Sanolin Lave Green G | |
| Acid Yellow 3 | Sanolin Yellow C-362 | CI 47005 |
| Acid Yellow 17 | Sanolin Yellow E-26L | CI 18965 |
| Acid Yellow 184 | Sanolin Brilliant Flavine, Sanolin Brilliant 86Z | |
| Direct Yellow 28 | Sanolin Yellow B6 | |
| Acid Red 52 | Sanolin Rhodamine B090, Sanolin Rhodamine C-B | CI 45100 |
| Acid Red 249 | Sanolin Brilliant Red NB6 | |
| Acid Violet 48 | Sanolin Violet 1-BL S6R | |
| Acid Violet 126 | Sanolin Violet E2R S6R | |
| Acid Blue 9 | Sanolin Blue V56, Sanolin Blue V56 liquid | CI 42090 |
| Acid Blue 80 | Sanolin Blue C-NBL S6R | CI 61585 |
| Acid Blue 182 | Sanolin Blue E-HRL | |
| Direct Blue 86 | Sanolin Fast Turquoise 6LC | CI 74180 |
| Direct Blue 199 | Sanolin Turquois FBL | |
| Acid Green 25 | Sanolin Green C-6L | CI 61570 |
| Acid Green 28 | Sanolin Brilliant Green R612, Sanolin Brilliant Green R-36 | |

In one aspect of the invention, aesthetic colorants include Liquitint® Blue AH, Liquitint® Blue BB, Liquitint® Blue 275, Liquitint® Blue 297, Liquitint® Blue BB, Cyan 15, Liquitint® Green 101, Liquitint® Orange 272, Liquitint® Orange 255, Liquitint® Pink AM, Liquitint® Pink AMC, Liquitint® Pink ST, Liquitint® Violet 129, Liquitint® Violet LS, Liquitint® Violet 291, Liquitint® Yellow FT, Liquitint® Blue Buf, Liquitint® Pink AM, Liquitint® Pink PV, Acid Blue 80, Acid Blue 182, Acid Red 33, Acid Red 52, Acid Violet 48, Acid Violet 126, Acid Blue 9, Acid Blue 1, and mixtures thereof.

Encapsulates.

The composition may comprise an encapsulated material. In one aspect, an encapsulate comprising a core, a shell having an inner and outer surface, said shell encapsulating said core. The core may comprise any laundry care adjunct, though typically the core may comprise material selected from the group consisting of perfumes; brighteners; dyes; insect repellants; silicones; waxes; flavors; vitamins; fabric softening agents; skin care agents in one aspect, paraffins; enzymes; anti-bacterial agents; bleaches; sensates; and mixtures thereof; and said shell may comprise a material selected from the group consisting of polyethylenes; polyamides; polyvinylalcohols, optionally containing other co-monomers; polystyrenes; polyisoprenes; polycarbonates; polyesters; polyacrylates; aminoplasts, in one aspect said aminoplast may comprise a polyureas, polyurethane, and/or polyureaurethane, in one aspect said polyurea may comprise polyoxymethyleneurea and/or melamine formaldehyde; polyolefins; polysaccharides, in one aspect said polysaccharide may comprise alginate and/or chitosan; gelatin; shellac; epoxy resins; vinyl polymers; water insoluble inorganics; silicone; and mixtures thereof. Preferred encapsulates comprise perfume. Preferred encapsulates comprise a shell which may comprise melamine formaldehyde and/or cross linked melamine formaldehyde. Preferred encapsulates comprise a core material and a shell, said shell at least partially surrounding said core material, is disclosed. At least 75%, 85% or even 90% of said encapsulates may have a fracture strength of from 0.2 MPa to 10 MPa, and a benefit agent leakage of from 0% to 20%, or even less than 10% or 5% based on total initial encapsulated benefit agent. Preferred are those in which at least 75%, 85% or even 90% of said encapsulates may have (i) a particle size of from 1 microns to 80 microns, 5 microns to 60 microns, from 10 microns to 50 microns, or even from 15 microns to 40 microns, and/or (ii) at least 75%, 85% or even 90% of said encapsulates may have a particle wall thickness of from 30 nm to 250 nm, from 80 nm to 180 nm, or even from 100 nm to 160 nm. Formaldehyde scavengers may be employed with the encapsulates, for example, in a capsule slurry and/or added to a composition before, during or after the encapsulates are added to such composition. Suitable capsules that can be made by following the teaching of USPA 2008/0305982 A1; and/or USPA 2009/0247449 A1. Alternatively, suitable capsules can be purchased from Appleton Papers Inc. of Appleton, Wis. USA.

In a preferred aspect the composition may comprise a deposition aid, preferably in addition to encapsulates. Preferred deposition aids are selected from the group consisting of cationic and nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or more monomers selected from the group comprising acrylic acid and acrylamide.

Perfume.

Preferred compositions of the invention comprise perfume. Typically the composition comprises a perfume that comprises one or more perfume raw materials, selected from the group as described in WO08/87497. However, any perfume useful in a laundry care composition may be used. A preferred method of incorporating perfume into the compositions of the invention is via an encapsulated perfume particle comprising either a water-soluble hydroxylic compound or melamine-formaldehyde or modified polyvinyl alcohol. In one aspect the encapsulate comprises (a) an at least partially water-soluble solid matrix comprising one or more water-soluble hydroxylic compounds, preferably starch; and (b) a perfume oil encapsulated by the solid matrix. In a further aspect the perfume may be pre-complexed with a polyamine, preferably a polyethylenimine so as to form a Schiff base.

Polymers.

The composition may comprise one or more polymers. Examples are optionally modified carboxymethylcellulose, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid copolymers.

The composition may comprise one or more amphiphilic cleaning polymers such as the compound having the following general structure: bis(($C_2H_5O$)($C_2H_4O$)n)($CH_3$)—$N^+$—$C_xH_{2x}$—$N^+$—($CH_3$)-bis(($C_2H_5O$)($C_2H_4O$)n), wherein n=from 20 to 30, and x=from 3 to 8, or sulphated or sulphonated variants thereof. In one aspect, this polymer is sulphated or sulphonated to provide a zwitterionic soil suspension polymer.

The composition preferably comprises amphiphilic alkoxylated grease cleaning polymers which have balanced hydrophilic and hydrophobic properties such that they remove grease particles from fabrics and surfaces. Preferred amphiphilic alkoxylated grease cleaning polymers comprise a core structure and a plurality of alkoxylate groups attached to that core structure. These may comprise alkoxylated polyalkylenimines, preferably having an inner polyethylene oxide block and an outer polypropylene oxide block. Typically these may be incorporated into the compositions of the invention in amounts of from 0.005 to 10 wt %, generally from 0.5 to 8 wt %.

Alkoxylated polycarboxylates such as those prepared from polyacrylates are useful herein to provide additional grease removal performance. Such materials are described in WO 91/08281 and PCT 90/01815. Chemically, these materials comprise polyacrylates having one ethoxy sidechain per every 7-8 acrylate units. The side-chains are of the formula —($CH_2CH_2O$)$_m$($CH_2$)$_n$$CH_3$ wherein m is 2-3 and n is 6-12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Mixtures of cosurfactants and other adjunct ingredients, are particularly suited to be used with an amphiphilic graft co-polymer. Preferred amphiphilic graft co-polymer(s) comprise (i) polyethyelene glycol backbone; and (ii) and at least one pendant moiety selected from polyvinyl acetate, polyvinyl alcohol and mixtures thereof. A preferred amphiphilic graft co-polymer is Sokalan HP22, supplied from BASF. Suitable polymers include random graft copolymers, preferably a polyvinyl acetate grafted polyethylene oxide copolymer having a polyethylene oxide backbone and multiple polyvinyl acetate side chains. The molecular weight of the polyethylene oxide backbone is preferably about 6000 and the weight ratio of the polyethylene oxide to polyvinyl acetate is about 40 to 60 and no more than 1 grafting point per 50 ethylene oxide units. Typically these are incorporated into the compositions of the invention in amounts from 0.005 to 10 wt %, more usually from 0.05 to 8 wt %. Preferably the composition comprises one or more carboxylate polymer, such as a maleate/acrylate random copolymer or polyacrylate homopolymer. In one aspect, the carboxylate polymer is a polyacrylate homopolymer having a molecular weight of from 4,000 Da to 9,000 Da, or from 6,000 Da to 9,000 Da. Typically these are incorporated into the compositions of the invention in amounts from 0.005 to 10 wt %, or from 0.05 to 8 wt %.

Preferably the composition comprises one or more soil release polymers. Examples include soil release polymers having a structure as defined by one of the following Formula (VI), (VII) or (VIII):

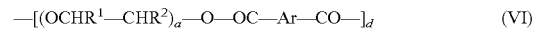  (VI)

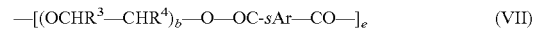  (VII)

  (VIII)

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_8$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest polymers, such as Marloquest SL supplied by Sasol.

Preferably the composition comprises one or more cellulosic polymer, including those selected from alkyl cellulose, alkyl alkoxyalkyl cellulose, carboxyalkyl cellulose, alkyl carboxyalkyl cellulose. Preferred cellulosic polymers are selected from the group comprising carboxymethyl cellulose, methyl cellulose, methyl hydroxyethyl cellulose, methyl carboxymethyl cellulose, and mixtures thereof. In one aspect, the carboxymethyl cellulose has a degree of carboxymethyl substitution from 0.5 to 0.9 and a molecular weight from 100,000 Da to 300,000 Da.

Enzymes.

Preferably the composition comprises one or more enzymes. Preferred enzymes provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, 3-glucanases, arabinosidases, hyaluronidase, chondroitinase, laccase, and amylases, or mixtures thereof. A typical combination is an enzyme cocktail that may comprise, for example, a protease and lipase in conjunction with amylase. When present in the composition, the aforementioned additional enzymes may be present at levels from about 0.00001% to about 2%, from about 0.0001% to about 1% or even from about 0.001% to about 0.5% enzyme protein by weight of the composition.

Proteases. Preferably the composition comprises one or more proteases. Suitable proteases include metalloproteases and serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii* described in U.S. Pat. No. 6,312,936 B1, U.S. Pat. Nos. 5,679,630, 4,760,025, 7,262,042 and WO09/021867.

(b) trypsin-type or chymotrypsin-type proteases, such as trypsin (e.g., of porcine or bovine origin), including the *Fusarium* protease described in WO 89/06270 and the chymotrypsin proteases derived from *Cellumonas* described in WO 05/052161 and WO 05/052146.

(c) metalloproteases, including those derived from *Bacillus amyloliquefaciens* described in WO 07/044993A2.

Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

Amylases. Preferably the composition may comprise an amylase. Suitable alpha-amylases include those of bacterial or fungal origin. Chemically or genetically modified mutants (variants) are included. A preferred alkaline alpha-amylase is derived from a strain of *Bacillus*, such as *Bacillus licheniformis, Bacillus amyloliquefaciens, Bacillus stearothermophilus, Bacillus subtilis,* or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) the variants described in WO 94/02597, WO 94/18314, WO96/23874 and WO 97/43424, especially the variants with substitutions in one or more of the following positions versus the enzyme listed as SEQ ID No. 2 in WO 96/23874: 15, 23, 105, 106, 124, 128, 133, 154, 156, 181, 188, 190, 197, 202, 208, 209, 243, 264, 304, 305, 391, 408, and 444.

(b) the variants described in U.S. Pat. No. 5,856,164 and WO99/23211, WO 96/23873, WO00/60060 and WO 06/002643, especially the variants with one or more substitutions in the following positions versus the AA560 enzyme listed as SEQ ID No. 12 in WO 06/002643:

26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 90% identity with SEQ ID No. 4 in WO06/002643, the wild-type enzyme from *Bacillus* SP722, especially variants with deletions in the 183 and 184 positions and variants described in WO 00/60060, which is incorporated herein by reference.

(d) variants exhibiting at least 95% identity with the wild-type enzyme from *Bacillus* sp.707 (SEQ ID NO:7 in U.S. Pat. No. 6,093,562), especially those comprising one or more of the following mutations M202, M208, S255, R172, and/or M261. Preferably said amylase comprises one or more of M202L, M202V, M202S, M202T, M202I, M202Q, M202W, S255N and/or R172Q. Particularly preferred are those comprising the M202L or M202T mutations.

(e) variants described in WO 09/149130, preferably those exhibiting at least 90% identity with SEQ ID NO: 1 or SEQ ID NO:2 in WO 09/149130, the wild-type enzyme from *Geobacillus stearophermophilus* or a truncated version thereof.

Suitable commercially available alpha-amylases include DURAMYL®, LIQUEZYME®, TERMAMYL®, TERMAMYL ULTRA®, NATALASE®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE® and PURASTAR OXAM® (Genencor International Inc., Palo Alto, Calif.) and KAM® (Kao, 14-10 Nihonbashi Kayabacho, 1-chome, Chuo-ku Tokyo 103-8210, Japan). In one aspect, suitable amylases include NATALASE®, STAINZYME® and STAINZYME PLUS® and mixtures thereof.

Lipases. Preferably the invention comprises one or more lipases, including "first cycle lipases" such as those described in U.S. Pat. No. 6,939,702 B1 and US PA 2009/0217464. Preferred lipases are first-wash lipases. In one embodiment of the invention the composition comprises a first wash lipase. First wash lipases includes a lipase which is a polypeptide having an amino acid sequence which: (a) has at least 90% identity with the wild-type lipase derived from Humicola lanuginosa strain DSM 4109; (b) compared to said wild-type lipase, comprises a substitution of an electrically neutral or negatively charged amino acid at the surface of the three-dimensional structure within 15A of E1 or Q249 with a positively charged amino acid; and (c) comprises a peptide addition at the C-terminal; and/or (d) comprises a peptide addition at the N-terminal and/or (e) meets the following limitations: i) comprises a negative amino acid in position E210 of said wild-type lipase; ii) comprises a negatively charged amino acid in the region corresponding to positions 90-101 of said wild-type lipase; and iii) comprises a neutral or negative amino acid at a position corresponding to N94 or said wild-type lipase and/or has a negative or neutral net electric charge in the region corresponding to positions 90-101 of said wild-type lipase. Preferred are variants of the wild-type lipase from Thermomyces lanuginosus comprising one or more of the T231 R and N233R mutations. The wild-type sequence is the 269 amino acids (amino acids 23-291) of the Swissprot accession number Swiss-Prot 059952 (derived from Thermomyces lanuginosus (Humicola lanuginosa)). Preferred lipases would include those sold under the tradenames Lipex® and Lipolex® and Lipoclean®.

Endoglucanases. Other preferred enzymes include microbial-derived endoglucanases exhibiting endo-beta-1,4-glucanase activity (E.C. 3.2.1.4), including a bacterial polypeptide endogenous to a member of the genus Bacillus which has a sequence of at least 90%, 94%, 97% and even 99% identity to the amino acid sequence SEQ ID NO:2 in U.S. Pat. No. 7,141,403B2) and mixtures thereof. Suitable endoglucanases are sold under the tradenames Celluclean® and Whitezyme® (Novozymes A/S, Bagsvaerd, Denmark).

Pectate Lyases. Other preferred enzymes include pectate lyases sold under the tradenames Pectawash®, Pectaway®, Xpect® and mannanases sold under the tradenames Mannaway® (all from Novozymes A/S, Bagsvaerd, Denmark), and Purabrite® (Genencor International Inc., Palo Alto, Calif.).

Bleaching Agents. It may be preferred for the composition to comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent or mixtures of bleaching agents by weight of the subject composition. Examples of suitable bleaching agents include:

(1) photobleaches for example sulfonated zinc phthalocyanine sulfonated aluminium phthalocyanines, xanthene dyes and mixtures thereof;

(2) pre-formed peracids: Suitable preformed peracids include, but are not limited to compounds selected from the group consisting of pre-formed peroxyacids or salts thereof typically a percarboxylic acids and salts, percarbonic acids and salts, perimidic acids and salts, peroxymonosulfuric acids and salts, for example, Oxone®, and mixtures thereof. Suitable examples include peroxycarboxylic acids or salts thereof, or peroxysulphonic acids or salts thereof. Typical peroxycarboxylic acid salts suitable for use herein have a chemical structure corresponding to the following chemical formula:

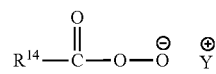

wherein: $R^{14}$ is selected from alkyl, aralkyl, cycloalkyl, aryl or heterocyclic groups; the $R^{14}$ group can be linear or branched, substituted or unsubstituted; having, when the peracid is hydrophobic, from 6 to 14 carbon atoms, or from 8 to 12 carbon atoms and, when the peracid is hydrophilic, less than 6 carbon atoms or even less than 4 carbon atoms and Y is any suitable counter-ion that achieves electric charge neutrality, preferably Y is selected from hydrogen, sodium or potassium. Preferably, $R^{14}$ is a linear or branched, substituted or unsubstituted $C_{6-9}$ alkyl. Preferably, the peroxyacid or salt thereof is selected from peroxyhexanoic acid, peroxyheptanoic acid, peroxyoctanoic acid, peroxynonanoic acid, peroxydecanoic acid, any salt thereof, or any combination thereof. Particularly preferred peroxyacids are phthalimido-peroxy-alkanoic acids, in particular ε-phthalimido peroxy hexanoic acid (PAP). Preferably, the peroxyacid or salt thereof has a melting point in the range of from 30° C. to 60° C.

The pre-formed peroxyacid or salt thereof can also be a peroxysulphonic acid or salt thereof, typically having a chemical structure corresponding to the following chemical formula:

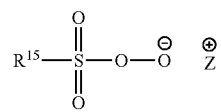

wherein: $R^{15}$ is selected from alkyl, aralkyl, cycloalkyl, aryl or heterocyclic groups; the $R^{15}$ group can be linear or branched, substituted or unsubstituted; and Z is any suitable counter-ion that achieves electric charge neutrality, preferably Z is selected from hydrogen, sodium or potassium. Preferably $R^{15}$ is a linear or branched, substituted or unsubstituted $C_{4-14}$, preferably $C_{6-14}$ alkyl. Preferably such bleach components may be present in the compositions of the invention in an amount from 0.01 to 50%, most preferably from 0.1% to 20%.

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall fabric and home care product and are typically incorporated into such fabric and home care products as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C=O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject composition may comprise NOBS, TAED or mixtures thereof.

(5) Bleach Catalysts. The compositions of the present invention may also include one or more bleach catalysts capable of accepting an oxygen atom from a peroxyacid and/or salt thereof, and transferring the oxygen atom to an oxidizeable substrate. Suitable bleach catalysts include, but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and alpha amino-ketones and mixtures thereof. Suitable alpha amino ketones are for example as described in WO 2012/000846 A1, WO 2008/015443 A1, and WO 2008/014965 A1. Suitable mixtures are as described in USPA 2007/0173430 A1.

Without wishing to be bound by theory, the inventors believe that controlling the electrophilicity and hydrophobicity in this above described manner enables the bleach ingredient to be delivered substantially only to areas of the fabric that are more hydrophobic, and that contain electron rich soils, including visible chromophores, that are susceptible to bleaching by highly electrophilic oxidants.

In one aspect, the bleach catalyst has a structure corresponding to general formula below:

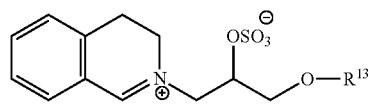

wherein $R^{13}$ is selected from the group consisting of 2-ethylhexyl, 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl;

(6) The composition may preferably comprise catalytic metal complexes. One preferred type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2]hexadecane.

Suitable transition metal MRLs are readily prepared by known procedures, such as taught for example in WO 00/32601, and U.S. Pat. No. 6,225,464.

When present, the source of hydrogen peroxide/peracid and/or bleach activator is generally present in the composition in an amount of from about 0.1 to about 60 wt %, from about 0.5 to about 40 wt % or even from about 0.6 to about 10 wt % based on the fabric and home care product. One or more hydrophobic peracids or precursors thereof may be used in combination with one or more hydrophilic peracid or precursor thereof.

Typically hydrogen peroxide source and bleach activator will be incorporated together. The amounts of hydrogen peroxide source and peracid or bleach activator may be selected such that the molar ratio of available oxygen (from the peroxide source) to peracid is from 1:1 to 35:1, or even 2:1 to 10:1.

Surfactant. Preferably the composition comprises a surfactant or surfactant system. The surfactant can be selected from nonionic, anionic, cationic, amphoteric, ampholytic, amphiphilic, zwitterionic, semi-polar nonionic surfactants and mixtures thereof. Preferred compositions comprise a mixture of surfactants/surfactant system. Preferred surfactant systems comprise one or more anionic surfactants, most preferably in combination with a co-surfactant, most preferably a nonionic and/or amphoteric and/or zwitterionic surfactant. Preferred surfactant systems comprise both anionic and nonionic surfactant, preferably in weight ratios from 90:1 to 1:90. In some instances a weight ratio of anionic to nonionic surfactant of at least 1:1 is preferred. However a ratio below 10:1 may be preferred. When present, the total surfactant level is preferably from 0.1% to 60%, from 1% to 50% or even from 5% to 40% by weight of the subject composition.

Preferably the composition comprises an anionic detersive surfactant, preferably sulphate and/or sulphonate surfactants. Preferred examples include alkyl benzene sulphonates, alkyl sulphates and alkyl alkoxylated sulphates. Preferred sulphonates are $C_{10-13}$ alkyl benzene sulphonate. Suitable alkyl benzene sulphonate (LAS) may be obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

Preferred sulphate detersive surfactants include alkyl sulphate, typically $C_{8-18}$ alkyl sulphate, or predominantly $C_{12}$ alkyl sulphate. A further preferred alkyl sulphate is alkyl alkoxylated sulphate, preferably a $C_{8-18}$ alkyl alkoxylated sulphate. Preferably the alkoxylating group is an ethoxylating group. Typically the alkyl alkoxylated sulphate has an average degree of alkoxylation of from 0.5 to 30 or 20, or from 0.5 to 10. Particularly preferred are $C_{8-18}$ alkyl ethoxylated sulphate having an average degree of ethoxylation of from 0.5 to 10, from 0.5 to 7, from 0.5 to 5 or even from 0.5 to 3.

The alkyl sulphate, alkyl alkoxylated sulphate and alkyl benzene sulphonates may be linear or branched, substituted or un-substituted. When the surfactant is branched, preferably the surfactant will comprise a mid-chain branched sulphate or sulphonate surfactant. Preferably the branching groups comprise $C_{1-4}$ alkyl groups, typically methyl and/or ethyl groups.

Preferably the composition comprises a nonionic detersive surfactant. Suitable non-ionic surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein the alkoxylate units may be ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, typically having an average degree of alkoxylation of from 1 to 30; alkylpolysaccharides, in one aspect, alkylpolyglycosides; polyhydroxy fatty acid amides; ether capped poly(oxyalkylated) alcohol surfactants; and mixtures thereof.

Suitable non-ionic detersive surfactants include alkyl polyglucoside and/or an alkyl alkoxylated alcohol.

In one aspect, non-ionic detersive surfactants include alkyl alkoxylated alcohols, in one aspect $C_{8-18}$ alkyl alkoxylated alcohol, for example a $C_{8-18}$ alkyl ethoxylated alcohol, the alkyl alkoxylated alcohol may have an average degree of alkoxylation of from 1 to 80, preferably from 1 to 50, most preferably from 1 to 30, from 1 to 20, or from 1 to 10. In one aspect, the alkyl alkoxylated alcohol may be a $C_{8-18}$ alkyl ethoxylated alcohol having an average degree of ethoxylation of from 1 to 10, from 1 to 7, more from 1 to 5 or from 3 to 7, or even below 3 or 2. The alkyl alkoxylated alcohol can be linear or branched, and substituted or un-substituted.

Suitable nonionic surfactants include those with the trade name Lutensol® from BASF.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

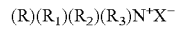

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Suitable amphoteric/zwitterionic surfactants include amine oxides and betaines.

Amine-neutralized anionic surfactants—Anionic surfactants of the present invention and adjunct anionic cosurfactants, may exist in an acid form, and said acid form may be neutralized to form a surfactant salt which is desirable for use in the present detergent compositions. Typical agents for neutralization include the metal counterion base such as hydroxides, e.g., NaOH or KOH. Further preferred agents for neutralizing anionic surfactants of the present invention and adjunct anionic surfactants or cosurfactants in their acid forms include ammonia, amines, or alkanolamines. Alkanolamines are preferred. Suitable non-limiting examples including monoethanolamine, diethanolamine, triethanolamine, and other linear or branched alkanolamines known in the art; for example, highly preferred alkanolamines include 2-amino-1-propanol, 1-aminopropanol, monoisopropanolamine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

Builders. Preferably the composition comprises one or more builders or a builder system. When a builder is used, the composition of the invention will typically comprise at least 1%, from 2% to 60% builder. It may be preferred that the composition comprises low levels of phosphate salt and/or zeolite, for example from 1 to 10 or 5 wt %. The composition may even be substantially free of strong builder; substantially free of strong builder means "no deliberately added" zeolite and/or phosphate. Typical zeolite builders include zeolite A, zeolite P and zeolite MAP. A typical phosphate builder is sodium tri-polyphosphate.

Chelating Agent. Preferably the composition comprises chelating agents and/or crystal growth inhibitor. Suitable molecules include copper, iron and/or manganese chelating agents and mixtures thereof. Suitable molecules include aminocarboxylates, aminophosphonates, succinates, salts thereof, and mixtures thereof. Non-limiting examples of suitable chelants for use herein include ethylenediaminetetracetates, N-(hydroxyethyl)ethylenediaminetriacetates, nitrilotriacetates, ethylenediamine tetraprorpionates, triethylenetetraaminehexacetates, diethylenetriamine-pentaacetates, ethanoldiglycines, ethylenediaminetetrakis (methylenephosphonates), diethylenetriamine penta(methylene phosphonic acid) (DTPMP), ethylenediamine disuccinate (EDDS), hydroxyethanedimethylenephosphonic acid (HEDP), methylglycinediacetic acid (MGDA), diethylenetriaminepentaacetic acid (DTPA), salts thereof, and mixtures thereof. Other nonlimiting examples of chelants of use in the present invention are found in U.S. Pat. Nos. 7,445,644, 7,585,376 and 2009/0176684A1. Other suitable chelating agents for use herein are the commercial DEQUEST series, and chelants from Monsanto, DuPont, and Nalco, Inc.

Dye Transfer Inhibitor (DTI). The composition may comprise one or more dye transfer inhibiting agents. In one embodiment of the invention the inventors have surprisingly found that compositions comprising polymeric dye transfer inhibiting agents in addition to the specified dye give improved performance. This is surprising because these polymers prevent dye deposition. Suitable dye transfer inhibitors include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Suitable examples include PVP-K15, PVP-K30, ChromaBond S-400, ChromaBond S-403E and Chromabond S-100 from Ashland Aqualon, and Sokalan HP165, Sokalan HP50, Sokalan HP53, Sokalan HP59, Sokalan® HP 56K, Sokalan® HP 66 from BASF. Other suitable DTIs are as described in WO2012/004134. When present in a subject composition, the dye transfer inhibiting agents may be present at levels from about 0.0001% to about 10%, from about 0.01% to about 5% or even from about 0.1% to about 3% by weight of the composition.

Fluorescent Brightener. Preferably the composition comprises one or more fluorescent brightener. Commercial optical brighteners which may be useful in the present invention can be classified into subgroups, which include, but are not limited to, derivatives of stilbene, pyrazoline, coumarin, carboxylic acid, methinecyanines, dibenzothiophene-5,5-dioxide, azoles, 5- and 6-membered-ring heterocycles, and other miscellaneous agents. Particularly preferred brighteners are selected from: sodium 2 (4-styryl-3-sulfophenyl)-2H-napthol [1,2-d] triazole, disodium 4,4'-bis{[(4-anilino-6-(N methyl-N-2 hydroxyethyl) amino 1,3,5-triazin-2-yl)] amino}stilbene-2-2-disulfonate, disodium 4,4'-bis{[(4-anilino-6-morpholino-I,3,5-triazin-2-yl)] amino} stilbene-2-2' disulfonate, and disodium 4,4'-bis (2-sulfostyryl) biphenyl. Other examples of such brighteners are disclosed in "The Production and Application of Fluorescent Brightening Agents", M. Zahradnik, Published by John Wiley & Sons, New York (1982). Specific nonlimiting examples of optical brighteners which are useful in the present compositions are those identified in U.S. Pat. Nos. 4,790,856 and 3,646,015.

A preferred brightener has the structure below:

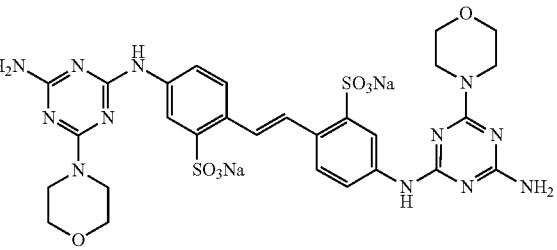

Suitable fluorescent brightener levels include lower levels of from about 0.01, from about 0.05, from about 0.1 or even from about 0.2 wt % to upper levels of 0.5 or even 0.75 wt %.

In one aspect the brightener may be loaded onto a clay to form a particle.

Preferred brighteners are totally or predominantly (typically at least 50 wt %, at least 75 wt %, at least 90 wt %, at least 99 wt %), in alpha-crystalline form. A highly preferred brightener comprises C.I. fluorescent brightener 260, preferably having the following structure:

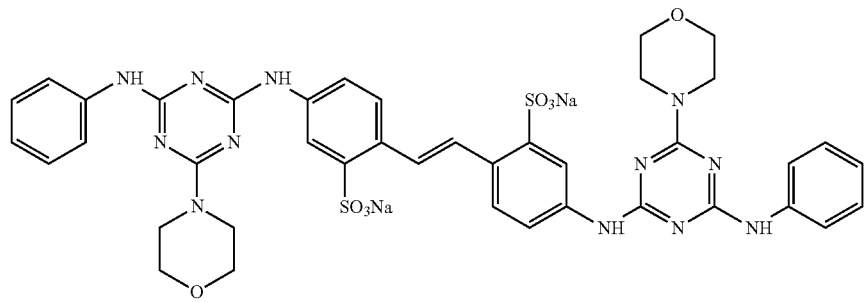

This can be particularly useful as it dissolves well in cold water, for example below 30° C. or 25° C. or even 20° C.

Preferably brighteners are incorporated in the composition in micronized particulate form, most preferably having a weight average primary particle size of from 3 to 30 micrometers, from 3 micrometers to 20 micrometers, or from 3 to 10 micrometers.

The composition may comprise C.I. fluorescent brightener 260 in beta-crystalline form, and the weight ratio of: (i) C.I. fluorescent brightener 260 in alpha-crystalline form, to (ii) C.I. fluorescent brightener 260 in beta-crystalline form may be at least 0.1, or at least 0.6.

BE680847 relates to a process for making C.I fluorescent brightener 260 in alpha-crystalline form.

Silicate Salts. The composition may preferably also contain silicate salts, such as sodium or potassium silicate. The composition may comprise from 0 wt % to less than 10 wt % silicate salt, to 9 wt %, or to 8 wt %, or to 7 wt %, or to 6 wt %, or to 5 wt %, or to 4 wt %, or to 3 wt %, or even to 2 wt %, and preferably from above 0 wt %, or from 0.5 wt %, or even from 1 wt % silicate salt. A suitable silicate salt is sodium silicate.

Dispersants. The composition may preferably also contain dispersants. Suitable water-soluble organic materials include the homo- or co-polymeric acids or their salts, in which the polycarboxylic acid comprises at least two carboxyl radicals separated from each other by not more than two carbon atoms.

Enzyme Stabilizers. The composition may preferably comprise enzyme stabilizers. Any conventional enzyme stabilizer may be used, for example by the presence of water-soluble sources of calcium and/or magnesium ions in the finished fabric and home care products that provide such ions to the enzymes. In case of aqueous compositions comprising protease, a reversible protease inhibitor, such as a boron compound including borate, or preferably 4-formyl phenylboronic acid, phenylboronic acid and derivatives thereof, or compounds such as calcium formate, sodium formate and 1,2-propane diol can be added to further improve stability.

Solvent System. The solvent system in the present compositions can be a solvent system containing water alone or mixtures of organic solvents either without or preferably with water. Preferred organic solvents include 1,2-propanediol, ethanol, glycerol, dipropylene glycol, methyl propane diol and mixtures thereof. Other lower alcohols, $C_1$-$C_4$ alkanolamines such as monoethanolamine and triethanolamine, can also be used. Solvent systems can be absent, for example from anhydrous solid embodiments of the invention, but more typically are present at levels in the range of from about 0.1% to about 98%, preferably at least about 1% to about 50%, more usually from about 5% to about 25%.

In some embodiments of the invention, the composition is in the form of a structured liquid. Such structured liquids can either be internally structured, whereby the structure is formed by primary ingredients (e.g. surfactant material) and/or externally structured by providing a three dimensional matrix structure using secondary ingredients (e.g. polymers, clay and/or silicate material), for use e.g. as thickeners. The composition may comprise a structurant, preferably from 0.01 wt % to 5 wt %, from 0.1 wt % to 2.0 wt % structurant. Examples of suitable structurants are given in US2006/0205631A1, US2005/0203213A1, U.S. Pat. Nos. 7,294,611, 6,855,680. The structurant is typically selected from the group consisting of diglycerides and triglycerides, ethylene glycol distearate, microcrystalline cellulose, cellulose-based materials, microfiber cellulose, hydrophobically modified alkali-swellable emulsions such as Polygel W30 (3VSigma), biopolymers, xanthan gum, gellan gum, hydrogenated castor oil, derivatives of hydrogenated castor oil such as non-ethoxylated derivatives thereof and mixtures thereof, in particular, those selected from the group of hydrogenated castor oil, derivatives of hydrogenated castor oil, microfibullar cellulose, hydroxyfunctional crystalline materials, long chain fatty alcohols, 12-hydroxystearic acids, clays and mixtures thereof. A preferred structurant is described in U.S. Pat. No. 6,855,680 which defines suitable hydroxyfunctional crystalline materials in detail. Preferred is hydrogenated castor oil. Some structurants have a thread-like structuring system having a range of aspect ratios. Other suitable structurants and the processes for making them are described in WO2010/034736.

The composition of the present invention may comprise a high melting point fatty compound. The high melting point fatty compound useful herein has a melting point of 25° C. or higher, and is selected from the group consisting of fatty alcohols, fatty acids, fatty alcohol derivatives, fatty acid derivatives, and mixtures thereof. Such compounds of low melting point are not intended to be included in this section. Non-limiting examples of the high melting point compounds are found in International Cosmetic Ingredient Dictionary, Fifth Edition, 1993, and CTFA Cosmetic Ingredient Handbook, Second Edition, 1992. When present, the high melting point fatty compound is preferably included in the composition at a level of from 0.1% to 40%, preferably from 1% to 30%, more preferably from 1.5% to 16% by weight of the composition, from 1.5% to 8% in view of providing improved conditioning benefits such as slippery feel during the application to wet hair, softness and moisturized feel on dry hair.

Cationic Polymer. The compositions of the present invention may contain a cationic polymer. Concentrations of the cationic polymer in the composition typically range from 0.05% to 3%, in another embodiment from 0.075% to 2.0%, and in yet another embodiment from 0.1% to 1.0%. Suitable cationic polymers will have cationic charge densities of at least 0.5 meq/gm, in another embodiment at least 0.9 meq/gm, in another embodiment at least 1.2 meq/gm, in yet another embodiment at least 1.5 meq/gm, but in one embodiment also less than 7 meq/gm, and in another embodiment less than 5 meq/gm, at the pH of intended use of the composition, which pH will generally range from pH 3 to pH 9, in one embodiment between pH 4 and pH 8. Herein, "cationic charge density" of a polymer refers to the ratio of the number of positive charges on the polymer to the molecular weight of the polymer. The average molecular weight of such suitable cationic polymers will generally be between 10,000 and 10 million, in one embodiment between 50,000 and 5 million, and in another embodiment between 100,000 and 3 million.

Suitable cationic polymers for use in the compositions of the present invention contain cationic nitrogen-containing moieties such as quaternary ammonium or cationic protonated amino moieties. Any anionic counterions can be used in association with the cationic polymers so long as the polymers remain soluble in water, in the composition, or in a coacervate phase of the composition, and so long as the counterions are physically and chemically compatible with the essential components of the composition or do not otherwise unduly impair product performance, stability or aesthetics. Nonlimiting examples of such counterions include halides (e.g., chloride, fluoride, bromide, iodide), sulfate and methylsulfate.

Nonlimiting examples of such polymers are described in the CTFA Cosmetic Ingredient Dictionary, 3rd edition, edited by Estrin, Crosley, and Haynes, (The Cosmetic, Toiletry, and Fragrance Association, Inc., Washington, D.C. (1982)).

Other suitable cationic polymers for use in the composition include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Complex coacervates of the cationic polymer can also be formed with other charged materials in the composition.

Suitable cationic polymers are described in U.S. Pat. Nos. 3,962,418; 3,958,581; and U.S. Publication No. 2007/0207109A1.

Nonionic Polymer. The composition of the present invention may include a nonionic polymer as a conditioning agent. Polyalkylene glycols having a molecular weight of more than 1000 are useful herein. Useful are those having the following general formula:

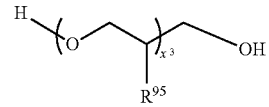

wherein $R^{95}$ is selected from the group consisting of H, methyl, and mixtures thereof. Conditioning agents, and in particular silicones, may be included in the composition. The conditioning agents useful in the compositions of the present invention typically comprise a water insoluble, water dispersible, non-volatile, liquid that forms emulsified, liquid particles. Suitable conditioning agents for use in the composition are those conditioning agents characterized generally as silicones (e.g., silicone oils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein. Such conditioning agents should be physically and chemically compatible with the essential components of the composition, and should not otherwise unduly impair product stability, aesthetics or performance.

The concentration of the conditioning agent in the composition should be sufficient to provide the desired conditioning benefits. Such concentration can vary with the conditioning agent, the conditioning performance desired, the average size of the conditioning agent particles, the type and concentration of other components, and other like factors.

The concentration of the silicone conditioning agent typically ranges from about 0.01% to about 10%. Non-limiting examples of suitable silicone conditioning agents, and optional suspending agents for the silicone, are described in U.S. Reissue Pat. No. 34,584, U.S. Pat. Nos. 5,104,646; 5,106,609; 4,152,416; 2,826,551; 3,964,500; 4,364,837; 6,607,717; 6,482,969; 5,807,956; 5,981,681; 6,207,782; 7,465,439; 7,041,767; 7,217,777; US Patent Application Nos. 2007/0286837A1; 2005/0048549A1; 2007/0041929A1; British Pat. No. 849,433; German Patent No. DE 10036533, which are all incorporated herein by reference; Chemistry and Technology of Silicones, New York: Academic Press (1968); General Electric Silicone Rubber Product Data Sheets SE 30, SE 33, SE 54 and SE 76; Silicon Compounds, Petrarch Systems, Inc. (1984); and in Encyclopedia of Polymer Science and Engineering, vol. 15, 2d ed., pp 204-308, John Wiley & Sons, Inc. (1989).

Organic Conditioning Oil. The compositions of the present invention may also comprise from about 0.05% to about 3% of at least one organic conditioning oil as the conditioning agent, either alone or in combination with other conditioning agents, such as the silicones (described herein). Suitable conditioning oils include hydrocarbon oils, polyolefins, and fatty esters. Also suitable for use in the compositions herein are the conditioning agents described by the Procter & Gamble Company in U.S. Pat. Nos. 5,674,478, and 5,750,122. Also suitable for use herein are those conditioning agents described in U.S. Pat. Nos. 4,529,586, 4,507,280, 4,663,158, 4,197,865, 4,217, 914, 4,381,919, and 4,422, 853.

Hygiene Agent. The compositions of the present invention may also comprise components to deliver hygiene and/or malodour benefits such as one or more of zinc ricinoleate, thymol, quaternary ammonium salts such as Bardac®, polyethylenimines (such as Lupasol® from BASF) and zinc complexes thereof, silver and silver compounds, especially those designed to slowly release Ag+ or nano-silver dispersions.

Probiotics. The composition may comprise probiotics, such as those described in WO2009/043709.

Suds Boosters. The composition may preferably comprise suds boosters if high sudsing is desired. Suitable examples are the $C_{10}$-$C_{16}$ alkanolamides or $C_{10}$-$C_{14}$ alkyl sulphates, which are preferably incorporated at 1%-10% levels. The $C_{10}$-$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, water-soluble magnesium and/or calcium salts such as $MgCl_2$, $MgSO_4$, $CaCl_2$, $CaSO_4$ and the like, can be added at levels of, typically, 0.1%-2%, to provide additional suds and to enhance grease removal performance.

Suds Suppressor. Compounds for reducing or suppressing the formation of suds may be incorporated into the compositions of the present invention. Suds suppression can be of particular importance in the so-called "high concentration cleaning process" as described in U.S. Pat. Nos. 4,489,455 and 4,489,574, and in front-loading-style washing machines. A wide variety of materials may be used as suds suppressors, and suds suppressors are well known to those skilled in the art. See, for example, Kirk Othmer Encyclopedia of Chemical Technology, Third Edition, Volume 7, pages 430-447 (John Wiley & Sons, Inc., 1979). Examples of suds suppressors include monocarboxylic fatty acid and soluble salts therein, high molecular weight hydrocarbons such as paraffin, fatty acid esters (e.g., fatty acid triglycerides), fatty acid esters of monovalent alcohols, aliphatic $C_{18}$-$C_{40}$ ketones (e.g., stearone), N-alkylated amino triazines, waxy hydrocarbons preferably having a melting point below about 100° C., silicone suds suppressors, and secondary alcohols. Suds suppressors are described in U.S. Pat. Nos. 2,954,347; 4,265,779; 4,265,779; 3,455,839; 3,933,672; 4,652,392; 4,978,471; 4,983,316; 5,288,431; 4,639,489; 4,749,740; and 4,798,679; 4,075,118; European Patent Application No. 89307851.9; EP 150,872; and DOS 2,124,526.

For any detergent compositions to be used in automatic laundry washing machines, suds should not form to the extent that they overflow the washing machine. Suds suppressors, when utilized, are preferably present in a suds suppressing amount. "Suds suppressing amount" is meant that the formulator of the composition can select an amount of this suds controlling agent that will sufficiently control the suds to result in a low-sudsing laundry detergent for use in automatic laundry washing machines. The compositions herein will generally comprise from 0% to 10% of suds suppressor. When utilized as suds suppressors, monocarboxylic fatty acids, and salts therein, will be present typically in amounts up to 5%, by weight, of the detergent composition. Preferably, from 0.5% to 3% of fatty monocarboxylate suds suppressor is utilized. Silicone suds suppressors are typically utilized in amounts up to 2.0%, by weight, of the detergent composition, although higher amounts may be used. Monostearyl phosphate suds suppressors are generally utilized in amounts ranging from 0.1% to 2%, by weight, of the composition. Hydrocarbon suds suppressors are typically utilized in amounts ranging from 0.01% to 5.0%, although higher levels can be used. The alcohol suds suppressors are typically used at 0.2%-3% by weight of the finished compositions.

Pearlescent Agents.

Pearlescent agents as described in WO2011/163457 may be incorporated into the compositions of the invention.

The pearlescent agents can be crystalline or glassy solids, transparent or translucent compounds capable of reflecting and refracting light to produce a pearlescent effect. Typically, the pearlescent agents are crystalline particles insoluble in the composition in which they are incorporated. Preferably the pearlescent agents have the shape of thin plates or spheres. Particle size is measured across the largest diameter of the sphere-like particle. Plate-like particles are such that two dimensions of the particle (length and width) are at least 5 times the third dimension (depth or thickness). Other crystal shapes like cubes or needles or other crystal shapes do not display pearlescent effect. Many pearlescent agents like mica are natural minerals having monoclinic crystals. Shape appears to affect the stability of the agents. The spherical, even more preferably, the plate-like agents being the most successfully stabilized. Particle size of the pearlescent agent is typically below 200 microns, preferably below 100 microns, more preferably below 50 microns.

In one preferred embodiment, the particles are randomly oriented throughout the liquid so that they scatter light from incoming angles, giving a constant pearlescent look independent of the angle from which the sample is observed. Alternatively, particles could also be ordered in the same direction to obtain a different light scattering profile and therefore provide a look dependent upon the angle through which the sample is observed.

The compositions may comprise from 0.005% to 3.0% wt, preferably from 0.01% to 1%, by weight of the composition of the 100% active pearlescent agents. The pearlescent agents may be organic or inorganic. The composition can comprise organic and/or inorganic pearlescent agent.

Organic Pearlescent Agents:

When the composition comprises an organic pearlescent agent, it is comprised at an active level of from 0.05% to 2.0% wt, preferably from 0.1% to 1.0% by weight of the composition of the 100% active organic pearlescent agents. Suitable organic pearlescent agents include monoester and/or diester of alkylene glycols having the formula:

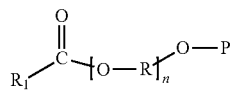

wherein $R_1$ is linear or branched C12-C22 alkyl group;
R is linear or branched C2-C4 alkylene group;
P is selected from H, C1-C4 alkyl or —$COR_2$, $R_2$ is C4-C22 alkyl, preferably C12-C22 alkyl; and
n=1-3.

In one embodiment, the long chain fatty ester has the general structure described above, wherein $R_1$ is linear or branched C16-C22 alkyl group, R is —$CH_2$—$CH_2$—, and P is selected from H, or —$COR_2$, wherein $R_2$ is C4-C22 alkyl, preferably C12-C22 alkyl.

Typical examples are monoesters and/or diesters of ethylene glycol, propylene glycol, diethylene glycol, dipropylene glycol, triethylene glycol or tetraethylene glycol with fatty acids containing from about 6 to about 22, preferably from about 12 to about 18 carbon atoms, such as caproic acid, caprylic acid, 2-ethyhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, arachic acid, gadoleic acid, behenic acid, erucic acid, and mixtures thereof.

In one embodiment, ethylene glycol monostearate (EGMS) and/or ethylene glycol distearate (EGDS) and/or polyethylene glycol monostearate (PGMS) and/or polyethyleneglycol distearate (PGDS) are the pearlescent agents used in the composition. There are several commercial sources for these materials. For example, PEG6000MS® is available from Stepan, Empilan EGDS/A® is available from Albright & Wilson.

In another embodiment, the pearlescent agent comprises a mixture of ethylene glycol diester/ethylene glycol monoester having the weight ratio of about 1:2 to about 2:1. In another embodiment, the pearlescent agent comprising a mixture of EGDS/EGMS having the weight ratio of about 60:40 to about 50:50 is found to be particularly stable in water suspension.

Co-Crystallizing Agents: Optionally, co-crystallizing agents are used to enhance the crystallization of the organic pearlescent agents such that pearlescent particles are produced in the resulting product. Suitable co-crystallizing agents include but are not limited to fatty acids and/or fatty alcohols having a linear or branched, optionally hydroxyl substituted, alkyl group containing from about 12 to about 22, preferably from about 16 to about 22, and more preferably from about 18 to 20 carbon atoms, such as palmitic acid, linoleic acid, stearic acid, oleic acid, ricinoleic acid, behenyl acid, cetearyl alcohol, hydroxystearyl alcohol, behenyl alcohol, linolyl alcohol, linolenyl alcohol, and mixtures thereof. In one embodiment where the co-crystallizing agent is present, the composition comprises 1-5 wt % C12-C20 fatty acid, C12-C20 fatty alcohol, or mixtures thereof. In another embodiment, the weight ratio between the organic pearlescent agent and the co-crystallizing agent ranges from about 3:1 to about 10:1, or from about 5:1 to about 20:1. A preferred method of incorporating organic pearlescent agents into a composition is to use a pre-crystallized organic pearlescent dispersion, named as "cold pearl". A number of cold pearls are commercially available. These include trade names such as Stepan, Pearl-2 and Stepan Pearl 4 (produced by Stepan Company Northfield, Ill.), Mackpearl 202, Mackpearl 15-DS, Mackpearl DR-104, Mackpearl DR-106 (all produced by McIntyre Group, Chicago, Ill.), Euperlan PK900 Benz-W and Euperlan PK 3000 AM (produced by Cognis Corp).

Inorganic Pearlescent Agents:

In another embodiment the composition might also comprise an inorganic pearlescent agent. When the composition comprises an inorganic pearlescent agent, it is comprised at an active level of from 0.005% to 1.0% wt, preferably from 0.01% to 0.2% by weight of the composition of the 100% active inorganic pearlescent agents.

Inorganic pearlescent agents include aluminosilicates and/or borosilicates. Preferred are the aluminosilicates and/or borosilicates which have been treated to have a very high refractive index, preferably silica, metal oxides, oxychloride coated aluminosilicate and/or borosilicates. More preferred inorganic pearlescent agent is mica, even more preferred titanium dioxide treated mica such as BASF Mearlin Superfine.

It is preferable to use a pearlescent pigment with a high refractive index in order to keep the level of pigment at a reasonably low level in the formulation. Hence the pearlescent agent is preferably chosen such that it has a refractive index of more than 1.41, more preferably more than 1.8, even more preferably more than 2.0. Preferably the difference in refractive index between the pearlescent agent and the composition or medium, to which pearlescent agent is then added, is at least 0.02. Preferably the difference in refractive index between the pearlescent agent and the composition is at least 0.2, more preferably at least 0.6.

One preferred embodiment is metal oxide treated mica such as titanium oxide treated mica with a titanium oxide thickness from 1 nm to 150 nm, preferentially from 2 to 100 more preferentially from 5 to 50 nm to produce a silvery iridescence or from 50 nm to 150 nm produce colors that appear bronze, copper, red, red-violet or red-green. Gold iridescence could be obtained by applying a layer of iron oxide on top of a layer of titanium oxide. Typical interference pigment function of the thickness of the metal oxide layer could be found in scientific literature.

Other commercially available suitable inorganic pearlescent agents are available from Merck under the tradenames Iriodin, Biron, Xirona, Timiron Colorona, Dichrona, Candurin and Ronastar. Other commercially available inorganic pearlescent agent are available from BASF (Engelhard, Mearl) under tradenames Biju, Bi-Lite, Chroma-Lite, Pearl-Glo, Mearlite and from Eckart under the tradenames Prestige Soft Silver and Prestige Silk Silver Star.

Suspension Particles

In one embodiment, the composition further comprises a plurality of suspension particles at a level of from about 0.01% to about 5% by weight, alternatively from about 0.05% to about 4% by weight, alternatively from about 0.1% to about 3% by weight. Examples of suitable suspension particles are provided in U.S. Pat. No. 7,169,741 and U.S. Patent Publ. No. 2005/0203213, the disclosures of which are incorporated herein by reference. These suspended particles can comprise a liquid core or a solid core. Detailed description of these liquid core and solid core particles, as well as description of preferred particle size, particle shape, particle density, and particle burst strength are described in U.S. patent application Ser. No. 12/370,714, the disclosure of which is incorporated herein by reference.

In one preferred embodiment, the particles may be any discrete and visually distinguishable form of matter, including but not limiting to (deformable) beads, encapsulates, polymeric particles like plastic, metals (e.g. foil material, flakes, glitter), (interference) pigments, minerals (salts, rocks, pebbles, lava, glass/silica particles, talc), plant materials (e.g. pits or seeds, plant fibers, stalks, stems, leaves or roots), solid and liquid crystals, and the like. Different particle shapes are possible, ranging from spherical to tabular.

In one embodiment, the suspension particles may be gas or air bubbles. In this embodiment, the diameter of each bubble may be from about 50 to about 2000 microns and may be present at a level of about 0.01 to about 5% by volume of the composition alternatively from about 0.05% to about 4% by volume of the composition, alternatively from about 0.1% to about 3% by volume of the composition.

Many different techniques have been devised for determining particle size distribution in compositions, but for a wide range of industries laser based analytical method diffraction has become the preferred choice. For example, laser diffraction, alternatively referred to as Low Angle Laser Light Scattering (LALLS), can be used for the non-destructive analysis of wet or dry samples, with particles in the size range 0.02 to 2000 micron. Alternatively online droplet sizing systems capture high-speed images of bubble stream to give the drop size. In addition to measuring the particle diameter distribution, lasers imaging systems also provide real-time shape and velocity analysis.

Laser diffraction based particle size analysis relies on the fact that particles passing through a laser beam will scatter light at an angle that is directly related to their size. As particle size decreases, the observed scattering angle increases logarithmically. Scattering intensity is also dependent on particle size, diminishing with particle volume. Large particles therefore scatter light at narrow angles with high intensity whereas small particles scatter at wider angles but with low intensity. It is this behavior that instruments based on the technique of laser diffraction exploit in order to determine particle size. A typical system consists of a laser, to provide a source of coherent, intense light of fixed wavelength; a series of detectors to measure the light pattern produced over a wide range of angles; and some kind of sample presentation system to ensure that material under test passes through the laser beam as a homogeneous stream of particles in a known, reproducible state of dispersion.

Perfume Microcapsules

In one embodiment, the composition comprises a perfume microcapsule and/or a perfume nanocapsule. Suitable perfume microcapsules and perfume nanocapsules include those described in the following references: US 2003215417 A1; US 2003216488 A1; US 2003158344 A1; US 2003165692 A1; US 2004071742 A1; US 2004071746 A1; US 2004072719 A1; US 2004072720 A1; EP 1393706 A1; US 2003203829 A1; US 2003195133 A1; US 2004087477 A1; US 20040106536 A1; U.S. Pat. Nos. 6,645,479; 6,200,949; 4,882,220; 4,917,920; 4,514,461; US RE 32713; U.S. Pat. No. 4,234,627, the disclosures of which are incorporated herein by reference.

In yet another embodiment, the composition comprises odor control agents such as described in U.S. Pat. No. 5,942,217: "Uncomplexed cyclodextrin compositions for odor control", granted Aug. 24, 1999. Other agents suitable odor control agents include those described in: U.S. Pat. Nos. 5,968,404; 5,955,093; 6,106,738; 5,942,217; and 6,033,679, the disclosures of which are incorporated herein by reference.

Opacifier

In one embodiment, the composition might also comprise an opacifier.

As the term is used herein, an "opacifier" is a substance added to a material in order to make the ensuing system opaque. In one preferred embodiment, the opacifier is Acusol, which is available from Dow Chemicals. Acusol opacifiers are provided in liquid form at a certain % solids level. As supplied, the pH of Acusol opacifiers ranges from 2.0 to 5.0 and particle sizes range from 0.17 to 0.45 um. In one preferred embodiment, Acusol OP303B and 301 can be used.

In yet another embodiment, the opacifier may be an inorganic opacifier. Preferably, the inorganic opacifier can be $TiO_2$, ZnO, talc, $CaCO_3$, and combination thereof. The composite opacifier-microsphere material is readily formed with a preselected specific gravity, so that there is little tendency for the material to separate.

Organic Solvents

The compositions may optionally comprise an organic solvent. Suitable organic solvents include $C_{4-14}$ ethers and diethers, glycols, alkoxylated glycols, $C_6$-$C_{16}$ glycol ethers, alkoxylated aromatic alcohols, aromatic alcohols, aliphatic branched alcohols, alkoxylated aliphatic branched alcohols, alkoxylated linear $C_1$-$C_5$ alcohols, linear $C_1$-$C_5$ alcohols, amines, $C_8$-$C_{14}$ alkyl and cycloalkyl hydrocarbons and halohydrocarbons, and mixtures thereof. In one embodiment, the liquid detergent composition comprises from about 0.0% to less than 50% of a solvent. When present, the liquid detergent composition will contain from about 0.01% to about 20%, alternatively from about 0.5% to about 15%, alternatively from about 1% to about 10% by weight of the liquid detergent composition of said organic solvent. These organic solvents may be used in conjunction with water, or they may be used without water.

Hydrotrope

The composition may optionally comprises a hydrotrope in an effective amount, i.e. from about 0% to 15%, or about 1% to 10%, or about 3% to about 6%, so that compositions are compatible in water. Suitable hydrotropes for use herein include anionic-type hydrotropes, particularly sodium, potassium, and ammonium xylene sulfonate, sodium, potassium and ammonium toluene sulfonate, sodium potassium and ammonium cumene sulfonate, and mixtures thereof, as disclosed in U.S. Pat. No. 3,915,903.

Polymeric Suds Stabilizer

The composition may optionally contain a polymeric suds stabilizer at a level from about 0.01% to about 15%. These polymeric suds stabilizers provide extended suds volume and suds duration of the liquid detergent compositions. These polymeric suds stabilizers may be selected from homopolymers of (N,N-dialkylamino) alkyl esters and (N,N-dialkylamino) alkyl acrylate esters. The weight average molecular weight of the polymeric suds boosters, determined via conventional gel permeation chromatography, is from about 1,000 to about 2,000,000, alternatively from about 5,000 to about 1,000,000, alternatively from about 10,000 to about 750,000, alternatively from about 20,000 to about 500,000, alternatively from about 35,000 to about 200,000. The polymeric suds stabilizer can optionally be present in the form of a salt, either an inorganic or organic salt, for example the citrate, sulfate, or nitrate salt of (N,N-dimethylamino)alkyl acrylate ester.

One suitable polymeric suds stabilizer is (N,N-dimethylamino)alkyl acrylate esters, namely the acrylate ester represented by the following formula:

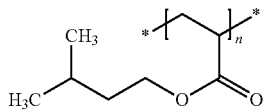

When present in the compositions, the polymeric suds booster may be present in the composition from about 0.01% to about 15%, alternatively from about 0.05% to about 10%, alternatively from about 0.1% to about 5%, by weight of the composition.

Anti-Oxidant

The composition may optionally contain an anti-oxidant present in the composition from about 0.001 to about 2% by weight. Preferably the antioxidant is present at a concentration in the range 0.01 to 0.08% by weight.

Anti-oxidants are substances as described in Kirk-Othmer (Vol. 3, page 424) and In Ullmann's Encyclopedia (Vol. 3, page 91).

One class of anti-oxidants used in the present invention is alkylated phenols, having the general formula:

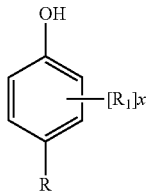

wherein R is $C_1$-$C_{22}$ linear or branched alkyl, preferably methyl or branched $C_3$-$C_6$ alkyl, $C_3$-$C_6$ alkoxy, preferably methoxy; $R_1$ is a $C_3$-$C_6$ branched alkyl, preferably tert-butyl; x is 1 or 2. Hindered phenolic compounds are a preferred type of alkylated phenols having this formula. A preferred hindered phenolic compound of this type is 2,6-di-tert-butyl-hydroxytoluene (BHT).

Furthermore, the anti-oxidant used in the composition may be selected from the group consisting of α-, β-, γ-, δ-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof. It is noted that ethoxyquin (1,2-dihydro-6-ethoxy-2,2,4-trimethylquinoline) is marketed under the name Raluquin™ by the company Raschig™.

Other types of anti-oxidants that may be used in the composition are 6-hydroxy-2,5,7,8-tetramethylchroman-2-carboxylic acid (Trolox™) and 1,2-benzisothiazoline-3-one (Proxel GXL™).

A further class of anti-oxidants which may be suitable for use in the composition is a benzofuran or benzopyran derivative having the formula:

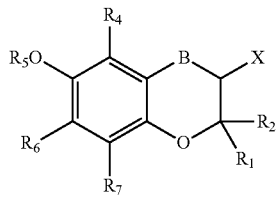

wherein $R_1$ and $R_2$ are each independently alkyl or $R_1$ and $R_2$ can be taken together to form a $C_5$-$C_6$ cyclic hydrocarbyl moiety; B is absent or $CH_2$; $R_4$ is $C_1$-$C_6$ alkyl; $R_5$ is hydrogen or —C(O)$R_3$ wherein $R_3$ is hydrogen or $C_1$-$C_{19}$ alkyl; $R_6$ is $C_1$-$C_6$ alkyl; $R_7$ is hydrogen or $C_1$-$C_6$ alkyl; X is —$CH_2$OH, or —$CH_2$A wherein A is a nitrogen comprising unit, phenyl, or substituted phenyl. Preferred nitrogen comprising A units include amino, pyrrolidino, piperidino, morpholino, piperazino, and mixtures thereof.

Anti-oxidants such as tocopherol sorbate, butylated hydroxyl benxoic acids and their salts, gallic acid and its alkyl esters, uric acid and its salts, sorbic acid and its salts, and dihydroxyfumaric acid and its salts may also be used. The most preferred types of anti-oxidant for use in the composition are 2,6-di-tert-butylhydroxytoluene (BHT), α-, β-, γ-, δ-tocopherol, 1,2-benzisothiazoline-3-one (Proxel GXL™) and mixtures thereof.

Perfume. Preferably the composition comprises a perfume, preferably in the range from 0.001 to 3 wt %, most preferably from 0.1 to 1 wt %. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co. It is usual for a plurality of perfume components to be present in the compositions of the invention, for example four, five, six, seven or more. In perfume mixtures preferably 15 to 25 wt % are top notes. Top notes are defined by Poucher (Journal of the Society of Cosmetic Chemists 6(2):80 [1995]). Preferred top notes include rose oxide, citrus oils, linalyl acetate, lavender, linalool, dihydromyrcenol and cis-3-hexanol.

Packaging. Any conventional packaging may be used and the packaging may be fully or partially transparent so that the consumer can see the color of the product which may be provided or contributed to by the color of the dyes essential to the invention. UV absorbing compounds may be included in some or all of the packaging.

Process of Making Compositions

The compositions of the invention may be in any useful form, as described above. They may be made by any process chosen by the formulator, non-limiting examples of which are described in the examples and in U.S. Pat. No. 4,990,280; U.S. 20030087791A1; U.S. 20030087790A1; U.S. 20050003983A1; U.S. 20040048764A1; U.S. Pat. Nos. 4,762,636; 6,291,412; U.S. 20050227891A1; EP 1070115A2; U.S. Pat. Nos. 5,879,584; 5,691,297; 5,574,005; 5,569,645; 5,565,422; 5,516,448; and 5,489,392.

When in the form of a liquid, the laundry care compositions of the invention may be aqueous (typically above 2 wt % or even above 5 or 10 wt % total water, up to 90 or up to 80 wt % or 70 wt % total water) or non-aqueous (typically below 2 wt % total water content). Typically the compositions of the invention will be in the form of an aqueous solution or uniform dispersion or suspension of surfactant, shading dye, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable. When in the form of a liquid, the laundry care compositions of the invention preferably have viscosity from 1 to 1500 centipoises (1-1500 mPa*s), more preferably from 100 to 1000 centipoises (100-1000 mPa*s), and most preferably from 200 to 500 centipoises (200-500 mPa*s) at 20 s-1 and $21^2$C. Viscosity can be determined by conventional methods. Viscosity may be measured using an AR 550 rheometer from TA instruments using a plate steel spindle at 40 mm diameter and a gap size of 500 μm. The high shear viscosity at 20 s-1 and low shear viscosity at 0.05-1 can be obtained from a logarithmic shear rate sweep from 0.1-1 to 25-1 in 3 minutes time at $21^2$C. The preferred rheology described therein may be achieved using internal existing structuring with detergent ingredients or by employing an external rheology modifier. More preferably the laundry care compositions, such as detergent liquid compositions have a high shear rate viscosity of from about 100 centipoise to 1500 centipoise, more preferably from 100 to 1000 cps. Unit Dose laundry care compositions, such as detergent liquid compositions have high shear rate viscosity of from 400 to 1000 cps. Laundry care compositions such as laundry softening compositions typically have high shear rate viscosity of from 10 to 1000, more preferably from 10 to 800 cps, most preferably from 10 to 500 cps. Hand dishwashing compositions have high shear rate viscosity of from 300 to 4000 cps, more preferably 300 to 1000 cps.

The liquid compositions, preferably liquid detergent compositions herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In one aspect of forming the liquid compositions, the dye is first combined with one or more liquid components to form a dye premix, and this dye premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the dye premix and the enzyme component are added at a final stage of component additions. In another aspect, the dye is encapsulated prior to addition to the detergent composition, the encapsulated dye is suspended in a structured liquid, and the suspension is added to a composition formulation containing a substantial portion of the balance of components of the laundry detergent composition.

The leuco colorants of the present invention have been found to be suitable for use in liquid laundry care compositions having a wide range of pH values. For example, the inventive leuco colorants have been found to be suitable for use in liquid laundry care compositions having a pH of greater than or equal to 10. The inventive leuco colorants have also been found to be suitable for use in liquid laundry care compositions having a pH of less than 10. Thus, the leuco colorant are stable in laundry care compositions having pH values of greater than or equal to 10 and less than or equal to 10.

Pouches.

In a preferred embodiment of the invention, the composition is provided in the form of a unitized dose, either tablet form or preferably in the form of a liquid/solid (optionally granules)/gel/paste held within a water-soluble film in what is known as a pouch or pod. The composition can be encapsulated in a single or multi-compartment pouch. Multi-compartment pouches are described in more detail in EP-A-2133410. When the composition is present in a multi-compartment pouch, the composition of the invention may be in one or two or more compartments, thus the dye may be present in one or more compartments, optionally all compartments. Non-shading dyes or pigments or other aesthetics may also be used in one or more compartments. In one embodiment the composition is present in a single compartment of a multi-compartment pouch.

Suitable film for forming the pouches is soluble or dispersible in water, and preferably has a water-solubility/dispersibility of at least 50%, preferably at least 75% or even at least 95%, as measured by the method set out here after using a glass-filter with a maximum pore size of 20 microns:

50 grams±0.1 gram of pouch material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersibility can be calculated. Preferred film materials are polymeric materials. The film material can be obtained, for example, by casting, blow-molding, extrusion or blown extrusion of the polymeric material, as known in the art. Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000. Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Naturally, different film material and/or films of different thickness may be employed in making the compartments of the present invention. A benefit in selecting different films is that the resulting compartments may exhibit different solubility or release characteristics.

Most preferred film materials are PVA films known under the MonoSol trade reference M8630, M8900, H8779 and those described in U.S. Pat. Nos. 6,166,117 and 6,787,512 and PVA films of corresponding solubility and deformability characteristics.

The film material herein can also comprise one or more additive ingredients. For example, it can be beneficial to add plasticizers, for example glycerol, ethylene glycol, diethyleneglycol, propylene glycol, sorbitol and mixtures thereof. Other additives include functional detergent additives to be delivered to the wash water, for example organic polymeric dispersants, etc.

Process for Making the Water-Soluble Pouch

The compositions of the invention in pouch form may be made using any suitable equipment and method. However the multi-compartment pouches are preferably made using the horizontal form filling process. The film is preferably wetting, more preferably heated to increase the malleability thereof. Even more preferably, the method also involves the use of a vacuum to draw the film into a suitable mold. The vacuum drawing the film into the mold can be applied for 0.2 to 5 seconds, preferably 0.3 to 3 or even more preferably 0.5 to 1.5 seconds, once the film is on the horizontal portion of the surface. This vacuum may preferably be such that it provides an under-pressure of between −100 mbar to −1000 mbar, or even from −200 mbar to −600 mbar.

The molds, in which the pouches are made, can have any shape, length, width and depth, depending on the required dimensions of the pouches. The molds can also vary in size and shape from one to another, if desirable. For example, it may be preferred that the volume of the final pouches is between 5 and 300 ml, or even 10 and 150 ml or even 20 and 100 ml and that the mold sizes are adjusted accordingly.

Heat can be applied to the film, in the process commonly known as thermoforming, by any means. For example the film may be heated directly by passing it under a heating element or through hot air, prior to feeding it onto the surface or once on the surface. Alternatively it may be heated indirectly, for example by heating the surface or applying a hot item onto the film. Most preferably the film is heated using an infrared light. The film is preferably heated to a temperature of 50 to 120° C., or even 60 to 90° C.

Alternatively, the film can be wetted by any mean, for example directly by spraying a wetting agent (including water, solutions of the film material or plasticizers for the film material) onto the film, prior to feeding it onto the surface or once on the surface, or indirectly by wetting the surface or by applying a wet item onto the film.

In the case of pouches comprising powders it is advantageous to pin prick the film for a number of reasons: (a) to reduce the possibility of film defects during the pouch formation, for example film defects giving rise to rupture of the film can be generated if the stretching of the film is too fast; (b) to permit the release of any gases derived from the product enclosed in the pouch, as for example oxygen formation in the case of powders containing bleach; and/or (c) to allow the continuous release of perfume. Moreover, when heat and/or wetting is used, pin pricking can be used before, during or after the use of the vacuum, preferably during or before application of the vacuum. Preferred is thus that each mold comprises one or more holes which are connected to a system which can provide a vacuum through these holes, onto the film above the holes, as described herein in more detail.

Once a film has been heated/wetted, it is drawn into an appropriate mold, preferably using a vacuum. The filling of the molded film can be done by any known method for filling (moving) items. The most preferred method will depend on the product form and speed of filling required. Preferably the molded film is filled by in-line filling techniques. The filled, open pouches are then closed, using a second film, by any suitable method. Preferably, this is also done while in horizontal position and in continuous, constant motion. Preferably the closing is done by continuously feeding a second material or film, preferably water-soluble film, over and onto the web of open pouches and then preferably sealing the first film and second film together, typically in the area between the molds and thus between the pouches.

Preferred methods of sealing include heat sealing, solvent welding, and solvent or wet sealing. It is preferred that only the area which is to form the seal, is treated with heat or solvent. The heat or solvent can be applied by any method, preferably on the closing material, preferably only on the areas which are to form the seal. If solvent or wet sealing or welding is used, it may be preferred that heat is also applied. Preferred wet or solvent sealing/welding methods include applying selectively solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches can then be cut by a cutting device. Cutting can be done using any known method. It may be preferred that the cutting is also done in continuous manner, and preferably with constant speed and preferably while in horizontal position. The cutting device can, for example, be a sharp item or a hot item, whereby in the latter case, the hot item 'burns' through the film/sealing area.

The different compartments of a multi-compartment pouch may be made together in a side-by-side style and consecutive pouches are not cut. Alternatively, the compartments can be made separately. According to this process and preferred arrangement, the pouches are made according to the process comprising the steps of:
  a) forming an first compartment (as described above);
  b) forming a recess within some or all of the closed compartment formed in step (a), to generate a second molded compartment superposed above the first compartment;
  c) filling and closing the second compartments by means of a third film;
  d) sealing said first, second and third films; and
  e) cutting the films to produce a multi-compartment pouch.

Said recess formed in step b is preferably achieved by applying a vacuum to the compartment prepared in step a).

Alternatively the second, and optionally third, compartment(s) can be made in a separate step and then combined with the first compartment as described in EP 08101442.5 which is incorporated herein by reference. A particularly preferred process comprises the steps of:
  a) forming a first compartment, optionally using heat and/or vacuum, using a first film on a first forming machine;
  b) filling said first compartment with a first composition;
  c) on a second forming machine, deforming a second film, optionally using heat and vacuum, to make a second and optionally third molded compartment;
  d) filling the second and optionally third compartments;
  e) sealing the second and optionally third compartment using a third film;
  f) placing the sealed second and optionally third compartments onto the first compartment;
  g) sealing the first, second and optionally third compartments; and
  h) cutting the films to produce a multi-compartment pouch The first and second forming machines are selected based on their suitability to perform the above process. The first forming machine is preferably a horizontal forming machine. The second forming machine is preferably a rotary drum forming machine, preferably located above the first forming machine.

It will be understood moreover that by the use of appropriate feed stations, it is possible to manufacture multi-compartment pouches incorporating a number of different or distinctive compositions and/or different or distinctive liquid, gel or paste compositions.

Solid Form. As noted previously, the laundry care compositions may be in a solid form. Suitable solid forms include tablets and particulate forms, for example, granular particles, flakes or sheets. Various techniques for forming detergent compositions in such solid forms are well known in the art and may be used herein. In one aspect, for example when the composition is in the form of a granular particle, the leuco colorant is provided in particulate form, optionally including additional but not all components of the laundry detergent composition. The colorant particulate is combined with one or more additional particulates containing a balance of components of the laundry detergent composition. Further, the colorant, optionally including additional but not all components of the laundry detergent composition, may be provided in an encapsulated form, and the shading dye encapsulate is combined with particulates containing a substantial balance of components of the laundry detergent composition. Suitable pre-mix particles for incorporation of dyes/benefit agents into laundry care compositions of the invention are described for example in WO2010/084039, WO2007/039042, WO2010/022775, WO2009/132870, WO2009/087033, WO2007/006357, WO2007/039042, WO2007/096052, WO2011/020991, WO2006/053598, WO2003/018740 and WO2003/018738.

Method of Use. The compositions of this invention, prepared as hereinbefore described, can be used to form aqueous washing/treatment solutions for use in the laundering/treatment of fabrics. Generally, an effective amount of such compositions is added to water, for example in a conventional fabric automatic washing machine, to form such aqueous laundering solutions. The aqueous washing solution so formed is then contacted, typically under agitation, with the fabrics to be laundered/treated therewith.

An effective amount of the liquid detergent compositions herein added to water to form aqueous laundering solutions can comprise amounts sufficient to form from about 500 to 7,000 ppm of composition in aqueous washing solution, or from about 1,000 to 3,000 ppm of the detergent compositions herein will be provided in aqueous washing solution.

Typically, the wash liquor is formed by contacting the laundry care composition with wash water in such an amount so that the concentration of the laundry care composition in the wash liquor is from above 0 g/l to 5 g/l, or from 1 g/l, and to 4.5 g/l, or to 4.0 g/l, or to 3.5 g/l, or to 3.0 g/l, or to 2.5 g/l, or even to 2.0 g/l, or even to 1.5 g/l. The method of laundering fabric or textile may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 liters or less of water, or 30 liters or less, or 20 liters or less, or 10 liters or less, or 8 liters or less, or even 6 liters or less of water. The wash liquor may comprise from above 0 to 15 liters, or from 2 liters, and to 12 liters, or even to 8 liters of water. Typically from 0.01 kg to 2 kg of fabric per liter of wash liquor is dosed into said wash liquor. Typically from 0.01 kg, or from 0.05 kg, or from 0.07 kg, or from 0.10 kg, or from 0.15 kg, or from 0.20 kg, or from 0.25 kg fabric per liter of wash liquor is dosed into said wash liquor. Optionally, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Typically the wash liquor comprising the laundry care composition of the invention has a pH of from 3 to 11.5.

In one aspect, such method comprises the steps of optionally washing and/or rinsing said surface or fabric, contacting said surface or fabric with any composition disclosed in this specification then optionally washing and/or rinsing said surface or fabric is disclosed, with an optional drying step.

Drying of such surfaces or fabrics may be accomplished by any one of the common means employed either in domestic or industrial settings. The fabric may comprise any fabric capable of being laundered in normal consumer or institutional use conditions, and the invention is particularly suitable for synthetic textiles such as polyester and nylon and especially for treatment of mixed fabrics and/or fibers comprising synthetic and cellulosic fabrics and/or fibers. As examples of synthetic fabrics are polyester, nylon, these may be present in mixtures with cellulosic fibers, for example, polycotton fabrics. The solution typically has a pH of from 7 to 11, more usually 8 to 10.5. The compositions are typically employed at concentrations from 500 ppm to 5,000 ppm in solution. The water temperatures typically range from about $5^2$C to about 90° C. The water to fabric ratio is typically from about 1:1 to about 30:1.

The laundry care compositions of the present invention may also include any number of additional optional ingredients. These include conventional laundry detergent composition components such as non-tinting dyes, detersive builders, enzymes, enzyme stabilizers (such as propylene glycol, boric acid and/or borax), suds suppressors, soil suspending agents, soil release agents, other fabric care benefit agents, pH adjusting agents, chelating agents, smectite clays, solvents, hydrotropes and phase stabilizers, structuring agents, dye transfer inhibiting agents, opacifying agents, optical brighteners, perfumes and coloring agents. The various optional detergent composition ingredients, if present in the compositions herein, should be utilized at concentrations conventionally employed to bring about their desired contribution to the composition or the laundering operation. Frequently, the total amount of such optional detergent composition ingredients can range from about 0.01% to about 50%, more preferably from about 0.1% to about 30%, by weight of the composition.

Thus, the leuco colorant of the present invention may be added to textile substrates using a variety of application techniques. For application to textile substrates, the bluing agent is preferably included as an additive in a laundry care composition. Thus, application to the textile substrate actually occurs when a consumer adds a laundry care composition, such as detergent, to a washing machine. Similarly, rinse added fabric softener compositions are typically added in the rinse cycle, which is after the detergent solution has been used and replaced with the rinsing solution in typical laundering processes. For application to paper substrates, the bluing agent may be added to the paper pulp mixture prior to formation of the final paper product.

The leuco colorant compounds of this invention, prepared as hereinbefore described, can be used to form laundry care compositions and other household cleaning compositions, including without limitation, aqueous washing solutions for use in the laundering of fabrics, solid surface cleaners, dish and skin cleaners, and shampoos. As one example, an effective amount of a laundry care composition containing the inventive colorant may be added to water, preferably in a conventional fabric laundering automatic washing machine, to form an aqueous laundering solution. The aqueous washing solution so formed is then contacted, preferably under agitation, with the fabrics to be laundered therewith.

It is also contemplated to be within the scope of the present invention that the leuco colorant compounds described herein may be useful for coloring articles such as foam (e.g. polyurethane foam) and thermoplastic materials. For example, the present invention also encompasses an article comprising at least one surfactant and at least one leuco colorant. In this regard, the surfactant may be selected from any already described herein. However, other surfactants may be suitable for use as well, such as silicon surfactants that are commonly used in polyurethane materials. Typically, commercially available organo silicon surfactants and/or emulsifiers are polymers which contain a plurality of silicon atoms forming the hydrophobic portion of the polymer and a long chain hydrophilic group, for example, a polyoxyalkylene ether group. The more common organo silicon surfactant/emulsifiers contain a siloxane group. Such compounds are described in detail in U.S. Pat. No. 3,884,848, which is herein incorporated by reference. Any surfactants described in this specification, either alone or in combination, may be suitable for use in the present invention. Selection of suitable surfactants will generally depend upon the end-use application of the composition and/or article containing the leuco colorant.

Additionally, it is noted that the leuco colorants may be modified as necessary in order to provide stability of the colorant when added as an ingredient to other chemical compositions. For example, certain groups attached to the chromophore of the colorant composition may be modified to provide equilibrium and stability of the colorant in the desired end-use application. For instance, the ionic strength of the end-use application, such as a chemical composition, may affect the equilibrium of the colorant. Accordingly, modifications to the colorant may be made to polymer chains and other groups attached to the colorant. In surfactant-containing compositions, it may be desirable to modify the colorant so that it has the same or very similar surface energy and/or HLB properties as the surfactant-containing composition.

The leuco colorants of the present invention may be used for shading of textile substrates (such as white garments) and/or paper products. Blue and/or violet are typically preferred shades and therefore preferred colorants or mixtures of colorants that provide blue and/or violet shades are desirable. The leuco colorants of the present invention provide these desirable blue and/or violet shades. In this regard, the leuco colorants give a blue or violet color to white substrates with a hue angle of 240 to 345, or even a hue angle of 260 to 320, or even a hue angle of 270 to 300. For testing purposes, the white substrate may be a white textile substrate that has been bleached and mercerized, such as a woven cotton sheet.

EXAMPLES

The following examples are provided to further illustrate the leuco colorants of the present invention; however, they are not to be construed as limiting the invention as defined in the claims appended hereto. In fact, it will be apparent to those skilled in the art that various modifications and variations can be made in this invention without departing from the scope or spirit of the invention. All parts and percents given in these examples are by weight unless otherwise indicated.

Color Synthesis:

Example leuco colorant EX1 in Tables 1A and 1B, Leuco crystal violet, was purchased from Aldrich. Examples EX2-EX10 in Tables 1A and 1B were prepared following the general process described below.

A four neck flask was equipped with an overhead stirrer, a condenser, a temperature controller, a heating mantle and a Nitrogen inlet. Then, about 2 moles of alkoxylated aniline (N-methyl aniline for EX9, and 2-(phenyl amino) ethanol for EX 10) was added to the flask and heated to about 65-71° C. During heating, about 1 mole of dimethylamino benzaldehyde and catalytic amount (about 0.4 mole in this case) urea pre-dissolved in small amount of water were added. After the above chemicals were mixed, about 1.2 mole of hydrochloric acid (in form of Muriatic acid) was added drop wise to control the temperature below 90-100° C. After the addition of hydrochloric acid, the reaction was stirred at 95-100° C. for about 7 hours.

An exemplary synthesis route is shown below:

Synthetic Example 2: Synthesis of Leuco Crystal Violet 10 EO (LCV 10EO)

Synthesis and structure of Leuco Crystal Violet 10 EO can be described as following:

Chemical Scheme

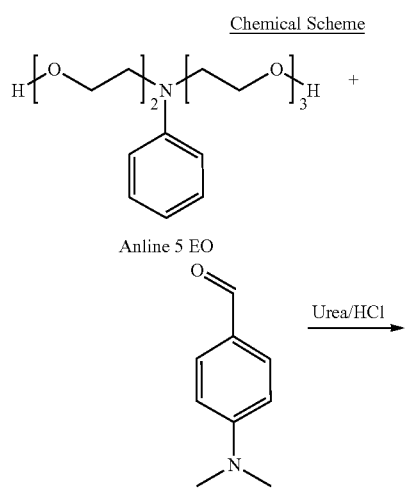

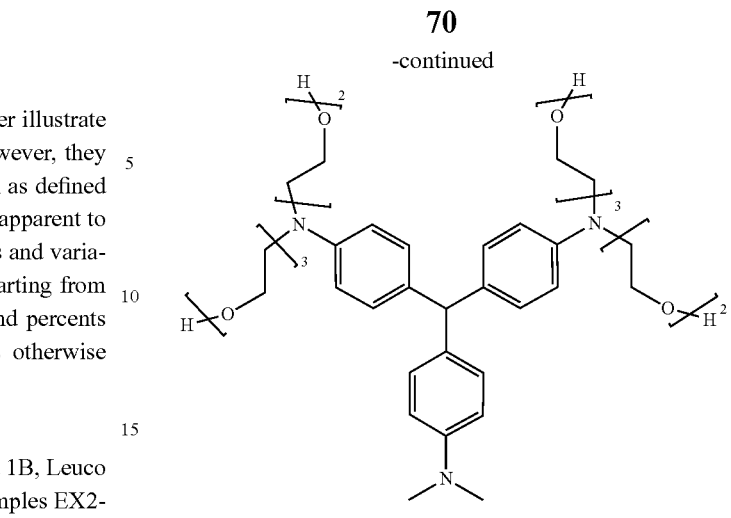

Multiple methods can be used to retrieve the leuco colorant synthesized by the above process. One of the methods was to first neutralize the reaction product to pH about 9; then remove the water by rot-vap. The viscous material was diluted with an organic solvent such as isopropanol and filtered to remove the inorganic salts. The organic solvent was evaporated and the final product was obtained.

Synthetic Example 6: Synthesis of Leuco Crystal Violet 4 EO (LCV 4EO)

In one embodiment, LCV 4EO was synthesized by following process:

In a 250 mL flask equipped with a mechanical stirrer, thermocouple, and sub-surface nitrogen inlet, 15 grams of p-dimethylaminobenzaldehyde, 36.2 grams aniline 2EO, 18 grams of water and 3.5 grams of urea was charged. Then 35 grams of concentrated hydrochloric acid (37%) was slowly added to the reaction and the exotherm was controlled to about 50° C. After the addition of the hydrochloric acid, the reaction was heated to 90° C. for about 6 hours. Then the reaction was cooled down to about 55° C. and 100 gram of water was added. The solution was then added to 600 mL of 5% sodium bicarbonate solution under stir. The product precipitated out and was collected and dried. The product was further purified by dissolving in ethyl acetate and washed with water to remove the oxidized dye. The ethyl acetate was then evaporated to obtain a light green solid. The molar attenuation coefficient at 590 nm was 45 liter/g/cm in methanol, in comparison of 87000 liter/mol/cm for the fully developed colorant.

EX 11 was prepared by reduction of pararosaniline hydrochloride. Specifically, 115.18 grams of pararosaniline hydrochloride, 200 mL of methanol, 11.1 mL of 5N sodium hydroxide, and 1.86 grams sodium borohydride were stirred at room temperature for about 1 hour. Then the pH was adjusted to 7-9 and the product precipitated out. Filtering was done to collect the product.

COMPARATIVE EXAMPLES

Comparative Example 1

Comparative Example 1 (CEX1) with the following structure was prepared by the process below.

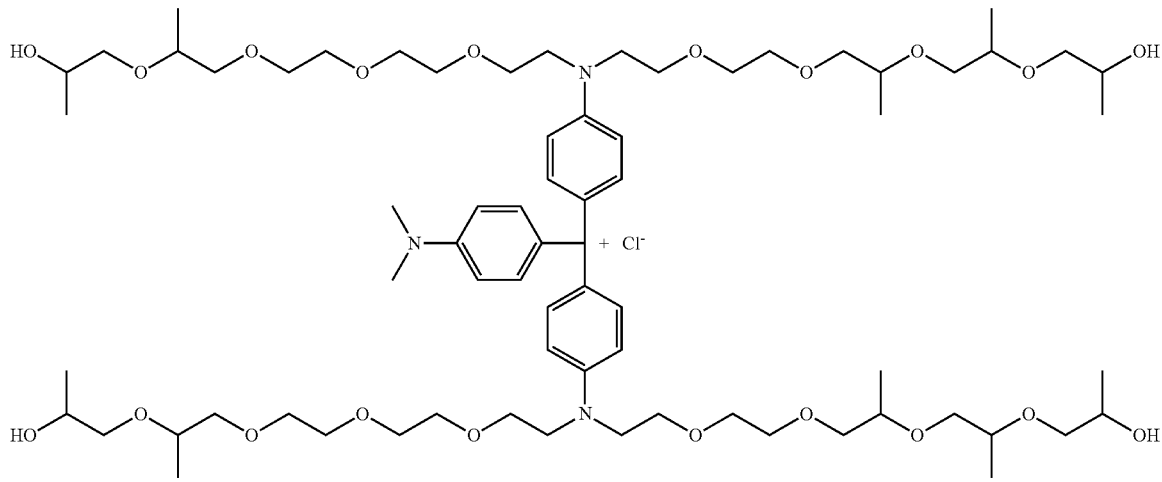 [SMILES: CC(O)COC(C)COCCOCCOCCN(CCOCCOCC(C)OCC(C)OCC(C)O)c1ccc(C(c2ccc(N(C)C)cc2)c2ccc(N(CCOCCOCCOCC(C)OCC(C)O)CCOCCOCC(C)OCC(C)OCC(C)O)cc2)cc1 ; [Cl-]]

A 500 mL four neck flask was equipped with an overhead stirrer, a condenser, a temperature controller, a heating mantle and a Nitrogen inlet. Then, 198 g of aniline 55 (aniline alkoxylated with 5 ethylene oxide and 5 propylene oxide) was added to the flask and heated to about 65-71° C. During heating, 24.5 g of dimethylamino benzaldehyde and 5.6 g urea (pre-dissolved 5.6 mL water) were added. After the above chemicals were mixed, about 33.14 g of muriatic acid was added drop wise to control the temperature below 90-100° C. After the addition, the reaction was stirred at 95-100° C. for about 7 hours.

After holding, 0.36 g of ammonium meta vanadate was added. Then a mixture of 32.1 g 30% hydrogen peroxide and 29.1 g water was added drop wise into the reaction. The addition took about 2-3 hours in order to control the temperature below 105° C. After addition, the reaction was stirred for additional 15 minutes and about 11 gram of water was added till the mixture had a color value of about 48. (Color value is defined as the theoretical absorbance at the maximum absorbance wavelength of the 1 g/L solution of the colorant with 1 cm light path length).

Comparative Example 2

Comparative Example 2 (CEX2) with the following structure (crystal violet lactone 10 EO) was synthesized following the procedure described in U.S. Pat. Nos. 7,544,216; 7,597,723 and 7,637,963.

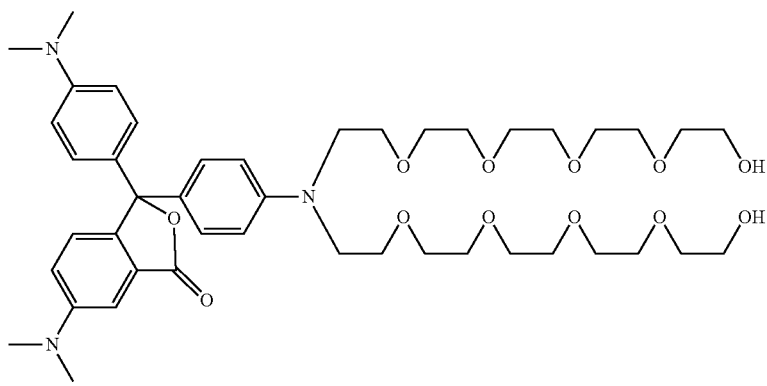 [SMILES: CN(C)c1ccc(C2(c3ccc(N(CCOCCOCCOCCOCCO)CCOCCOCCOCCOCCO)cc3)OC(=O)c3cc(N(C)C)ccc32)cc1]

Detergent Formulations:

Several commercially available powdered detergents were utilized for testing purposes in order to illustrate the advantages of the inventive leuco colorants of the present invention. The powdered detergents are listed below.

AATCC 1193 Standard Reference Detergent without optical brightener (OB), available from available from AATCC (Association of Textile, Apparel and Materials Professionals), Research Triangle Park, N.C., USA. Ingredients include linear alkylbenzene sulfonate sodium salt (C11, 8 LAS), sodium aluminosilicate solids, sodium carbonate, sodium silicate solids ($SiO_2$/$Na_2O$=1,6), sodium sulfate, polyethylene glycol, sodium polyacrylate, silicone (suds suppressor), moisture, miscellaneous (unreacted in surfactant stocks).

Tide® Ultra Free and Gentle, available from The Procter & Gamble Company of Cincinnati, Ohio. Detergent ingredients include sodium carbonate (removes water hardness), sodium aluminosilicate (removes water hardness), alkyl sulfate (surfactant), sodium sulfate (processing aid), linear alkylbenzene sulfonate (surfactant), water (processing aid), sodium polyacrylate (dispersant), silicate (processing aid), ethoxylate (surfactant), sodium percarbonate (oxygen bleach), polyethylene glycol 4000 (stabilizer), protease (enzyme; stain remover), disodium diaminostilbene disulfonate (whitening agent), silicone (suds suppressor), and cellulase (enzyme; stain remover).

Persil® Power Gold Plus with brightness, available from Henkel of Dusseldorf, Germany. Ingredients include sodium sulfate; sodium carbonate; benzenesulfonic acid C10-13 alkyl derivatives sodium salt; silicic acid sodium salt; sodium carbonate peroxide; sodium polyacrylate; fatty alcohol ethoxylate C12-18 7EO; water; carboxymethylcellulose, Na salt; TAED; tetrasodium etidronate; starch; perfume; 4,4'-bis[(4-anilino-6-morpholino-1,3,5-triazine-2-YL)amino]stilbene-2,2'-disulfonate de disodium; sodium hydroxide; di-me methyl (2-phenylpropyl)siloxane; colorant; protease; linalool; amylase; mannanase-1,4,endo-β-; cellulase; and formaldehyde.

Vanish detergent, available from Reckitt Benckiser of Berkshire, United Kingdom. Ingredients include sodium percarbonate, sodium carbonate, sodium sulphate, tetraacetylethylenediamine (TAED), disodium disilicate, water, sodium dodecylbenzenesulfonate (linear alkyl benzene sulfonate), pareth-5, zeolite, protease, perfume, lipase, and amylase.

ROMA detergent, available from La Corona Soap Factory in Mexico. Ingredients include linear anionic surfactant (cleaning agent), aluminosilicates and silicate (water softener), carboxymethylcellulose (soil suspending agent), fabric brightener, and perfume.

Mr. White detergent, available from Vaishnavi Kosmetics Ind Pvt. Ltd. of Himachal Pradesh, India.

RIN detergent, available from Hindustan Unilever Ltd of Mumbai, India.

Liby detergent, available from Guangzhou Lily Enterprise Group Co., Ltd. Of Guangdong Province, China. Ingredients include stain separation component, compound surfactants, phosphate-free water softener, enzyme, cleaning performance particle, oxy-clean component with brightening and antibacterial, and perfume.

Test Methods and Results:

Calculation of Whiteness: CIELab b* and Ganz and CIE Whiteness Index

Whiteness Index ("WI") is a qualifying assessment of color that is calculated by a formula which includes three components of color measurement—hue, saturation, and lightness—which is then indexed to a standard white value. Several whiteness formulas can be used to measure whiteness on cellulose based substrates. Two common formulas are the Ganz Whiteness Index and CIE Whiteness. Ganz Whiteness Index is expressed by the formula: WI=(D*Y)+(P*x)+(Q*y)+C, where Y, x and y are colorimetric values and D, P, Q and C are formula parameters. CIE Whiteness is expressed by the formula: WI=Y−(800*x)−(1700*y)+813.7, where Y, x and y are colorimetric values. Higher positive Ganz WI values indicate that more blueing, or whitening effect, is exhibited by the treated cellulose based substrate. Further information is available in the publication of Rolf Griesser, Ciba-Geigy Ltd, "Whiteness and Tint", June 1993.

The surface color of an article may be quantified using a series of measurements—L*, a*, and b*—generated by measuring the samples using a spectrophotometer. The equipment used for this test was a Gretag Macbeth Color Eye 7000A spectrophotometer. The software program used was "Color imatch." "L" is a measure of the amount of white or black in a sample; higher "L" values indicate a lighter colored sample. A measure of the amount of red or green in a sample is determined by "a*" values. A measure of the amount of blue or yellow in a sample is determined by "b*" values; lower (more negative) b* values indicate more blue on a sample.

Yet another measurement of the relative color of a substrate is DE CMC. DE CMC is a measure of the overall color difference for all uniform color spaces, where DE CMC represents the magnitude of difference between a color and a reference. The Gretag Macbeth Color Eye 7000A Spectrophotometer calculates DE CMC values based on wavelength and reflectance data for each sample.

Several leuco colorants of the present invention and several comparative examples were prepared and tested for blueing efficiency. Lower (more negative) CIELab b* values indicate that more blueing, or whitening effect, is exhibited by the treated cotton swatch.

Comparison of Inventive Example EX4 and Comparative Example CEX1

To illustrate the invention, two detergent compositions were prepared and compared. One detergent composition contained Inventive Example 4 (EX4; Example 4 in Tables 1A and 1B), and the other contained Comparative Example CEX1. EX4 and CEX1 had the same polymer chains, but EX4 was a leuco colorant and CEX1 was a conventional colorant. The two colorants were separately blended with a low pH detergent (in this case, Tide® Free and Gentle detergent). The amounts of the colorants (400 ppm for EX4 and 200 ppm for CEX1) were determined so that the detergents had about the same hueing effect. The appearance (in terms of The CIE L*, a*, and b* values) of both detergents were read and compared in Table 2.

The blueing effect of the detergents containing both EX4 and CEX1 was compared by the following test. In a 1 liter beaker, 500 mL of tap water, 0.5 gram of the detergent premixed with the colorants were mixed. Then 6 pieces of bleached cotton t-shirt fabric (purchased from Testfabrics, Inc., style number 437W-60, cut to 6" by 6" size) were added to the wash water and washed with tergotometer at room temperature for 15 minutes. The fabric/water ratio is about 40 gram/liter. After wash, the fabric samples were rinsed by hand with 500 mL tap water twice and then dried in a dryer for 1 hour. The CIE L*, a*, and b* values were read with a color eye spectrophotometer for the first wash effect. Then the dried cottons were washed and rinsed two more times as described above, and finally dried again in a drier. The CIE L*, a*, and b* values were read with a color eye spectrophotometer for three wash effects.

The delta b* values of the samples washed are reported in the Table 2 below. The delta b* value was obtained by subtraction with the b* value of the same kind of fabrics washed with the same procedure and the same detergent but containing no hueing dyes.

In Table 2, the application example 2 containing leuco colorant (EX4) has light color (L*=94.5) comparable with the base detergent (application example 1, L*=95.3), and demonstrates good hueing effect in both first wash and three-wash. The application example with CEX1, delivers about same bluing effect but has much darker color (L*=28.0).

TABLE 2

| Application Example | Hueing dye | Loading of hueing dye in detergent | L*/a*/b* of detergent | First-wash delta b* | Three-wash delta b* |
|---|---|---|---|---|---|
| 1 | None | 0 | 95.3/−2.9/9.4 | 0 | 0 |
| 2 | EX4 | 400 ppm | 94.9/−3.2/9.7 | −0.5 | −0.5 |
| 3 | CEX1 | 200 ppm | 28.0/61.4/−83.1 | −0.3 | −0.4 |

Comparison of Inventive Example EX2 and Comparative Example CEX2

The bluing effect of the EX2 and CEX2 was compared by the following test. The test procedure is described below:

In a 1 liter beaker, 500 mL of tap water, 0.5 gram of Tide® free and gentle liquid detergent, and the leuco dye to be tested (loading of the leuco dye was included in Table 3 below) was mixed. Then 6 pieces of bleached cotton t-shirt fabric (purchased from Testfabrics, Inc., style number 437W-60, cut to 6" by 6" size) were added to the wash water and washed with tergotometer at room temperature for 15 minutes. The fabric/water ratio was about 40 gram/liter. After wash, the fabric samples were rinsed by hand with 500 mL tap water twice and then dried in a dryer for 1 hour. The dried samples were then washed and rinsed two more times as described above, and finally dried again in a drier. The CIE L*, a*, and b* values were read with a color eye spectrophotometer.

The delta b* values of the cotton washed with different leuco hueing dyes are reported in the Table 3 below. The delta b* value was obtained by subtraction with the b* value of the same kind of fabrics washed with the same procedure and the same detergent but containing no leuco hueing dyes as described above. The example of this invention (EX2) is more effective in hueing fabrics than the comparative example CEX2 even at lower loading (1 ppm vs. 2 ppm).

TABLE 3

| Application Example water | Hueing dye | Concentration of Hueing Dye in wash water | Three-wash delta b* |
|---|---|---|---|
| 4 | EX2 | 1 ppm | −0.9 |
| 5 | CEX2 | 2 ppm | 0.1 |

Bluing Effect of the Inventive Examples in Low pH Detergent

The bluing effect of the inventive examples listed in Tables 1A and 1B was tested following the procedure described below:

In a 1 liter beaker, 500 mL of tap water, 0.5 gram of detergent (Tide® free and gentle liquid detergent or AATCC standard liquid laundry detergent, both have a low pH about 8-9), and the leuco dye to be tested (loading of the leuco dye was included in Table 4 below) were mixed. The leuco dye can be introduce into the wash water by either 1) premixing with the detergent or 2) pre-dissolving in about 1 mL of organic solvent and then add directly into the wash water. Six pieces of bleached cotton t-shirt fabric (purchased from Testfabrics, Inc., style number 437W-60, cut to 6" by 6" size) were added to the wash water and washed with tergotometer at room temperature for 15 minutes. The fabric/water ratio was about 40 gram/liter. After wash, the fabric samples were rinsed by hand with 500 mL tap water twice and then dried in a dryer for 1 hour. The CIE L*, a*, and b* values were read with a color eye spectrophotometer.

The delta b* values of the cotton washed with different leuco hueing dyes are reported in the Table 4 below. The delta b* values were obtained by subtraction with the b* value of the same kind of fabrics washed with no hueing dyes following the same procedure described above.

TABLE 4

| Application Example | Leuco colorants | Detergent used | Concentration of hueing dye in wash water | delta b* |
|---|---|---|---|---|
| 6 | EX1 | Tide® | 1 ppm | −2.6 |
| 7 | EX2 | Tide® | 1 ppm | −0.9 |
| 8 | EX3 | Tide® | 5 ppm | −0.9 |
| 9 | EX4 | Tide® | 1 ppm | −0.7 |
| 10 | EX4 | Tide® | 0.4 ppm | −0.3 |
| 11 | EX5 | AATCC | 1 ppm | −0.8 |
| 12 | EX6 | AATCC | 1 ppm | −2.4 |
| 13 | EX7 | AATCC | 1 ppm | −1.6 |
| 14 | EX8 | AATCC | 1 ppm | −1.2 |

Bluing Effect of the Inventive Examples in High pH Detergent

The leuco colorants EX2 and EX4 were mixed with a high pH detergent (ALL® detergent, pH is about 12.4). The amount of the colorant in detergent was chosen according to the concentration of colorant in the wash water as listed in Table 5. Then, in a 1 liter beaker, 500 mL of tap water, 0.5 gram of the detergent was mixed. Then 6 pieces of bleached cotton t-shirt fabric (purchased from Testfabrics, Inc., style number 437W-60, cut to 6" by 6" size) were added to the wash water and washed with tergotometer at room temperature for 15 minutes. The fabric/water ratio was about 40 gram/liter. After wash, the fabric samples were rinsed by hand with 500 mL tap water twice and then dried in a dryer for 1 hour. The CIE L*, a*, and b* values were read with a color eye spectrophotometer.

The delta b* value of the cotton washed with different leuco hueing dyes are reported in the Table 5 below. The delta b* value were obtained by subtraction with the b* value of the same kind of fabrics washed with no hueing dyes following the same procedure described above.

TABLE 5

| Application Example | Leuco Colorant | Concentration of Hueing Dye in wash water | delta b* |
|---|---|---|---|
| 15 | EX2 | 1 ppm | −0.7 |
| 16 | EX4 | 0.5 ppm | −0.4 |

Storage Stability of the Inventive Examples in Low pH Detergent 400 ppm of EX4 was mixed with Tide® Free and Gentle liquid detergent. Then the detergent was aged at 1) room temperature and 2) 50° C. for 4 weeks. The CIE L*, a*, and b* values of the detergent containing the leuco colorant were measured and compared before and after storage. The hueing efficiency of the detergent was also tested and compare following the same washing protocol as the application example 6-14.

In addition to the leuco colorant, other additives can be added to the detergent formulation to either promote the color development during wash and/or inhibit the color formation during storage. These additives include, but are not limited to, antioxidant, reducing agent, oxidizer, oxidizing catalyst, and combinations thereof. Suitable antioxidants include, but are not limited to, alkylated phenol (such as BHT, Irganox® 1135, Irganox® 1076, Irganox® 1010, Irganox® 1330, and Irganox® 1035; Irganox® products commercially available from BASF), aromatic amine and its derivatives (such as Irganox® 5057), α-, β-, γ-, δ-tocopherol, ethoxyquine, 2,2,4-trimethyl-1,2-dihydroquinoline, 2,6-di-tert-butyl hydroquinone, tert-butyl-hydroxy anisole, lignosulphonic acid and salts thereof, 6-hydroxy-2,5,7,8-tetra-methylchroman-2-carboxylic acid (Trolox™), 1,2-benzisothiazoline-3-one (Proxel GXL™), a benzofuran or benzopyran derivative (such as Irganox® HP136), AOX-1 commercialized by Milliken & Company of Spartanburg, S.C., USA, tocopherol sorbate, butylated hydroxy benzoic acid and its salts, gallic acid and its alkyl esters, uric acid and its salts and alkyl esters, sorbic acid and its salts, dihydroxy fumaric acid and its salts, hindered amines and mixtures thereof.

The detergent formulation and hue data before and after storage was compared in Table 6.

TABLE 6

| Application Example | Loading of Additive 1[a] | Loading of Additive 2[b] | L*/a*/b* before storage | L*/a*/b* after storage 25° C. | L*/a*/b* after storage 50° C. |
|---|---|---|---|---|---|
| 17 | 0 | 0 | 93.6/−3.5/8.2 | 92.9/−3.8/6.7 | 88.4/−5.2/1.2 |
| 18 | 800 ppm | 0 | 91.9/−4.2/8.3 | 91.7/−4.2/8.1 | 90.8/−4.5/8.2 |
| 19 | 0 | 800 ppm | 92.2/−3.5/7.1 | 93.6/−3.5/5.0 | 89.3/−4.6/−2.7 |
| 20 | 400 ppm | 400 ppm | 92.4/−3.4/6.7 | 94.2/−3.4/6.2 | 91.8/−4.1/3.0 |

[a]additive 1 is 3,5-Di-tert-butyl-4-hydroxybenzenepropanoic acid (CAS 20170-32-5).
[b]additive 2 is sodium dithionite (CAS 7775-14-6).

1000 ppm of EX2 was mixed with Tide® Free and Gentle liquid detergent with/without other additives. The storage stability was tested and summarized in the Table 7 below.

TABLE 7

| Application Example | Loading of Additive 1[a] | Loading of Additive 2[b] | L*/a*/b* before storage | L*/a*/b* After storage 25° C. | L*/a*/b* After storage 50° C. |
|---|---|---|---|---|---|
| 21 | 0 | 0 | 91.0/−5.2/6.5 | 85.1/−7.5/6.2 | 72.8/−9.8/−6.9 |
| 22 | 2000 ppm | 0 | 91.1/−5.5/7.7 | 88.3/−7.2/15.2 | 77.5/−8.5/4.4 |
| 23 | 1000 ppm | 0 | 91.0/−5.3/7.2 | 88.3/−7.1/13.1 | 77.8/−8.8/2.7 |
| 24 | 0 | 2000 ppm | 95.7/−4.3/10.3 | 92.3/−4.8/4.3 | 77.2/−6.2/−20 |
| 25 | 0 | 1000 ppm | 91.8/−5.2/6.0 | 89.9/−5.3/0.7 | 72.8/−6/−25 |

[a]additive 1 is 3,5-Di-tert-butyl-4-hydroxybenzenepropanoic acid (CAS 20170-32-5).
[b]additive 2 is sodium dithionite (CAS 7775-14-6).

The delta b* values of the cotton washed with the application example 18, 21, and 23 before and after aging at 50° C. for 4 weeks were compared in Table 8 below. The detergents maintained the hueing efficiency after storage.

TABLE 8

| Application Example | delta b* before aging | delta b* after aging |
|---|---|---|
| 18 | −0.5 | −0.3 |
| 21 | −0.7 | −0.7 |
| 23 | −0.8 | −0.6 |

Storage Stability of the Inventive Examples in High pH Detergent 1000 ppm of EX2 was mixed with ALL® detergent. Then the detergent was aged at 1) room temperature and 2) 50° C. for 4 week. The CIE L*, a*, and b* values of the detergent containing the leuco colorant were measured and compared before and after storage. The hueing efficiency of the detergents were also tested and compare following the same washing protocol as the application example 15 and 16.

The detergent formulation and L*, a*, and b* values before and after storage were compared in Table 9.

TABLE 9

| Application Example | L*/a*/b* before storage | L*/a*/b* After storage 25° C. | L*/a*/b* After storage 50° C. |
|---|---|---|---|
| 26 | 95.4/−4.4/8.2 | 96.0/−4.2/9.2 | 96.0/−4.3/9.2 |

The delta b* values of the cotton washed with the application example 23 and after aging at 50° C. for 4 weeks were compared in Table 10 below. The detergent maintained its hueing efficiency after storage.

TABLE 10

| Application Example | delta b* before aging | delta b* after aging |
|---|---|---|
| 26 | −0.7 | −0.6 |

Bluing Effect of the Inventive Examples in Powder Detergent

The powder detergents containing the leuco dye were prepared by mixing the leuco dye with a variety of powder detergents as listed in Table 11. Then, in a 1 liter beaker, 500 mL of tap water and 0.5 gram of powder laundry detergent containing the leuco dye to be tested were mixed (wash water concentration of the leuco dye is included in Table 11 below). Six pieces of bleached cotton t-Shirt fabric (purchased from Testfabrics, Inc., style number 437W-60, cut to 6" by 6" size) were added to the wash water and washed with tergotometer at room temperature for 15 minutes. The fabric/water ratio was about 40 gram/liter. After wash, the fabric samples were rinsed by hand with 500 mL tap water twice and then dried in a dryer for 1 hour. The CIE L*, a*, and b* values were read with a color eye spectrophotometer.

The delta b* values for cotton washed with a single leuco hueing dye (EX4) premixed with many different powdered laundry detergents are reported in the Table 11 below. The delta b* values were obtained by subtracting the b* value recorded when the same kind of fabrics were washed with detergent only (no hueing dye present), following the same procedure described above.

TABLE 11

| Application Example | Leuco colorant | Powdered Detergent used | Concentration of hueing dye in wash water | delta b* |
|---|---|---|---|---|
| 27 | EX4 | AATCC Detergent w/o OB | 1 ppm | −1.39 |
| 28 | EX4 | Tide ® Free & Gentle | 1 ppm | −0.53 |
| 29 | EX4 | Persil ® Power | 1 ppm | −1.33 |
| 30 | EX4 | Vanish | 1 ppm | −0.29 |
| 31 | EX4 | ROMA | 1 ppm | −1.1 |
| 32 | EX4 | Mr. White | 1 ppm | −2.02 |
| 33 | EX4 | RIN | 1 ppm | −0.6 |
| 34 | EX4 | LIBY | 1 ppm | −1.12 |

Bluing Effect of the Inventive Examples in Different Water Source

Tap water is often treated with chlorine species to disinfect. Commonly used disinfecting agents include, but are not limited to, chlorine, chlorine dioxide, chloramine, and combinations thereof. The method of measuring the chlorine level in water is well known to those skilled in the art. One method uses a chlorine kit and colorimeter commercialized by Hach. Since disinfecting agents are oxidizing in nature, different water sources will have an influence on the bluing efficacy of the leuco compound. The effect of chlorine species on bluing is dependent on the formulation of the detergent. Some detergent formulations contain a "chlorine scavenger" which acts to deactivate the active chlorine in the tap water. Other additives in detergent formulations, such as the anti-oxidant and reducing agent, may also have effect on the chlorine species.

Table 12 lists some application examples using leuco colorant in water with different chlorine source and concentration. The total chlorine level was measured using Hach total chlorine kit and colorimeter.

In a 1 liter beaker, 500 mL of water, 0.5 gram of detergent (Tide® Free and Gentle liquid detergent, pH about 8-9), and the leuco dye to be tested (loading of the leuco dye was included in Table 12 below) were mixed. The leuco dye can be introduced into the wash water by either 1) premixing with the detergent or 2) pre-dissolving in about 1 mL of organic solvent and then add directly into the wash water. Six pieces of bleached cotton t-shirt fabric (purchased from Testfabrics, Inc., style number 437W-60, cut to 6" by 6" size) were added to the wash water and washed with tergotometer at room temperature for 15 minutes. The fabric/water ratio was about 40 gram/liter. After wash, the fabric samples were rinsed by hand with 500 mL testing water twice and then dried in a dryer for 1 hour. The CIE L*, a*, and b* values were read with a color eye spectrophotometer.

The delta b* values of the cotton washed with different leuco hueing dyes are reported in Table 12 below. The delta b* values were obtained by subtraction with the b* value of the same kind of fabrics washed with no hueing dyes following the same procedure described above.

TABLE 12

| Application Example | Leuco colorants | Total Chlorine level | Chlorine species | Hueing dye in wash water | delta b* |
|---|---|---|---|---|---|
| 35 | EX6 | 0 | — | 1 ppm | −0.5 |
| 36 | EX6 | 2.82 ppm | Chloramine | 1 ppm | −1.1 |
| 37 | EX6 | 1.16 ppm | Chlorine | 1 ppm | −1.0 |
| 38 | EX7 | 0 | — | 1 ppm | −0.5 |
| 39 | EX2 | 1.58 | Chlorine and Chlorine dioxide | 0.2 ppm | −1.6 |
| 40 | EX2 | 0 | — | 0.2 ppm | 0 |
| 41 | EX2 | 2.82 ppm | Chloramine | 0.2 ppm | −0.1 |
| 42 | EX2 | 1.16 ppm | Chlorine | 0.2 ppm | −0.2 |
| 43 | EX5 | 0 | — | 1 ppm | −0.1 |
| 44 | EX14 | 0 | — | 1 ppm | −0.3 |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A composition comprising: (a) at least one surfactant and (b) at least one compound represented by Formula (I) below:

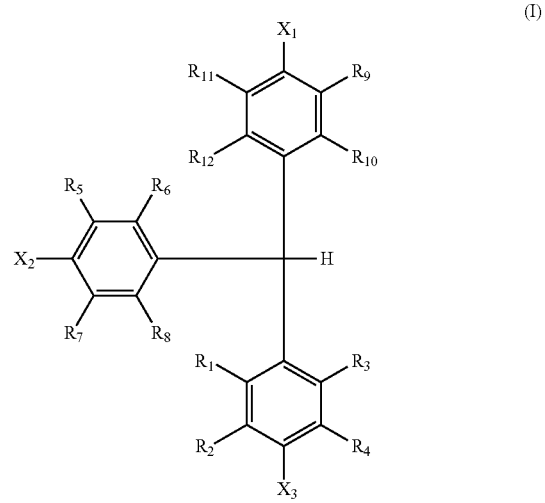

Wherein:
$X_1=NR_{13}R_{14}$, $R_{13}$=alkyl, $R_{14}=R_a$, $R_a=R_x$—O—$R_y$—$R_z$, $R_x$=alkanediyl, $R_y$ is a divalent substituent comprising two or more divalent repeating units independently selected from repeating units conforming to the structure of Formula (C):

$R_{101}$=hydrogen, $R_{102}$=hydrogen, $R_z$=hydrogen;

$X_2$=$NR_{13}R_{14}$, wherein $R_{13}$=hydrogen and $R_{14}$=alkyl or $R_{13}$=alkyl and $R_{14}$=hydrogen;

$X_3$=$NR_{13}R_{14}$, $R_{13}$=alkyl, $R_{14}$=$R_a$, $R_a$=$R_x$—O—$R_y$—$R_z$, $R_x$=alkanediyl, $R_y$ is a divalent substituent comprising two or more divalent repeating units independently selected from repeating units conforming to the structure of Formula (C):

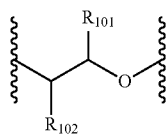
(C)

$R_{101}$=hydrogen, $R_{102}$=hydrogen, $R_z$=hydrogen; and $R_1$ to $R_{12}$ groups are hydrogen.

2. The composition of claim 1, wherein $R_y$ is a divalent substituent conforming to a structure selected from the group consisting of Formula (CA), (CB), and (CC):

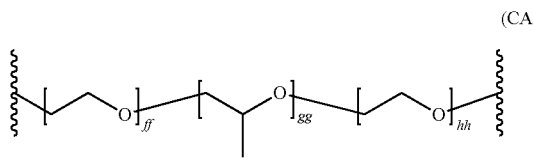
(CA)

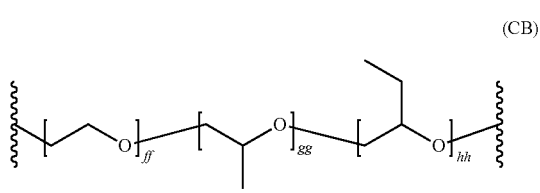
(CB)

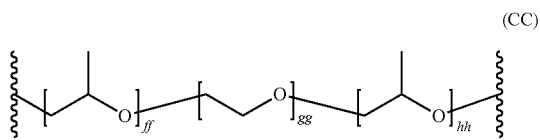
(CC)

wherein ff, gg, and hh are selected from the group consisting of zero and positive integers, and the sum of ff, gg, and hh is 2 or more.

3. A laundry care composition comprising: (a) at least one laundry care adjunct material and (b) at least one leuco dye, wherein the leuco dye forms color upon exposure to an oxidation reaction and has a standard redox potential of greater than zero volts at neutral pH.

4. A laundry care composition comprising: (a) at least one laundry care adjunct material and (b) at least one compound represented by Formula (I) below:

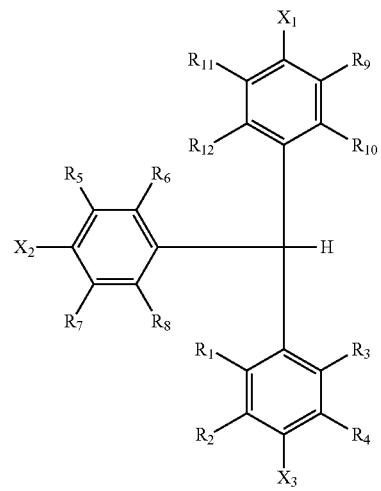
(I)

Wherein:

$X_1$=$NR_{13}R_{14}$, $R_{13}$=alkyl, $R_{14}$=$R_a$, $R_a$=$R_x$—O—$R_y$—$R_z$, $R_x$=alkanediyl, $R_y$ is a divalent substituent comprising two or more divalent repeating units independently selected from repeating units conforming to the structure of Formula (C):

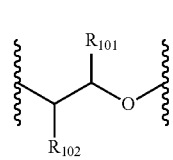
(C)

$R_{101}$=hydrogen, $R_{102}$=hydrogen, $R_z$=hydrogen;

$X_2$=$NR_{13}R_{14}$, wherein $R_{13}$=hydrogen and $R_{14}$=alkyl or $R_{13}$=alkyl and $R_{14}$=hydrogen;

$X_3$=$NR_{13}R_{14}$, $R_{13}$=alkyl, $R_{14}$=$R_a$, $R_a$=$R_x$—O—$R_y$—$R_z$, $R_x$=alkanediyl, $R_y$ is a divalent substituent comprising two or more divalent repeating units independently selected from repeating units conforming to the structure of Formula (C):

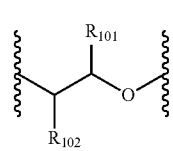
(C)

$R_{101}$=hydrogen, $R_{102}$=hydrogen, $R_z$=hydrogen; and $R_1$ to $R_{12}$ groups are hydrogen.

5. The laundry care composition of claim 4, wherein $R_y$ is a divalent substituent conforming to a structure selected from the group consisting of Formula (CA), (CB), and

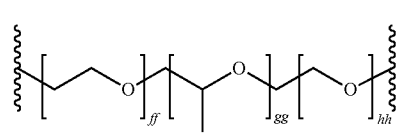
(CA)

-continued

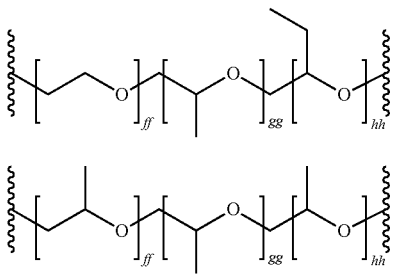

(CB)

(CC)

wherein ff, gg, and hh are selected from the group consisting of zero and positive integers, and the sum of ff, gg, and hh is 2 or more.

6. The laundry care composition of claim 4, wherein the composition is a detergent composition.

7. The laundry care composition of claim 4, wherein the composition is the form of a liquid.

8. The laundry care composition of claim 4, wherein the composition is in the form of a liquid with a pH of greater than or equal to 10.

9. The laundry care composition of claim 4, wherein the composition is in the form of a liquid with a pH of less than 10.

10. The laundry care composition of claim 4, wherein the composition is in the form of a solid.

11. A method for treating a textile substrate, the method comprising the steps of:
   (a) providing the laundry care composition of claim 4;
   (b) adding the laundry care composition to a liquid medium; and
   (c) placing the textile substrate in the liquid medium.

12. The method of claim 11, wherein the method is performed under conditions sufficient to convert the compound conforming of Formula (I) to its oxidized color form.

13. A polymeric leuco colorant represented by Formula (I) below:

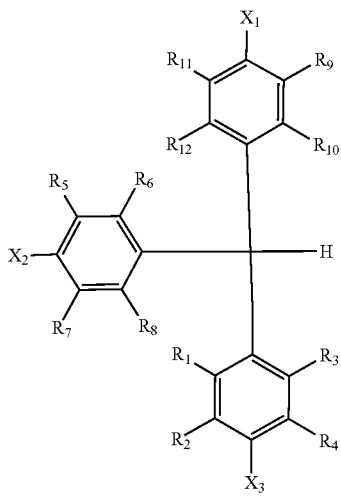

(I)

Wherein:
$X_1$=NR$_{13}$R$_{14}$, R$_{13}$=alkyl, R$_{14}$=R$_a$, R$_a$=R$_x$—O—R$_y$—R$_z$, R$_x$=alkanediyl, R$_y$ is a divalent substituent comprising two or more divalent repeating units independently selected from repeating units conforming to the structure of Formula (C):

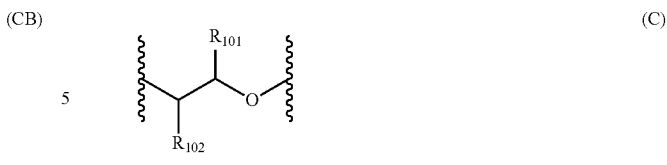

(C)

$R_{101}$=hydrogen, $R_{102}$=hydrogen, $R_z$=hydrogen;
$X_2$=NR$_{13}$R$_{14}$, wherein $R_{13}$=hydrogen and $R_{14}$=alkyl or $R_{13}$=alkyl and $R_{14}$=hydrogen;
$X_3$=NR$_{13}$R$_{14}$, $R_{13}$=alkyl, $R_{14}$=R$_a$, $R_a$=R$_x$—O—R$_y$—R$_z$, $R_x$=alkanediyl, R$_y$ is a divalent substituent comprising two or more divalent repeating units independently selected from repeating units conforming to the structure of Formula (C):

(C)

$R_{101}$=hydrogen, $R_{102}$=hydrogen, $R_z$=hydrogen; and
$R_1$ to $R_{12}$ groups are hydrogen.

14. A composition comprising the polymeric leuco colorant of claim 13.

15. A laundry care composition comprising the polymeric leuco colorant of claim 13.

16. A detergent composition comprising the polymeric leuco colorant of claim 13.

17. The colorant of claim 13, wherein R$_y$ is a divalent substituent conforming to a structure selected from the group consisting of Formula (CA), (CB), and (CC)

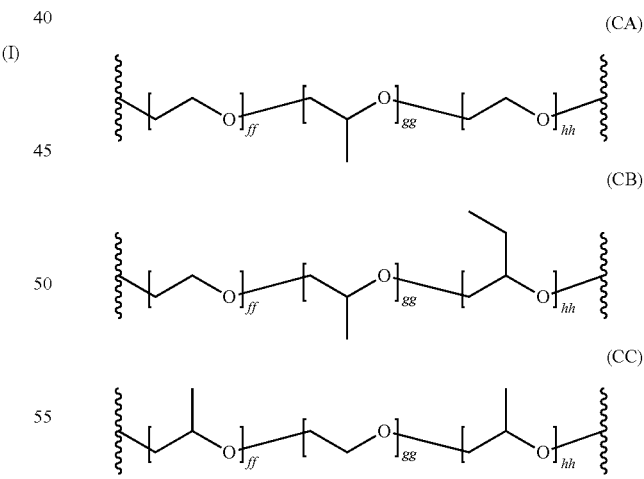

(CA)

(CB)

(CC)

wherein ff, gg, and hh are selected from the group consisting of zero and positive integers, and the sum of ff, gg, and hh is 2 or more.

18. The colorant of claim 17, wherein the sum of ff, gg, and hh is from 2 to 40.

19. The colorant of claim 17, wherein the sum of ff, gg, and hh is from 2 to 20.

* * * * *

UNITED STATES PATENT AND TRADEMARK OFFICE
CERTIFICATE OF CORRECTION

PATENT NO.         : 11,053,461 B2
APPLICATION NO.    : 16/881115
DATED              : July 6, 2021
INVENTOR(S)        : Haihu Qin et al.

Page 1 of 1

It is certified that error appears in the above-identified patent and that said Letters Patent is hereby corrected as shown below:

In the Claims

In Column 82, Claim 5, Line 59, "(CC)" should be added after "and".

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*